(12) United States Patent
Deevers et al.

(10) Patent No.: US 11,974,676 B2
(45) Date of Patent: May 7, 2024

(54) BODY SUPPORT MEMBER WITH LATTICE STRUCTURE

(71) Applicant: Steelcase Inc., Grand Rapids, MI (US)

(72) Inventors: Nickolaus William Charles Deevers, E Grand Rapids, MI (US); Carl V. Forslund, III, Grand Rapids, MI (US); John Hamilton, San Rafael, CA (US); Kurt R. Heidmann, Grand Rapids, MI (US); James Ludwig, Grand Rapids, MI (US); Bruce Smith, East Grand Rapids, MI (US); Aaron Michael Porterfield, Milpitas, CA (US); Sharon L. Tracy, Wyoming, MI (US); Paul Noll, Grand Rapids, MI (US)

(73) Assignee: STEELCASE INC., Grand Rapids, MI (US)

(*) Notice: Subject to any disclaimer, the term of this patent is extended or adjusted under 35 U.S.C. 154(b) by 0 days.

(21) Appl. No.: 17/718,546

(22) Filed: Apr. 12, 2022

(65) Prior Publication Data

US 2022/0240680 A1    Aug. 4, 2022

Related U.S. Application Data

(63) Continuation of application No. 17/022,957, filed on Sep. 16, 2020, now Pat. No. 11,324,323.
(Continued)

(51) Int. Cl.
*A47C 7/02*    (2006.01)
*A47C 5/12*    (2006.01)
(Continued)

(52) U.S. Cl.
CPC .............. *A47C 7/029* (2018.08); *A47C 5/12* (2013.01); *A47C 7/16* (2013.01)

(58) Field of Classification Search
CPC .. A47C 5/12; A47C 7/029; A47C 7/16; A47C 7/285
(Continued)

(56) References Cited

U.S. PATENT DOCUMENTS

| 87,184 A | 2/1869 | Mattson |
| 546,174 A | 9/1895 | Menzenhauer |

(Continued)

FOREIGN PATENT DOCUMENTS

| CA | 2542978 | 5/2005 |
| CN | 201951307 U | 11/2011 |

(Continued)

OTHER PUBLICATIONS

International Search Report and Written Opinion for International Application No. PCT/US018/63632, dated Apr. 30, 2019.
(Continued)

*Primary Examiner* — Rodney B White
(74) *Attorney, Agent, or Firm* — Crowell & Moring LLP

(57) ABSTRACT

A body support structure includes a structural lattice structure having a first stiffness, and a compressive lattice structure supported by the structural lattice structure and having a second stiffness less than the first stiffness. A skin lattice structure is supported by the compressive lattice structure, wherein the skin lattice structure is resistant to shear deformation in response to a normal force and is expandable in a direction transverse to the normal force.

26 Claims, 38 Drawing Sheets

Related U.S. Application Data

(60) Provisional application No. 62/902,187, filed on Sep. 18, 2019.

(51) Int. Cl.
*A47C 7/14* (2006.01)
*A47C 7/16* (2006.01)

(58) Field of Classification Search
USPC .................. 297/451.4, 451.8, 216.1–216.2, 297/445.1–451.13
See application file for complete search history.

(56) References Cited

U.S. PATENT DOCUMENTS

| | | |
|---|---|---|
| 1,982,516 A | 11/1934 | Holmested |
| 2,414,978 A | 1/1947 | Richardson |
| D149,798 S | 6/1948 | Crawford |
| 2,799,323 A | 7/1957 | Berg et al. |
| D188,843 S | 9/1960 | Kagan |
| 2,992,605 A | 7/1961 | Trotman |
| 3,027,195 A | 3/1962 | Nelson et al. |
| 3,120,407 A | 2/1964 | Propst |
| 3,137,523 A | 6/1964 | Karner |
| 3,162,487 A | 12/1964 | Trotman |
| 3,233,885 A | 2/1966 | Propst |
| 3,514,156 A | 5/1970 | Fields |
| 3,565,482 A | 2/1971 | Blodee |
| 3,656,808 A | 4/1972 | Chang |
| 3,669,499 A | 6/1972 | Semplonius et al. |
| 3,746,394 A | 7/1973 | Speidel |
| 3,877,750 A | 4/1975 | Scholpp |
| 4,088,367 A | 5/1978 | Atkinson et al. |
| 4,143,916 A | 3/1979 | Trotman et al. |
| 4,205,880 A | 6/1980 | Trotman et al. |
| 4,337,931 A | 7/1982 | Mundell et al. |
| 4,399,574 A | 8/1983 | Shuman |
| 4,418,958 A | 12/1983 | Watkin |
| 4,502,731 A | 3/1985 | Snider |
| 4,567,615 A | 2/1986 | Fanti |
| 4,585,272 A | 4/1986 | Ballarini |
| 4,647,109 A | 3/1987 | Christophersen et al. |
| 4,660,887 A | 4/1987 | Fleming et al. |
| 4,658,807 A | 8/1987 | Swain |
| 4,713,854 A | 12/1987 | Graebe |
| 4,856,846 A | 8/1989 | Lohmeyer |
| 4,892,356 A | 1/1990 | Pittman |
| 4,895,091 A | 1/1990 | Emali et al. |
| 4,913,493 A | 4/1990 | Heidmann |
| 4,962,964 A | 10/1990 | Snodgrass |
| 5,015,038 A | 5/1991 | Mrotz, III |
| 5,022,709 A | 6/1991 | Marchino |
| 5,024,485 A | 6/1991 | Berg et al. |
| 5,029,939 A | 7/1991 | Smith et al. |
| 5,102,196 A | 4/1992 | Kaneda et al. |
| 5,154,485 A | 10/1992 | Fleishman |
| 5,279,876 A * | 1/1994 | Thum .................. B60N 2/7035 428/542.2 |
| 5,282,285 A | 2/1994 | de Gelis et al. |
| 5,288,127 A | 2/1994 | Berg et al. |
| D346,073 S | 4/1994 | Hamelink |
| 5,320,410 A | 6/1994 | Faiks |
| 5,326,155 A | 7/1994 | Wild |
| 5,340,197 A | 8/1994 | Vogtherr |
| 5,403,067 A | 4/1995 | Rajaratnam |
| 5,518,294 A | 5/1996 | Ligon, Sr. et al. |
| 5,551,673 A | 9/1996 | Furusawa |
| 5,664,835 A | 9/1997 | Desanta |
| 5,747,140 A | 5/1998 | Heerklotz |
| 5,774,911 A | 7/1998 | Stube et al. |
| 5,871,258 A | 2/1999 | Battey et al. |
| 5,934,758 A | 8/1999 | Ritch et al. |
| 5,951,109 A | 9/1999 | Roslund, Jr. et al. |
| D438,392 S | 3/2001 | Lucci et al. |
| 6,334,650 B1 | 1/2002 | Chine-Chuan |
| 6,357,826 B1 | 3/2002 | Gabas et al. |
| 6,409,268 B1 | 6/2002 | Cvek |
| 6,412,869 B1 | 7/2002 | Pearce |
| 6,439,661 B1 | 8/2002 | Bräuning |
| D462,534 S | 9/2002 | Grazioli |
| 6,477,727 B1 | 11/2002 | Fromme |
| 6,523,898 B1 | 2/2003 | Ball |
| 6,568,760 B2 | 5/2003 | Davis |
| 6,598,251 B2 | 7/2003 | Habboub et al. |
| 6,626,497 B2 | 9/2003 | Nagamitsu |
| 6,669,292 B2 | 12/2003 | Koepke |
| 6,669,301 B1 | 12/2003 | Funk |
| 6,679,553 B2 | 1/2004 | Battey et al. |
| 6,679,557 B2 | 1/2004 | Craft et al. |
| 6,701,550 B2 | 3/2004 | Baeriswyl |
| 6,726,285 B2 | 4/2004 | Caruso et al. |
| 6,767,060 B2 | 7/2004 | Craft et al. |
| 6,793,289 B2 | 9/2004 | Kuster et al. |
| 6,820,933 B2 | 11/2004 | Fereira Da Silva |
| 6,826,791 B2 | 12/2004 | Fromme |
| 6,901,617 B2 | 6/2005 | Sprouse, II et al. |
| 6,910,736 B2 | 6/2005 | White |
| 6,986,549 B2 | 1/2006 | Kniese |
| 7,032,971 B2 | 4/2006 | Williams |
| 7,059,682 B2 | 6/2006 | Caruso et al. |
| D527,557 S | 9/2006 | Reimers |
| 7,165,811 B2 | 1/2007 | Bodnar et al. |
| D546,574 S | 7/2007 | Kaloustian |
| 7,237,841 B2 | 7/2007 | Norman et al. |
| 7,320,503 B2 | 1/2008 | Eysing |
| 7,338,039 B2 | 3/2008 | Pfau |
| 7,425,037 B2 | 9/2008 | Schmitz et al. |
| 7,411,758 B1 | 10/2008 | Coffield |
| 7,441,758 B2 | 10/2008 | Coffield |
| 7,455,365 B2 | 11/2008 | Caruso et al. |
| 7,461,892 B2 | 12/2008 | Bajic et al. |
| 7,472,962 B2 | 1/2009 | Caruso et al. |
| D594,669 S | 6/2009 | Asano |
| D595,072 S | 6/2009 | Su |
| 7,568,760 B1 * | 8/2009 | Lodes .................. A47C 7/624 297/188.21 |
| 7,568,768 B1 | 8/2009 | Tsai |
| 7,604,298 B2 | 10/2009 | Peterson et al. |
| 7,604,299 B2 | 10/2009 | Su |
| 7,648,201 B2 | 1/2010 | Eysing |
| D612,642 S | 3/2010 | Cassaday |
| 7,686,395 B2 | 3/2010 | Piretti |
| 7,695,069 B2 | 4/2010 | Prust |
| 7,740,321 B2 | 6/2010 | Brill |
| 7,794,022 B2 | 9/2010 | Caruso et al. |
| 7,798,573 B2 | 9/2010 | Pennington et al. |
| 7,857,388 B2 | 12/2010 | Bedford et al. |
| 7,874,619 B2 | 1/2011 | Harley |
| 7,878,591 B2 | 2/2011 | Walker |
| 7,878,598 B2 | 2/2011 | Oda |
| 7,896,438 B2 | 3/2011 | Whelan et al. |
| 7,909,402 B2 | 3/2011 | Chu et al. |
| 7,926,879 B2 | 4/2011 | Schmitz et al. |
| 7,931,257 B2 | 4/2011 | Vandereit |
| D637,839 S | 5/2011 | Piretti |
| D638,641 S | 5/2011 | Piretti |
| D642,819 S | 8/2011 | Piretti |
| D643,654 S | 8/2011 | Piretti |
| D649,804 S | 12/2011 | Keller et al. |
| D650,616 S | 12/2011 | Piretti |
| D652,224 S | 1/2012 | Ferrier |
| 8,087,727 B2 | 1/2012 | Parker et al. |
| 8,157,329 B2 | 4/2012 | Masoud |
| D660,611 S | 5/2012 | Barile |
| 8,172,332 B2 | 5/2012 | Masunaga |
| 8,185,988 B2 | 5/2012 | Wieland |
| 8,191,970 B2 | 6/2012 | Igarashi |
| 8,251,448 B2 | 8/2012 | Machael |
| 8,256,043 B2 | 9/2012 | Fromme-Ruthmann |
| 8,272,691 B2 | 9/2012 | Hsuan-Chin |
| 8,276,986 B2 | 10/2012 | Kim |
| 8,282,169 B2 | 10/2012 | Schmitz et al. |
| 8,282,172 B2 | 10/2012 | Schmitz |
| D673,395 S | 1/2013 | Piretti |

(56) References Cited

U.S. PATENT DOCUMENTS

| | | | |
|---|---|---|---|
| 8,414,073 B2 | 4/2013 | Schmitz et al. | |
| 8,449,037 B2 | 5/2013 | Behar | |
| D688,055 S | 8/2013 | Baldanzi et al. | |
| D688,061 S | 8/2013 | Giugiaro | |
| 8,528,980 B1 | 9/2013 | Hsiao | |
| 8,540,315 B2 | 9/2013 | Piretti | |
| 8,590,978 B2 | 11/2013 | Jaranson et al. | |
| 8,622,472 B2 | 1/2014 | Rajaratnam | |
| 8,657,374 B2 | 2/2014 | Higgs | |
| 8,745,783 B2 | 6/2014 | Jansen | |
| 8,919,880 B2 | 12/2014 | Bellingar et al. | |
| 8,939,507 B2 | 1/2015 | Thomaschewski et al. | |
| 8,967,726 B2 | 3/2015 | Schmitz et al. | |
| 8,998,339 B2 | 4/2015 | Peterson | |
| 9,010,859 B2 | 4/2015 | Battey | |
| 9,022,475 B2 | 5/2015 | Brncick et al. | |
| 9,033,421 B2 | 5/2015 | Wilkinson | |
| D731,833 S | 6/2015 | Fifield et al. | |
| 9,114,880 B2 | 8/2015 | Guering | |
| 9,144,311 B2 | 9/2015 | Romero | |
| 9,185,985 B2 | 11/2015 | Bellingar et al. | |
| 9,186,290 B2 | 11/2015 | Fowler | |
| 9,211,014 B2 | 12/2015 | Schmitz et al. | |
| 9,237,811 B1 | 1/2016 | Cho | |
| 9,326,613 B2 | 5/2016 | Cvek | |
| 9,332,851 B2 | 5/2016 | Machael et al. | |
| 9,414,681 B2 | 8/2016 | Bellingar et al. | |
| 9,486,081 B2 | 11/2016 | Sander et al. | |
| 9,504,326 B1 | 11/2016 | Cartis et al. | |
| 9,533,457 B2 | 1/2017 | Haimoff | |
| D779,251 S | 2/2017 | Beyer et al. | |
| 9,578,968 B2 | 2/2017 | Masunaga | |
| 9,596,941 B1 | 3/2017 | Romero | |
| 9,737,152 B2 * | 8/2017 | Mason | A47G 9/10 |
| 9,913,539 B2 | 3/2018 | Potrykus | |
| 10,016,059 B2 | 7/2018 | Leonard et al. | |
| 10,064,493 B2 | 9/2018 | Machael | |
| 10,159,350 B2 * | 12/2018 | Igarashi | A47C 7/004 |
| 10,219,627 B2 | 3/2019 | Deevers | |
| 10,343,565 B2 * | 7/2019 | Baek | B60N 2/5642 |
| 10,357,955 B2 | 7/2019 | Ziolek | |
| 10,662,587 B2 * | 5/2020 | Maeda | D06P 5/30 |
| 10,820,705 B2 | 11/2020 | Deevers | |
| 10,913,535 B2 * | 2/2021 | Udriste | B64D 11/0647 |
| 11,007,400 B1 * | 5/2021 | Stoddard | A63B 21/151 |
| 11,103,072 B2 * | 8/2021 | Rheault | A47C 9/007 |
| 11,213,112 B2 * | 1/2022 | McDermott | A45F 3/26 |
| 11,324,323 B2 * | 5/2022 | Deevers | A47C 7/029 |
| 2001/0008955 A1 | 7/2001 | Garth | |
| 2002/0021040 A1 | 2/2002 | Caruso et al. | |
| 2002/0093233 A1 | 7/2002 | Chu | |
| 2002/0190564 A1 | 12/2002 | Coffield | |
| 2003/0107252 A1 | 6/2003 | Kinoshita | |
| 2004/0007910 A1 | 1/2004 | Skelly | |
| 2004/0100139 A1 | 5/2004 | Williams | |
| 2004/0140701 A1 | 7/2004 | Schmitz | |
| 2004/0183348 A1 | 9/2004 | Kniese | |
| 2004/0195882 A1 | 10/2004 | White | |
| 2004/0256899 A1 | 12/2004 | Moore et al. | |
| 2005/0001464 A1 | 1/2005 | Caruso | |
| 2005/0062323 A1 | 3/2005 | Dicks | |
| 2005/0104428 A1 | 5/2005 | Walker et al. | |
| 2006/0033369 A1 | 2/2006 | Eysing | |
| 2006/0103208 A1 | 5/2006 | Schmitz | |
| 2006/0181126 A1 | 8/2006 | Eysing | |
| 2006/0255635 A1 | 11/2006 | Iijima et al. | |
| 2007/0004243 A1 | 1/2007 | Ferguson-Pell et al. | |
| 2007/0262634 A1 | 11/2007 | Brill | |
| 2009/0085388 A1 | 4/2009 | Parker | |
| 2010/0117433 A1 | 5/2010 | Cassaday | |
| 2012/0025574 A1 | 2/2012 | Wilkinson et al. | |
| 2012/0061988 A1 | 3/2012 | Jaranson et al. | |
| 2012/0200018 A1 | 8/2012 | Paz | |
| 2013/0221724 A1 | 8/2013 | Fowler | |
| 2013/0257125 A1 | 10/2013 | Bellingar et al. | |
| 2014/0070587 A1 | 3/2014 | Aldricj et al. | |
| 2014/0110983 A1 | 4/2014 | Sander et al. | |
| 2014/0117732 A1 | 5/2014 | Bachar | |
| 2014/0152064 A1 | 6/2014 | Sander et al. | |
| 2014/0159450 A1 | 6/2014 | Guering | |
| 2014/0159455 A1 | 6/2014 | Thomaschewski et al. | |
| 2014/0183914 A1 | 7/2014 | Cvek | |
| 2014/0265493 A1 | 9/2014 | Machael | |
| 2015/0265058 A1 | 9/2015 | Igarashi | |
| 2015/0329027 A1 | 11/2015 | Axakov | |
| 2016/0029801 A1 | 2/2016 | Potrykus | |
| 2016/0037931 A1 | 2/2016 | Wu | |
| 2016/0100691 A1 | 4/2016 | Masunaga | |
| 2016/0135603 A1 | 5/2016 | Chan | |
| 2017/0036589 A1 | 2/2017 | White et al. | |
| 2018/0043805 A1 | 2/2018 | Baek et al. | |
| 2018/0070736 A1 * | 3/2018 | Achten | A47C 23/002 |
| 2018/0071979 A1 * | 3/2018 | Achten | B33Y 10/00 |
| 2018/0084914 A1 | 3/2018 | Deevers | |
| 2018/0251919 A1 | 9/2018 | Mankame et al. | |
| 2018/0280216 A1 | 10/2018 | Mascull | |
| 2018/0280218 A1 * | 10/2018 | Yamaji | A61B 5/6892 |
| 2019/0150621 A1 | 5/2019 | Deevers et al. | |
| 2019/0254439 A1 | 8/2019 | Achten et al. | |
| 2019/0274431 A1 * | 9/2019 | Kumazawa | A47C 7/002 |
| 2021/0078453 A1 * | 3/2021 | Meier | B64D 11/0611 |
| 2021/0235872 A1 | 8/2021 | Koch | |
| 2021/0237634 A1 * | 8/2021 | Maloney | A47C 7/467 |
| 2022/0248857 A1 * | 8/2022 | Grathwol | A47C 7/5066 |
| 2022/0395109 A1 * | 12/2022 | Prince, Jr. | A47C 31/123 |

FOREIGN PATENT DOCUMENTS

| | | | |
|---|---|---|---|
| DE | 3405178 A1 | 8/1985 | |
| DE | 4316057 A1 | 11/1994 | |
| DE | 102007054257 A1 | 5/2009 | |
| DE | 102008009509 A1 | 8/2009 | |
| DE | 102013219250 A1 | 3/2014 | |
| EP | 0 225 299 A2 | 6/1987 | |
| EP | 2110052 B1 | 10/2009 | |
| FR | 2840786 A1 | 12/2003 | |
| JP | 2009268780 A | 11/2009 | |
| JP | 5242088 B2 | 7/2013 | |
| WO | WO 96/14003 A1 | 5/1996 | |
| WO | WO 01/74199 A1 | 10/2001 | |
| WO | WO 2015/171856 A1 | 11/2005 | |
| WO | WO 2007/067997 A1 | 6/2007 | |
| WO | WO 01/98105 A1 | 12/2007 | |
| WO | WO 2008/148992 A1 | 12/2008 | |
| WO | WO 2014/047242 A1 | 3/2014 | |
| WO | WO 2016/205122 A1 | 12/2016 | |
| WO | WO 2017/135831 A1 | 8/2017 | |
| WO | WO 2019/064321 A1 | 4/2018 | |

OTHER PUBLICATIONS

Aremu, A.O. et al., "A voxel-based method of constructing and skinning conformal and functionally graded lattice structures suitable for additive manufacturing", *Additive Manufacturing*, vol. 13, 2017, pp. 1-13.

Wu, et al., "Design and Optimization of Conforming Latttice Structures", obtained from the Internet: www.semion.io/doc/design-and-optimization-of-conforming-lattice-structures, dated May 8, 2019, 15 pgs.

Extended European Search Report for EP Application No. 20865593.6 dated Sep. 4, 2023 (8 pages).

* cited by examiner

BODY SUPPORT MEMBER WITH LATTICE STRUCTURE

This application is a continuation of U.S. application Ser. No. 17/022,957, filed Sep. 16, 2020 and now U.S. Pat. No. 11,324,323 B2, which claims the benefit of U.S. Provisional Application No. 62/902,187, filed Sep. 18, 2019 and entitled "Body Support Member With Lattice Structure," the entire disclosure of which are hereby incorporated herein by reference.

FIELD OF THE INVENTION

The present application relates generally to a body support structure such as a chair, and more specifically to a body support structure including one or more lattice structures.

BACKGROUND

Body supporting structures, including for example, office chairs, vehicular and aircraft seating, sofas, beds and other pieces of furniture, are typically configured with internal or external support frames having hard contact points. For example, seats and backrests may be made with a resilient membrane or shell structure, which are typically supported by a rigid, peripheral frame surrounding the membrane or shell structure. The frame presents hard contact points, precludes flexing of the backrest or seat at the periphery thereof, and may also prevent twisting, or torsional movement, about a longitudinal axis of the backrest or seat. In other chairs, the backrest or seat may be configured with a rigid, central spine allowing for some twisting about a longitudinal axis, but with the connection of the spine to the body support member producing hard, contact points. In yet another type of chair, the backrest or seat may be configured with a rigid shell, which supports a cushion or other resilient body support member.

In many of these conventional seating structures, the rigidity of the frame or shell limits the ability of the body support structure to flex and support the body of the user as the user moves within the seating structure. Moreover, the hard contact points, or lack of flexibility at the edge of the seating structure, combined with the restrictions imposed by the frame, spine and/or rigid shell, limit the comfort and ergonomic responsiveness of the seating structure.

In addition, conventional chairs typically include multiple assemblies and parts, including for example one or more backrests, seats, tilt controls, armrests, pneumatic column/springs, and the like, each of which must be individually assembled, and then collectively assembled into a final product configuration. Often, subassemblies are made at remote locations, or by outside vendors, which requires additional shipping, inventory and transportation costs, which may be exacerbated by relatively heavy metal parts. For example, a convention tilt control may include dozens of parts, including various metal parts that must be stamped or cast, which are then assembled using various mechanical fasteners or welding. The manufacturing and assembly process may involve complex and expensive tooling, which is difficult to modify and adapt to other assemblies.

SUMMARY

The present invention is defined by the following claims, and nothing in this section should be considered to be a limitation on those claims.

In one aspect, one embodiment of a body support structure includes a plurality of spaced apart support members defining opposite first and second surfaces, wherein adjacent support members define openings between sides of the adjacent support members. A plurality of spaced apart base members define opposite first and second surfaces, wherein the first surfaces of the base members face toward and are spaced apart from the second surfaces of the support members such that the plurality of support members and the plurality of base members define a space therebetween. Each of the base members underlies at least portions of the openings defined by at least two adjacent support members, and adjacent base members define openings between sides of the adjacent base members. A plurality of connectors extend across the space and connect each base member with the at least two adjacent support members. Each connector defines a first acute angle relative to the second surface of the respective support member and a second acute angle relative to the first surface of the base member.

In yet another aspect, one embodiment of a body support structure includes a field array having a plurality of spaced apart support members arranged in a plurality of rows and a plurality of columns. Each of the rows has the same number (n1) of support members, and each of the columns has the same number (n2) of support members. At least one of the rows has a first width and at least another one of the rows has a second width, wherein the first and second widths are different. At least one of the columns has a first length and at least another one of the columns has a second length, wherein the first and second lengths are different. A perimeter array defines a closed ring surrounding the field array. The perimeter array includes first and second rows of spaced apart support members connected to opposite outermost end rows of the field array, and first and second columns connected to opposite outermost end columns of the field array. The first and second rows and the first and second columns of the perimeter array are connected, and wherein the first and second rows of the perimeter array comprise n1 support members and wherein the first and second columns of the perimeter array comprise n2 support members. The support members in the field array and perimeter array are connected.

In yet another aspect, one embodiment of a body support structure includes a field array having a plurality of spaced apart support members arranged in a plurality of rows and a plurality of columns, wherein each of the rows has n1 support members, and wherein each of the columns has n2 support members. The outermost periphery of the field array has n3 support members, wherein $n3=2*n1+(2*(n2-2))$. At least one of the rows has a first width and at least another one of the rows has a second width, wherein the first and second widths are different. At least one of the columns has a first length and at least another one of the columns has a second length, wherein the first and second lengths are different. A perimeter array defines a closed ring surrounding and connected to the field array. The perimeter array includes first and second rows of spaced apart support members connected to opposite outermost end rows of the field array, and first and second columns connected to opposite outermost end columns of the field array. The first and second rows and first and second columns of the perimeter array have n4 support members, wherein $n4=(2*n2)+(2*n1)$. The support members in the field array and perimeter array are connected.

In yet another aspect, one embodiment of a body support structure includes a structural lattice structure having a first stiffness, and a compressive lattice structure supported by the structural lattice structure and having a second stiffness less than the first stiffness. The compressive lattice structure is compressible in response to a first normal force applied thereto. A skin lattice structure is supported by the compressive lattice structure, wherein the skin lattice structure is resistant to shear deformation in response to a second normal force applied thereto, and wherein the skin lattice structure is expandable in a direction transverse to the second normal force applied thereto in response to the second normal force being applied thereto.

In yet another aspect, one embodiment of a body support structure includes a base structure, a body support member and a strut. The strut includes spaced apart first and second end portions coupled to the body support member and base structure respectively and an intermediate compressive lattice structure connected to the first and second end portions. The first and second end portions are moveable between a nominal position and a compressed position, wherein the compressive lattice structure is compressible between a nominal configuration and a compressed configuration corresponding to the nominal and compressed positions. The compressive lattice structure applies a biasing force to the first and second end portions when in the compressed configuration.

In yet another aspect, one embodiment of a body support structure includes a base structure and a body support member coupled to the base structure. At least one of the base structure and body support structure includes a lattice structure having an integrated kinematic feature. In various embodiments, the integrated kinematic feature may include a movement limiter, locking system, component connector and/or biasing member.

In yet another aspect, one embodiment of a method of manufacturing any of the body support structures disclosed herein includes forming the structural lattice structure, the compressive lattice structure and the skin lattice structure by additive manufacturing. In one embodiment, the additive manufacturing is performed by 3-D printing. In one embodiment, the method includes integrally forming the structural lattice structure, compressive lattice structure and skin lattice structure during a single 3-D printing operation.

In yet another aspect, one embodiment of a body support structure includes a plurality of spaced apart support members defining opposite first and second surfaces, wherein adjacent support members define openings between sides of the adjacent support members. A plurality of spaced apart base members define opposite first and second surfaces, wherein the first surfaces of the base members face toward and are spaced apart from the second surfaces of the support members such that the plurality of support members and the plurality of base members define a space therebetween. Each of the base members underlies at least portions of the openings defined by at least two adjacent support members, and adjacent base members define openings between sides of the adjacent base members. A plurality of connector legs extend across the space and connect each base member with the at least four adjacent support members, and with each support member connected to at least four adjacent base members. At least some of the connector legs have a different length than other connector legs, wherein the spaces between at least some of the connected support members and base members are different from the spaces between other connected support members and base members. A first region includes longer connector legs connecting the base members and support members, while a second region includes shorter connector legs connecting the base members and support members. The first and second regions may have different stiffnesses, for example with the second region being stiffer than the first region.

In one embodiment, an edge portion is connected to and surrounds the base members and support members. In one embodiment, the edge portion may be tapered.

The various embodiments of body support structures and methods provide significant advantages over other body support structures, and methods for the manufacture and assembly thereof. For example and without limitation, the body support structures provides an overall compliant structure, which may be configured with a soft interface portions, for example at outer peripheral edges and along a front, thigh-supporting portion. Moreover, changes in the configuration of one or more components, or the entire chair, may be made quickly and easily through software/programming changes, rather than by complex and expensive retooling. Indeed, the need for tooling may be eliminated entirely. Shipping costs may be greatly reduced as the entire body support structure may be made at a single location, with such manufacturing sites being strategically located at various geographic locations proximate the end user or point-of-sale/delivery.

The foregoing paragraphs have been provided by way of general introduction, and are not intended to limit the scope of the following claims. The various preferred embodiments, together with further advantages, will be best understood by reference to the following detailed description taken in conjunction with the accompanying drawings.

DETAILED DESCRIPTION OF THE PRESENTLY PREFERRED EMBODIMENTS

Figure 1:
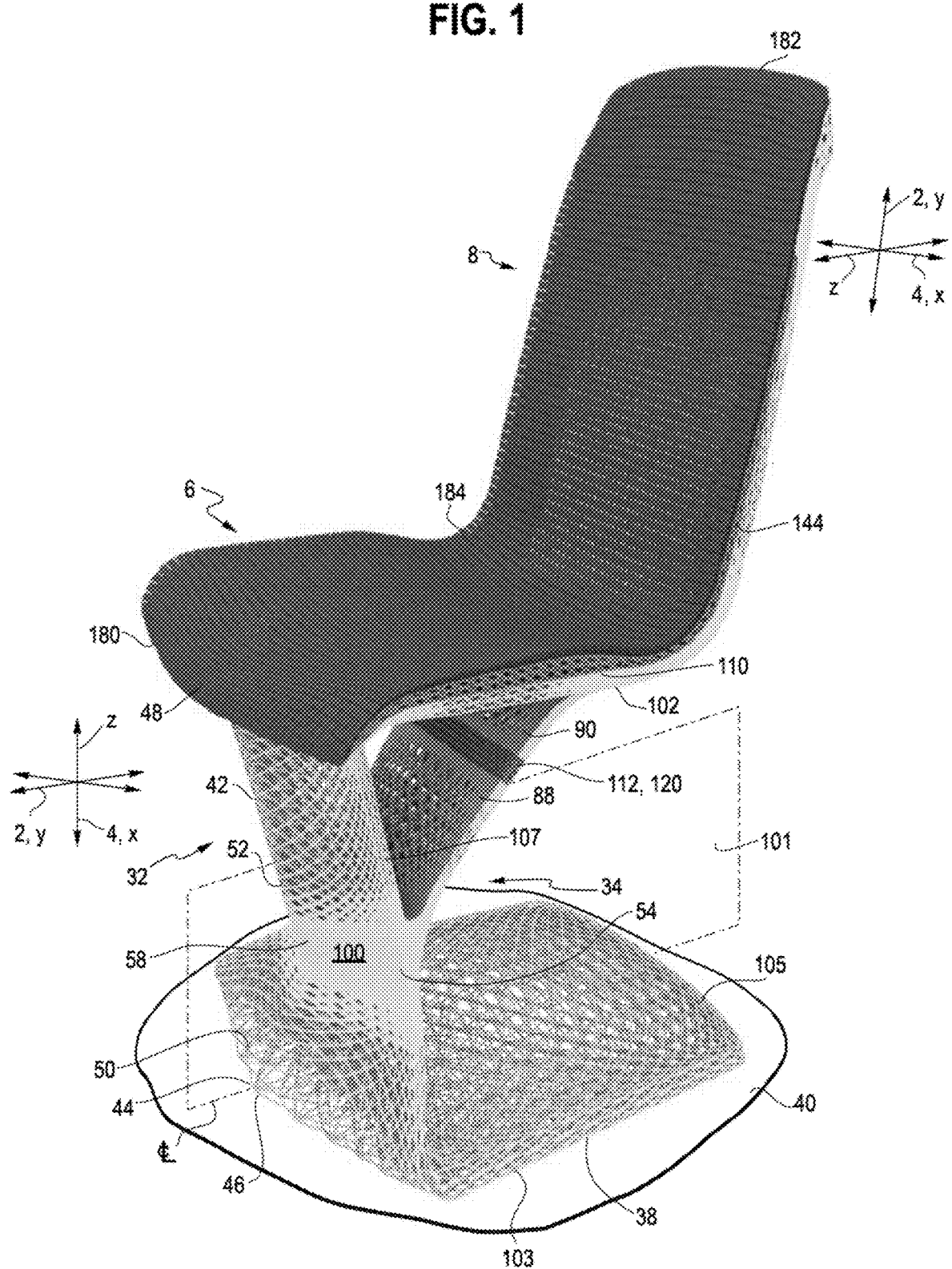
FIG. 1 is a front perspective view of one embodiment of a body support structure.
Figure 2:
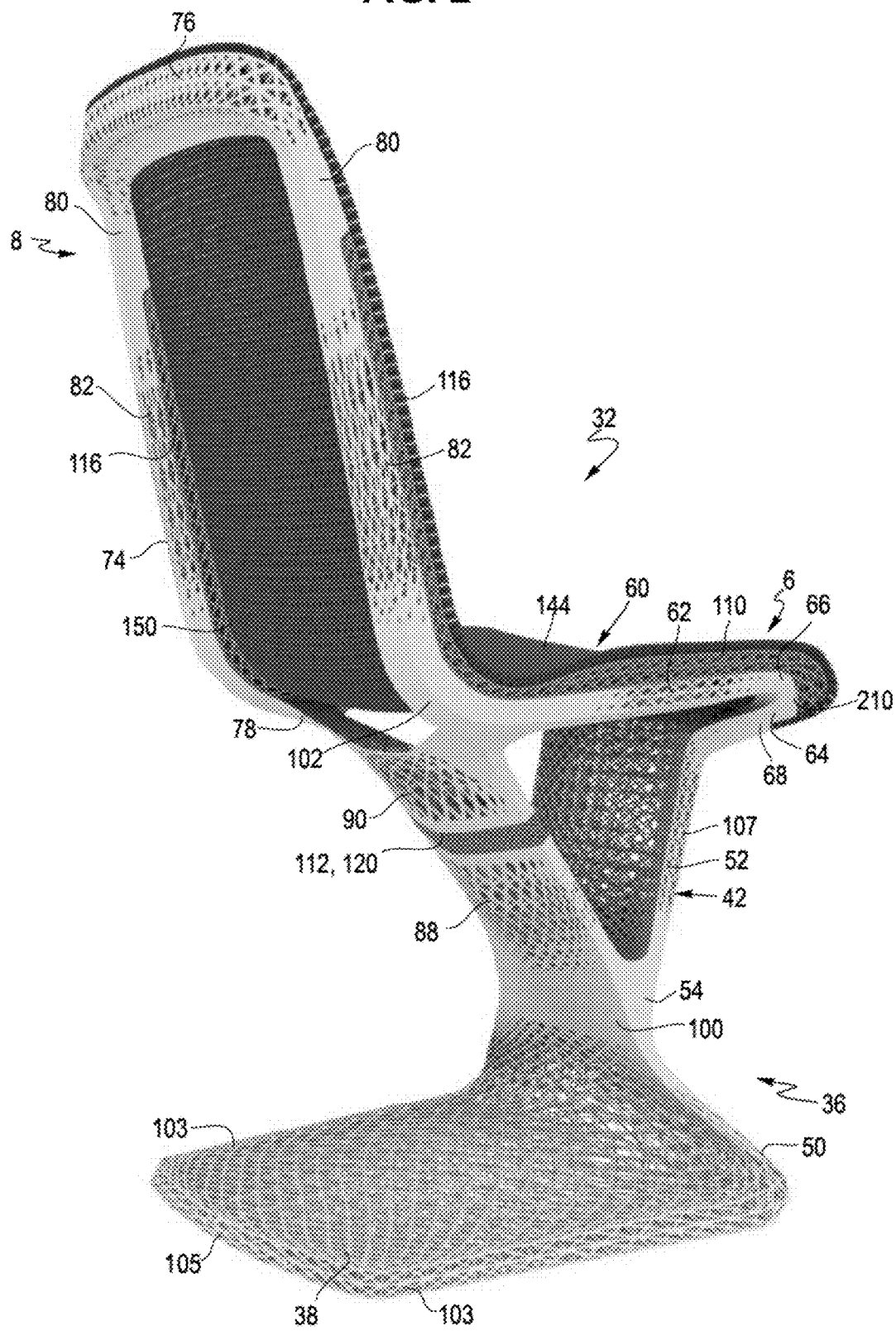
FIG. 2 is a rear perspective view of the body support structure shown in FIG. 1.

It should be understood that the term "plurality," as used herein, means two or more. As shown in FIG. 1, the term "longitudinal," as used herein, means of or relating to a length or lengthwise direction 2, for example a direction running from a top to bottom of a backrest 8, or a front to back of a seat 6, and vice versa (bottom to top and back to front). The term "lateral," as used herein, means situated on, directed toward or running in a side-to-side direction 4 of the backrest or seat. The term "coupled" means connected to or engaged with whether directly or indirectly, for example with an intervening member, and does not require the engagement to be fixed or permanent, although it may be fixed or permanent. The terms "first," "second," and so on, as used herein, are not meant to be assigned to a particular component or feature so designated, but rather are simply referring to such components and features in the numerical order as addressed, meaning that a component or feature designated as "first" may later be a "second" such component or feature, depending on the order in which it is referred. It should also be understood that designation of "first" and "second" does not necessarily mean that the two components, features or values so designated are different, meaning for example a first direction may be the same as a second direction, with each simply being applicable to different components or features. The terms "upper," "lower," "rear," "front," "fore," "aft," "vertical," "horizontal," and variations or derivatives thereof, refer to the orientations of the exemplary body support structure as shown in FIGS. 1 and 2. The phrase "body support structure" refers to a structure that supports a body, including without limitation office furniture, home furniture, outdoor furniture and vehicular seating, including automotive, airline, marine and passenger train seating, and may include without limitation beds, chairs, sofas, stools, and other pieces of furniture or types of seating structures. The directions X, Y and Z are defined as shown in FIG. 1, with the X direction being normal to the seat and backrest, the X direction coinciding with the lateral direction 4 of the seat and backrest and the Y direction coinciding with the longitudinal direction 2 of the seat and backrest.

Lattice Structure:

The term "lattice" refers to a three-dimensional structure having a matrix of nodes 16 and struts/beams/legs 18 extending between and connecting the nodes 16 (see FIG. 30), with the nodes and struts being arranged to provide high-strength and low mass mechanical properties, which provides significant weight reductions while maintaining a requisite overall structural integrity. The lattice structure provides excellent ventilation and air circulation properties. Various components of a body support structure 32 may include regions that are latticed, while other regions may remain solid, or non-latticed, as further explained below.

Figure 19:
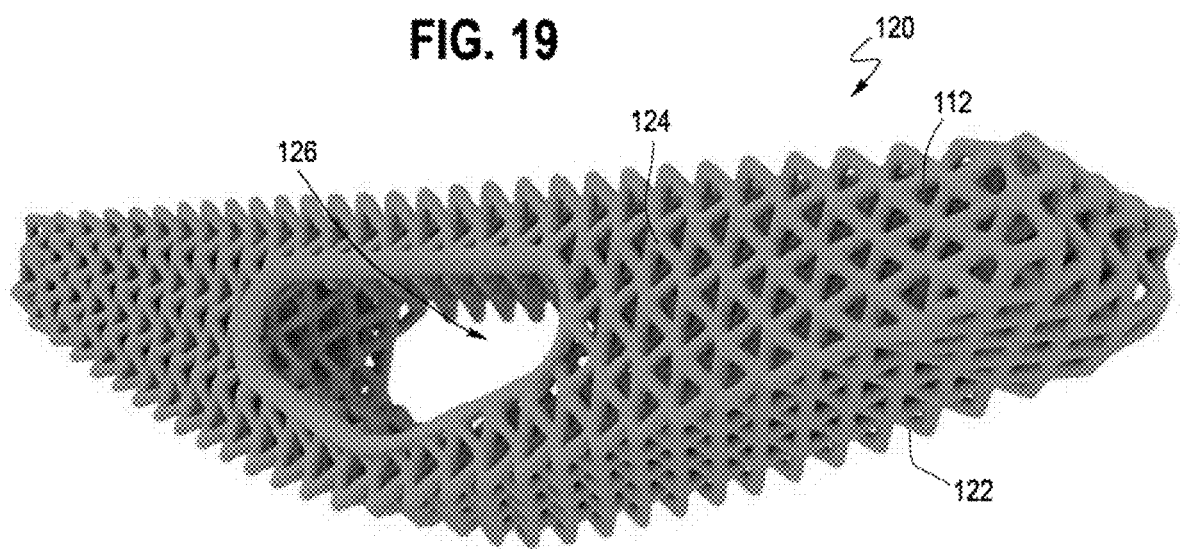
FIG. 19 is a top perspective view of the compressive lattice structure incorporated into the strut shown in FIGS. 16 and 17.

The core unit 12 of the lattice, or cell, shown for example in FIG. 19, may be repeated to define the overall lattice structure. Some exemplary cell structures are cubic, star, octet, hexagonal, diamond and tetrahedron. The cell structures may be individually varied or tuned and integrated or mixed to achieve the desired response, shape and overall performance of the lattice structure. Some cell structures may have higher stiffness-to-weight ratios while others may provide other properties, such as the ability to absorb or dampen energy. Cell size and density refer to the size of an individual unit cell and how many cells are repeated within a space. The size of the cell is a function of the dimensions (e.g., thickness and length) of the nodes and beams/legs. The material and density of the lattice structure, along with the orientation of the cells and structure, may have an effect on the properties of the lattice. The intrinsic structural properties of the lattice are determined by the architecture of the unit cell, including the dimensions and shape of the legs, the overall size of the cell and the density of the cells. In a preferred embodiment, the lattice structure conforms to the shape of the structure, meaning the orientation of the cells may change to accommodate the intended properties. For example, a compressive lattice structure is oriented to provide compressibility in the vertical direction in a seat region, but is oriented to provide compressibility in the horizontal direction in the backrest direction, such that the loads are absorbed in the Z direction of the seat and backrest. In this way, the orientation of the lattice structure conforms to the shape of the seat/backrest, and changes as the lattice structure fills the arbitrary geometric shape. The lattices are thereby aligned with the load/stress directions, which improves the overall structural performance of the structure.

The inherent complex nature of lattices makes them ideally suited for additive manufacturing, which may be performed for example by 3-D printing. Some exemplary 3D printing technologies include Fused Deposition Modeling (FDM), Stereolithography (SLA), Digital Light Processing (DLP), Selective Laser Sintering (SLS), Selective Laser Melting (SLM), Electron Beam Melting (EMB), Laminated Object Manufacturing (LOM), Binder Jetting (BJ), Digital Light Synthesis (DLS), Multi Jet Fusion (MJF), Digital Light Synthesis (DLS), Multi Jet Fusion (MJF) and Material Jetting/Wax Casting.

Figure 20:
FIG. 20 is a rear view of one embodiment of a skin lattice structure.
Figure 30:
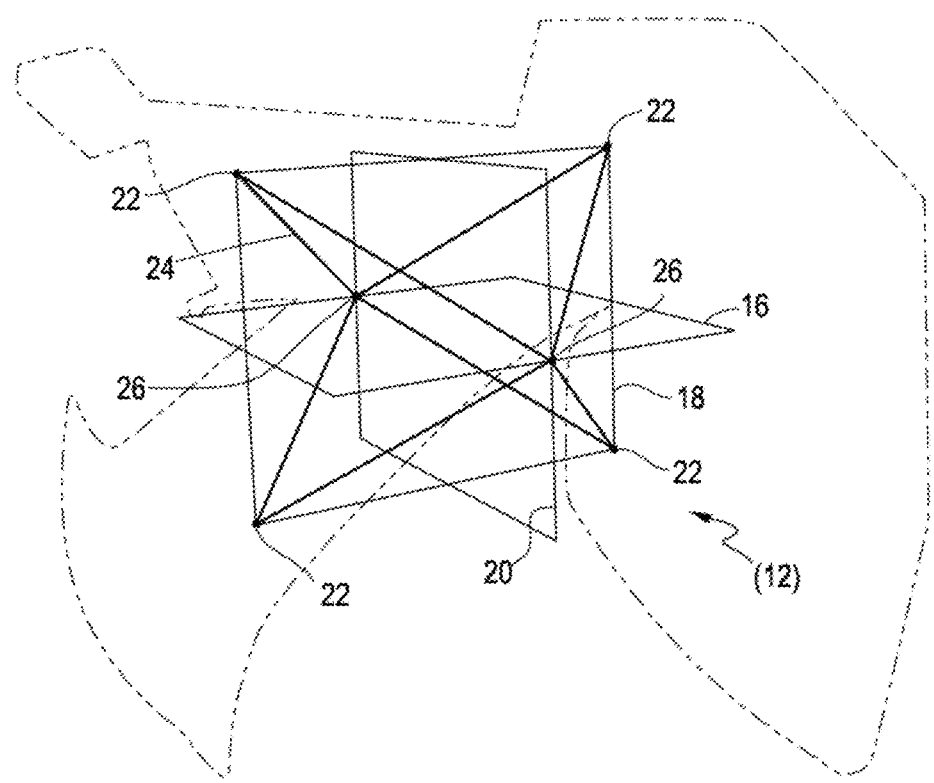
FIG. 30 is a schematic of a lattice core unit.

As shown in FIG. 30, for example, a compressive lattice structure may incorporate three intersecting and orthogonal rectangles 16, 18, 20 that define nodes 22 at four corners of a first rectangle 18 and a pair of nodes 26 at the intersection of the other two rectangles 16, 20, with a pair of beams 24 extending between each of the corner nodes 22 and the pair of nodes 26. Referring to FIG. 20, a core unit with a face further includes a pair of nodes 28 arranged along two corners of one of the other rectangles 16, with beams 30 extending between the corner nodes 22, 28.

Body Support Structure

Referring to the drawings, FIGS. 1-17 and 29 *show* one embodiment of a body support structure 32, configured as a chair having a base 34, a seat 6 and a backrest 8. The base 34 includes a pedestal 36 having a bottom platform 38 that engages a floor 40 and an upright 42 extending upwardly from the platform 38. The platform 38 has a generally horizontal orientation, with a front edge 44 that tapers rearwardly from a centerline apex 46. In one embodiment, the front edge defines the forwardmost boundary or surface of the body support structure, while in another embodiment, a front edge 48 of the seat 6 defines a forwardmost boundary of the body support structure. The upright 42 includes a lower portion 50 that extends rearwardly and upwardly from the front edge 44, and an upper portion 52, that extends forwardly and upwardly from the lower portion 50. The lower portion has a first width (W1) adjacent the front edge and a second width (W2) adjacent a junction 54 with the upper portion, with the second width (W2) being less than the first width (W1). Both the lower and upper portions have a front surface that tapers rearwardly from a front centerline YZ plane 101, such that the upper and lower portions have a generally triangular cross-sectional shape. The taper of the front surface of the lower portion 50 and front edge 44 provide increased access for the user's feet and legs. At the same time, the cross-sectional shape of the upright, with the protruding centerline apex 58, provides increased resistance to bending about a horizontal, laterally extending X axis. The upright and base define a general L-shape from a side view, which creates an open space beneath the seat 6.

A seat support 60 is connected to the base along a top end 68 of the upper portion 52 of the upright 42. The seat support includes a pair of spaced apart beams 62 defining an opening 148 therebetween, and a pair of U or V shaped connectors 64 connecting forward portions 66 of each beam with the upper portion 52. The connectors 64 may flare outwardly and define a first flex region 210 or compliant joint, allowing the beams 62, which are rigid and resistant to bending, to pivot relative to the base 34 (and the upright 42 in particular) about a horizontal, laterally extending X axis. The beams 62 of the seat support are cantilevered rearwardly from the connectors 64 and flex region 210.

A back frame 70 is connected to the seat support along rear portions 72 of the beams 62 and extends upwardly from the seat support 60, with the back frame 70 having a pair of laterally spaced uprights 74 defining an opening 150 therebetween, and an upper cross member 76 connecting the upper ends of the uprights 74. The uprights 74 are connected to the rear portions 72 of the beams with a curved transition region 78, which defines a second flex region 212, or compliant joint, allowing the back frame 70 to pivot relative to the seat support 60. As shown in FIGS. 2, 4, 8 and 10, an upper portion 80 of the uprights and the cross member 76 have a greater width and thickness, such that those portions are more rigid than lower portions 82 of the uprights. The interface between the upper and lower portions defines a recess 84 having a depth (D1), which is filled with a compressive layer, which lies flush with the front surface of the uprights 74, as further explained below.

Figure 3:
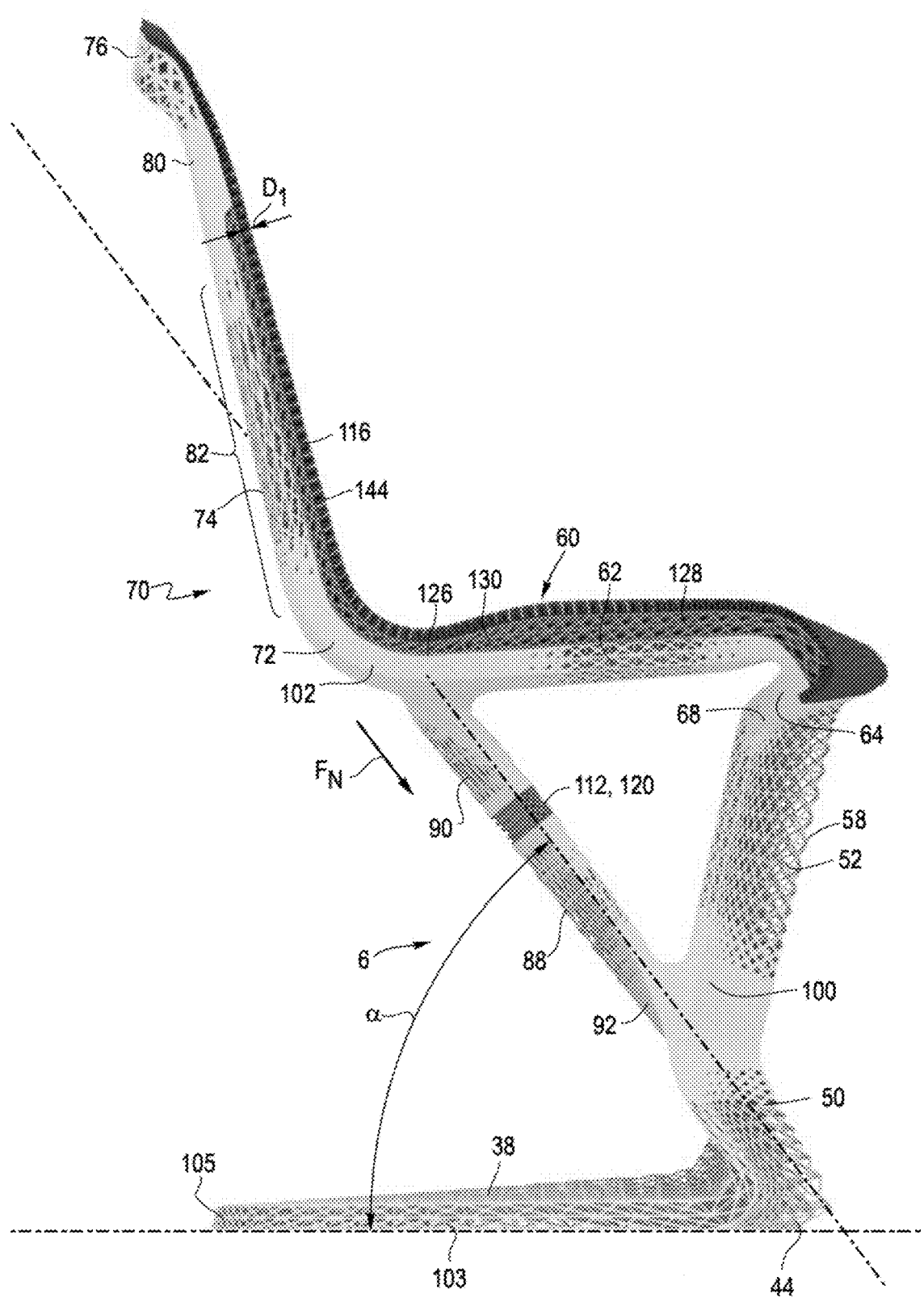
FIG. 3 is a right side view of the body support structure shown in FIG. 1, with a left side view being a mirror image thereof.

Referring to FIGS. 1-4, 8, 9, 16, 17 and 36, a strut 86 is disposed, or extends, between the base 34 and one of the seat support 60 and/or back frame 70, including the transition region 78. The strut includes a lower portion 88 and an upper portion 90. As shown in FIG. 3, a lower end 92 of the strut, or lower portion thereof, is connected to the upright at the junction 54 between the upper and lower portions of the upright, with the strut 86 angled at an angle α, which is generally the same orientation as the lower portion 50 relative to the platform 38, or a horizontal plane defined by the floor, such that axial loads applied by the strut 86 are efficiently transferred to the lower portion 50 and then to the platform 38. An upper end 94 of the strut, or upper portion thereof, is connected to the seat support 60, and in particular to the spaced apart beams 62 forwardly of the transition region 78. The strut is generally monolithic and extends along a centerline of the body support structure, although it should be understood that is may be configured as two or more laterally spaced struts connected to the beams respectively. The strut 86 spans the distance between the beams 62, thereby providing lateral stability to the beams, while also supporting a rear region of the beams 62 spaced longitudinally rearwardly from the flex region 210 defined by the connectors 64. The upper and lower portions 88, 90 of the strut are spaced apart, with one of the upper and lower portions having a post or guide member 96 extending into a channel or track 98 defined in the other of the upper and lower portions. The respective ends of the upper and lower portions facing each other may be configured with a cap, or other bearing surface 104, 106.

A use interface member 144 is secured across the openings 148, 150 defined between the beams 62 of the seat support and the uprights 74 of the back frame to define a seating surface of the seat 6 and backrest 8.

Structural Lattice Structure

Each of the base 34, strut 86, seat support 60 and back frame 70 may be formed entirely, or at least partially, from a structural lattice structure 108. The structural lattice structure is a bending resistant structure that is relative stiff, while a compressive lattice structure is a non-bending resistant structure, which is compliant and, although not stiff, absorbs energy well when compressed. The structural lattice structure has a first stiffness, which is the displacement measured along a degree of freedom (translationally or in bending) in response to an applied force. The stiffness is determined, or defined by, the lattice architecture and materials, for example the overall moment of inertia of the component or cross-section thereof, and the Young's modulus of elasticity associated with the material. When a lattice structure is loaded, whether in compression or bending, the structural lattice structure may undergo some elastic deformation, but remains relatively rigid except at predetermined flex regions, which are purposefully designed to allow for bending and flexing. The structural lattice structure is also conforming, meaning the architecture and orientation of the cells and lattice follows or conforms to the arbitrary external geometry of component, and is optimized to align with the stresses and loads applied to the structure.

As shown in FIGS. 1-6, the structural lattice structure 108 defining the platform, and portions of the lower and upper uprights 50, 52, follow a lateral gradient in the lateral direction 2, with the lattice structure being very open with larger spaces between the nodes along the centerline plane 101 of the upright and platform, and a more closed architecture, with smaller spaces between the nodes, along the side edges 103 and rear edge 105 of the platform, and along the side edges 107 of the upright 42, with the size of the cells gradually decreasing along the gradient. Solid (non-lattice) sections may also interconnect lattice sections, with the solid (non-lattice) section locations providing additional strength, or are located such that various components may be separately manufactured, for example by 3D printing, and then later assembled and connected. The solid (non-lattice) sections may contain attachment geometries, and may be configured with internal lattice structures surrounded by solid outer walls.

Figure 31:
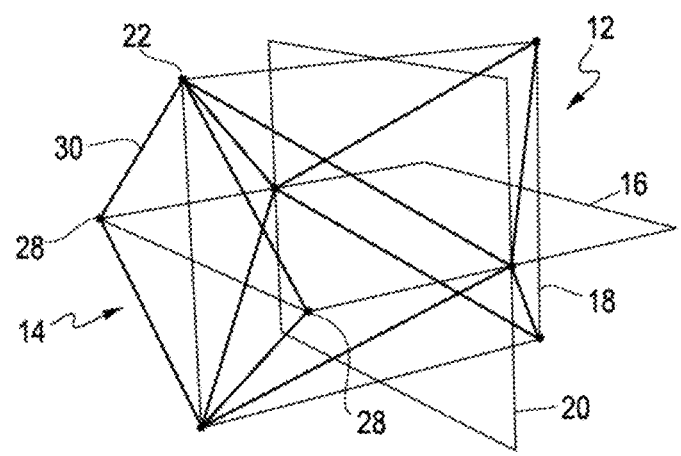
FIG. 31 is a schematic of a lattice core unit with a face.
Figure 32:
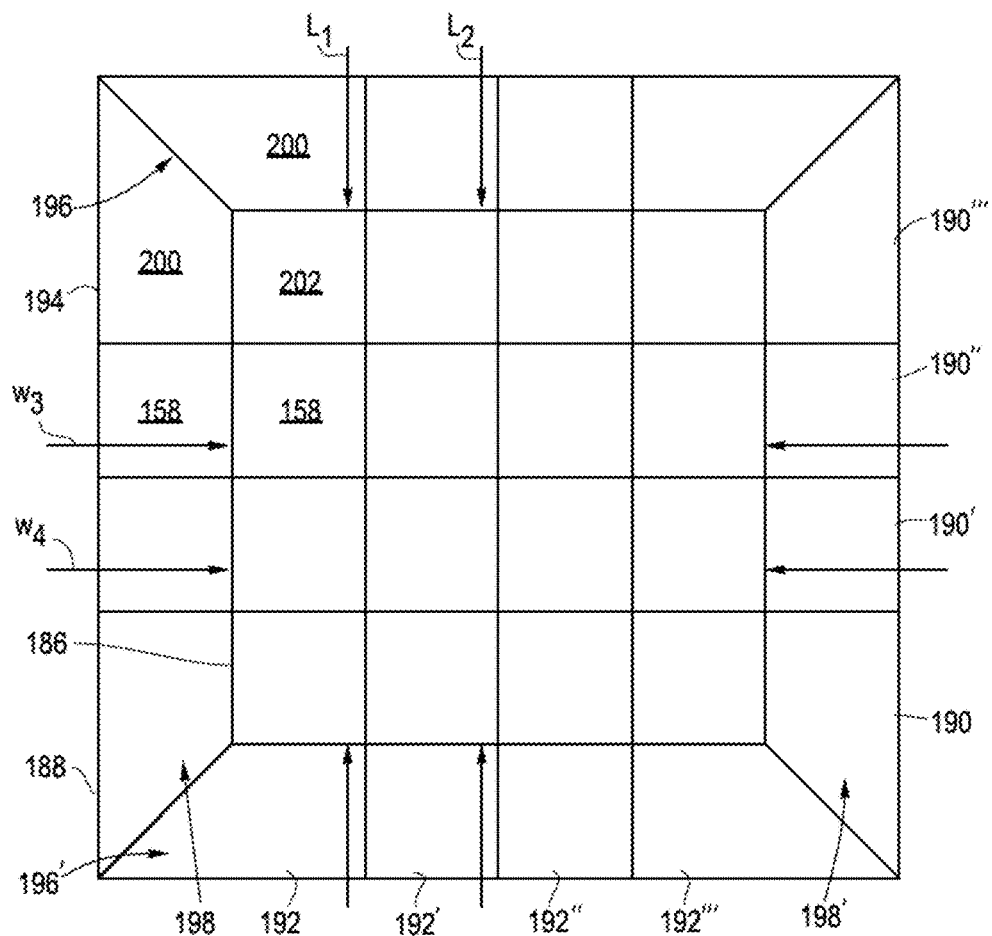
FIG. 32 is a schematic top view of a skin lattice structure field and perimeter arrays.

In one embodiment, as shown in FIGS. 1-5, 8-10 and 13-15, non-lattice structures 64, 100, 102 are positioned between portions of the structural lattice structure such that the structural lattice structure is discontinuous, for example with non-lattice structure 100 disposed between the structural lattice structure of the upper and lower portions 50, 52 of the upright even though the component is a single homogenous, integrally formed unit. Specifically, the base platform 38 and portions of the lower and upper portions 50, 52 of the upright are made from a structural lattice structure, while a non-lattice structure 100 defines the transition region between the upper and lower portion of the upright, and between the upright and the lower end of the strut, as well as the bearing surfaces 104, 106, guide 96 and track 98. Likewise, the connectors 64 may be made of a non-lattice structure, as well as the joint or transition 102 between the upper end of the strut and the seat support beams, as well as portions of the beams 62. The non-lattice structure is stronger than the structural lattice structure, and is ideally suited for the various joints interfacing between the components that may experience high loads and stresses due to bending. The non-lattice structure may include a solid or tubular structure, including for example one or more central openings with a surrounding peripheral wall. In one embodiment, the structural lattice structure and non-lattice structures have the same outermost profile, with the outmost surfaces thereof lying flush. The structural lattice structure and non-lattice structure may be made of the same materials and as a single, one-piece homogenous part, for example by additive manufacturing, including 3-D printing as further explained below. In one embodiment, the structural lattice structure is made of polyethylene, or other relatively stiff materials such as metal. Other materials include thermoplastic elastomers, such as TPE and TPU. In one embodiment, the structural lattice structure is made of 30% GF Nylon, with a Young's modulus of 700 ksi or more. The structural lattice structure, and/or the non-lattice structure, provide for isolated compliance, or are configured to provide specific flex zones/compliance joints to allow for movement between components, for example between the seat and base, or between the backrest and seat, while remaining rigid and stiff in other regions and areas. The structural lattice structure may include a core unit and a core unit with a face along the outermost surfaces thereof as shown in FIGS. 30 and 31, with the orientation of the core unit arranged such that the structural lattice structure is stiff and oriented to carry the loads applied thereto, for example with properties similar to an injection molded component.

Compressive Lattice Structure:

Referring to FIGS. 1-12, and 16, the seat 6 and backrest 8 further include a first compressive member 110 having a pair of laterally spaced beams 114 overlying and supported by the seat support beams 62, a pair of laterally spaced uprights 116 extending transverse to the beams 114 and upwardly along a front surface of the back frame uprights 74, and a front cross member 118 extending laterally between the front ends of the beams 114 proximate the front of the seat. In this way, the compressive member has a lower U-shaped portion a pair of uprights extending upwardly from the lower portion and defining a generally forklift carriage shape with tines defined by the uprights 116. The uprights 116 fill the recess 84 formed by the back frame uprights and provide a flush surface with the upper portion 80 of the back frame 70.

Referring to FIGS. 1-4, 16-19 and 36, a second compressive member 120 is disposed between the upper and lower portions 88, 90 of the strut, and has upper and lower surfaces 122, 124 abutting the bearing surfaces 104, 106. The second compressive layer has a central through opening 126, through which the guide 96 is disposed.

Figure 4:
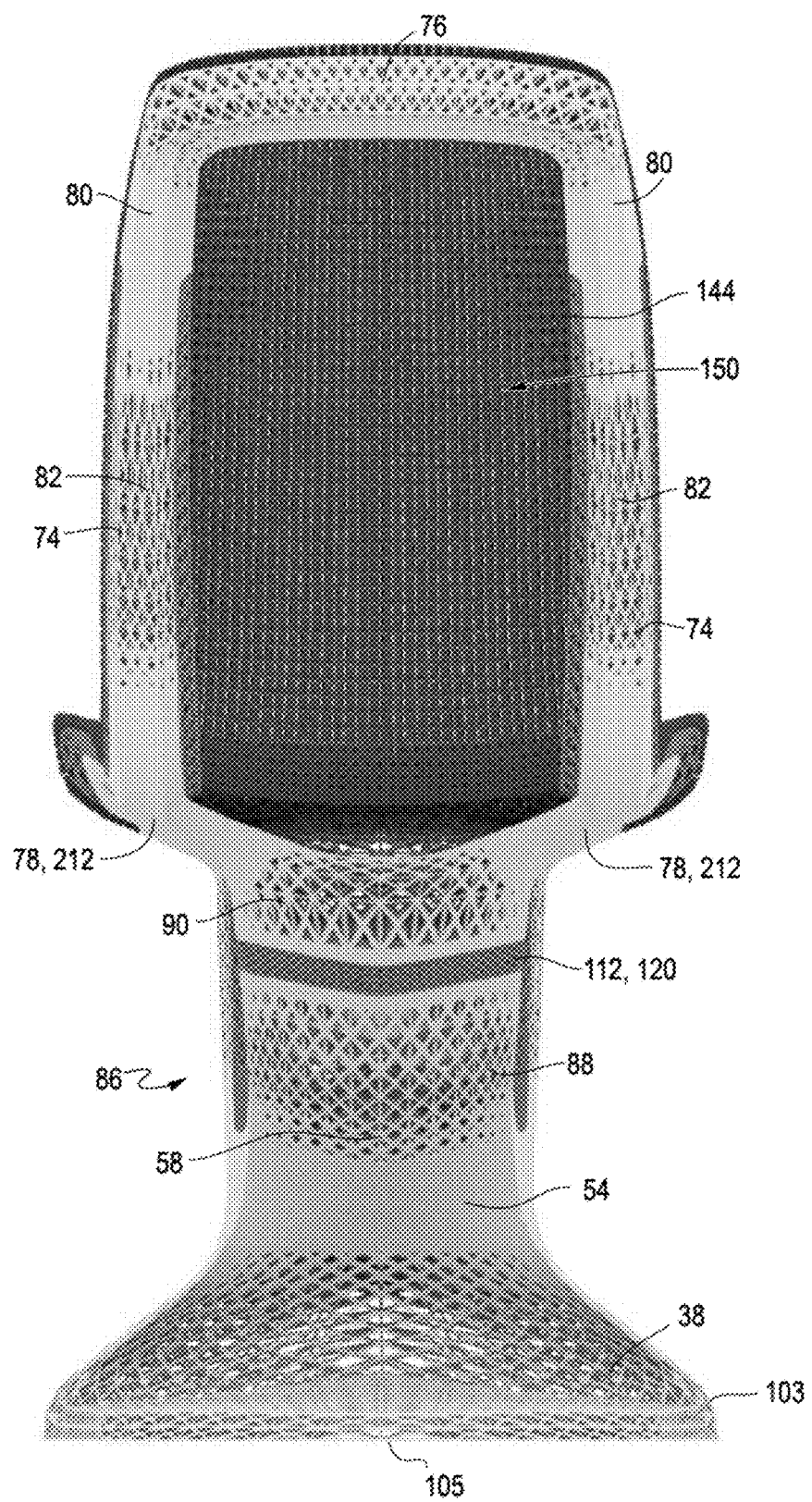
FIG. 4 is a rear view of the body support structure shown in FIG. 1.
Figure 5:
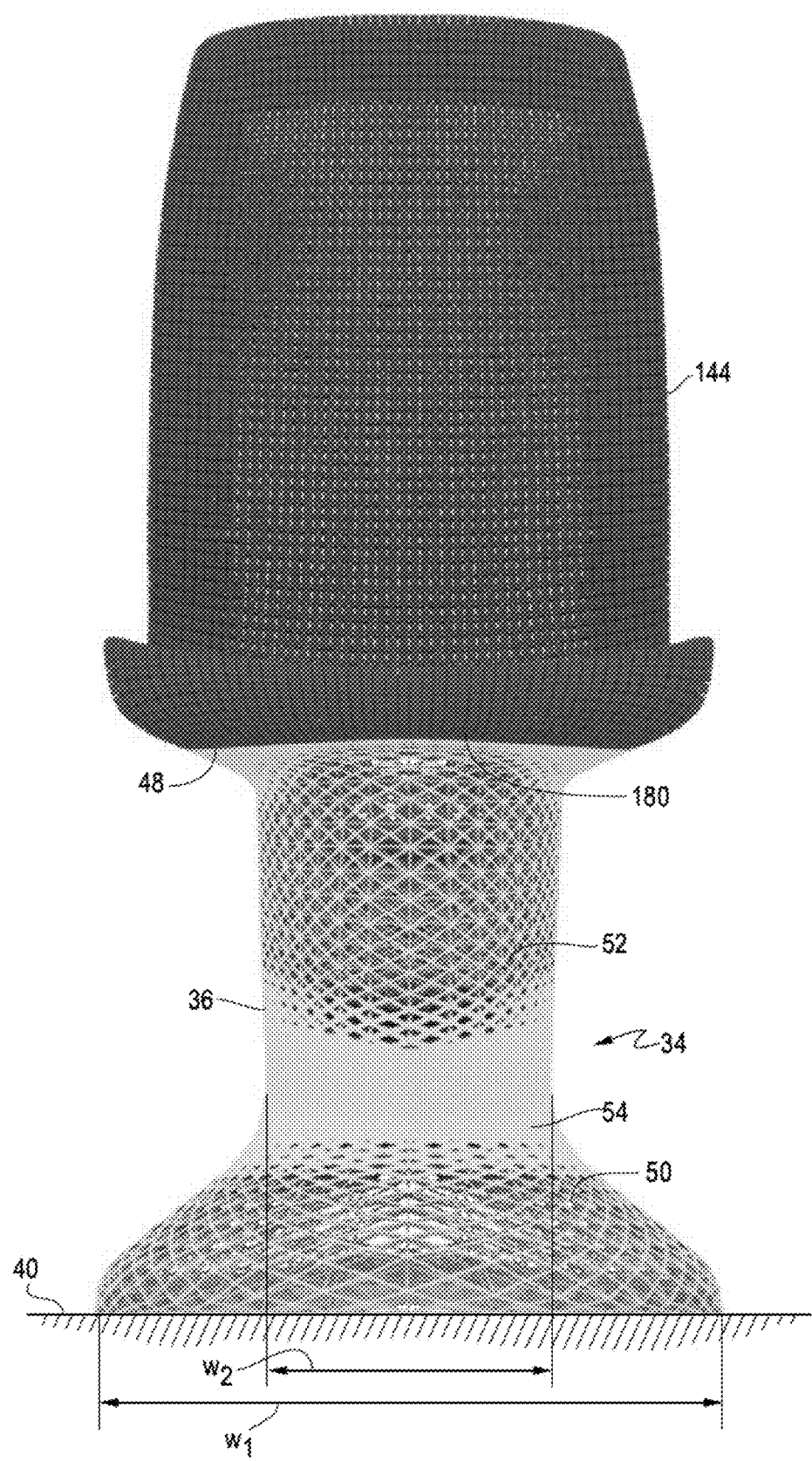
FIG. 5 is a front view of the body support structure shown in FIG. 1.
Figure 6:
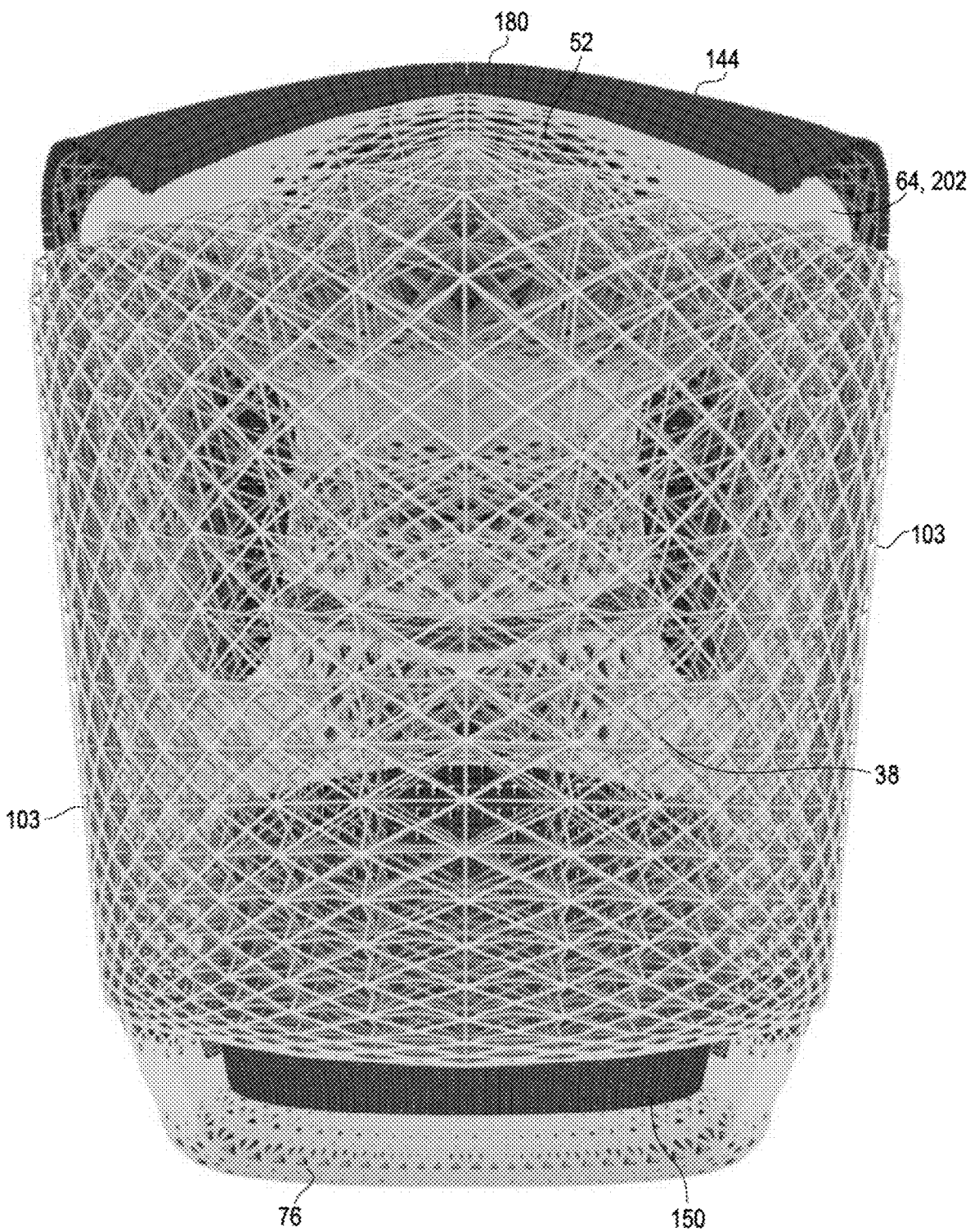
FIG. 6 is a bottom view of the body support structure shown in FIG. 1.
Figure 7:
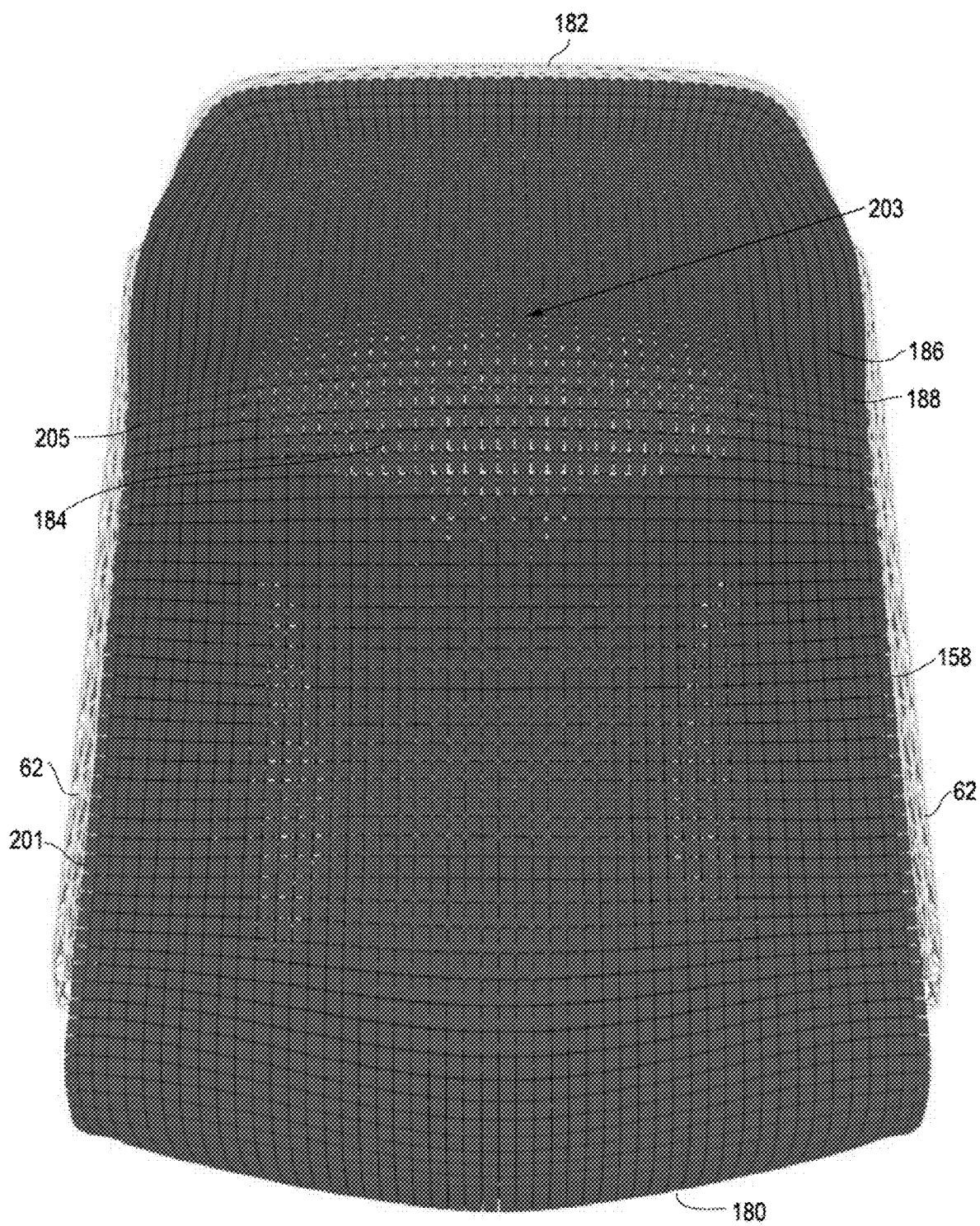
FIG. 7 is a top view of the body support structure shown in FIG. 1.
Figure 8:
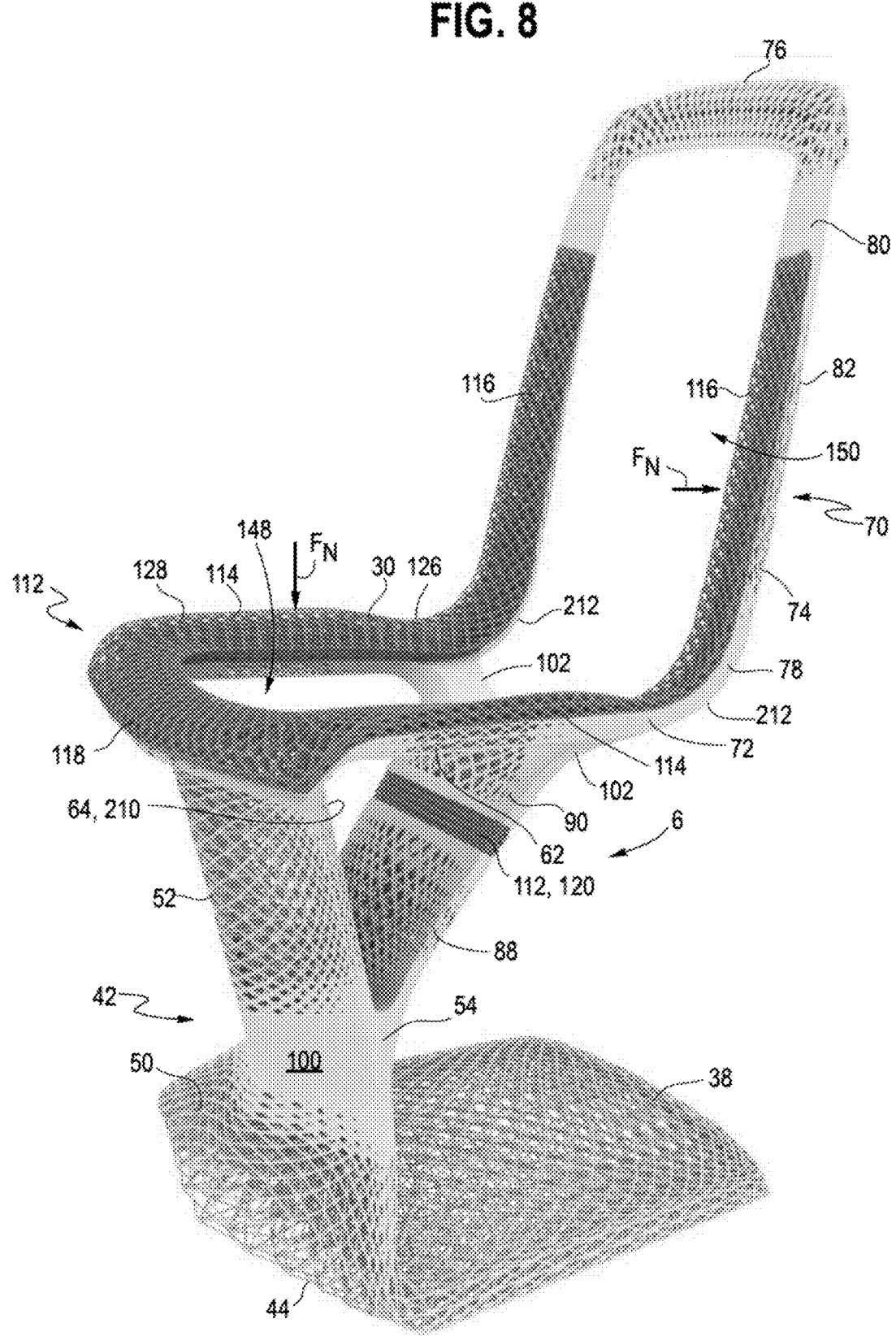
FIG. 8 is a perspective view of a body support structure having a without a skin lattice structure applied thereto.
Figure 9:
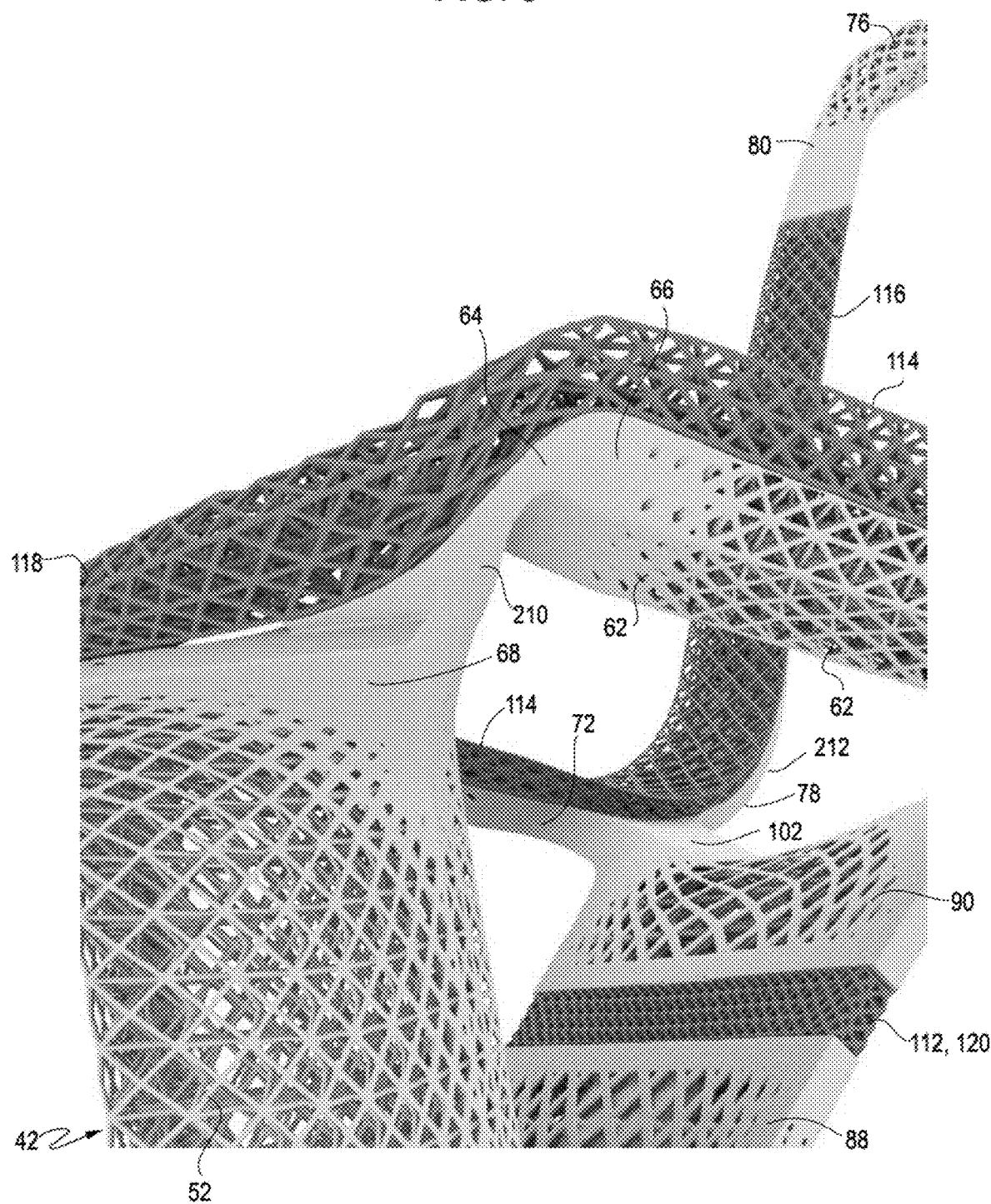
FIG. 9 is a partial, enlarged view of a portion of a body support structure including a structural lattice structure and compressive lattice structure.
Figure 10:
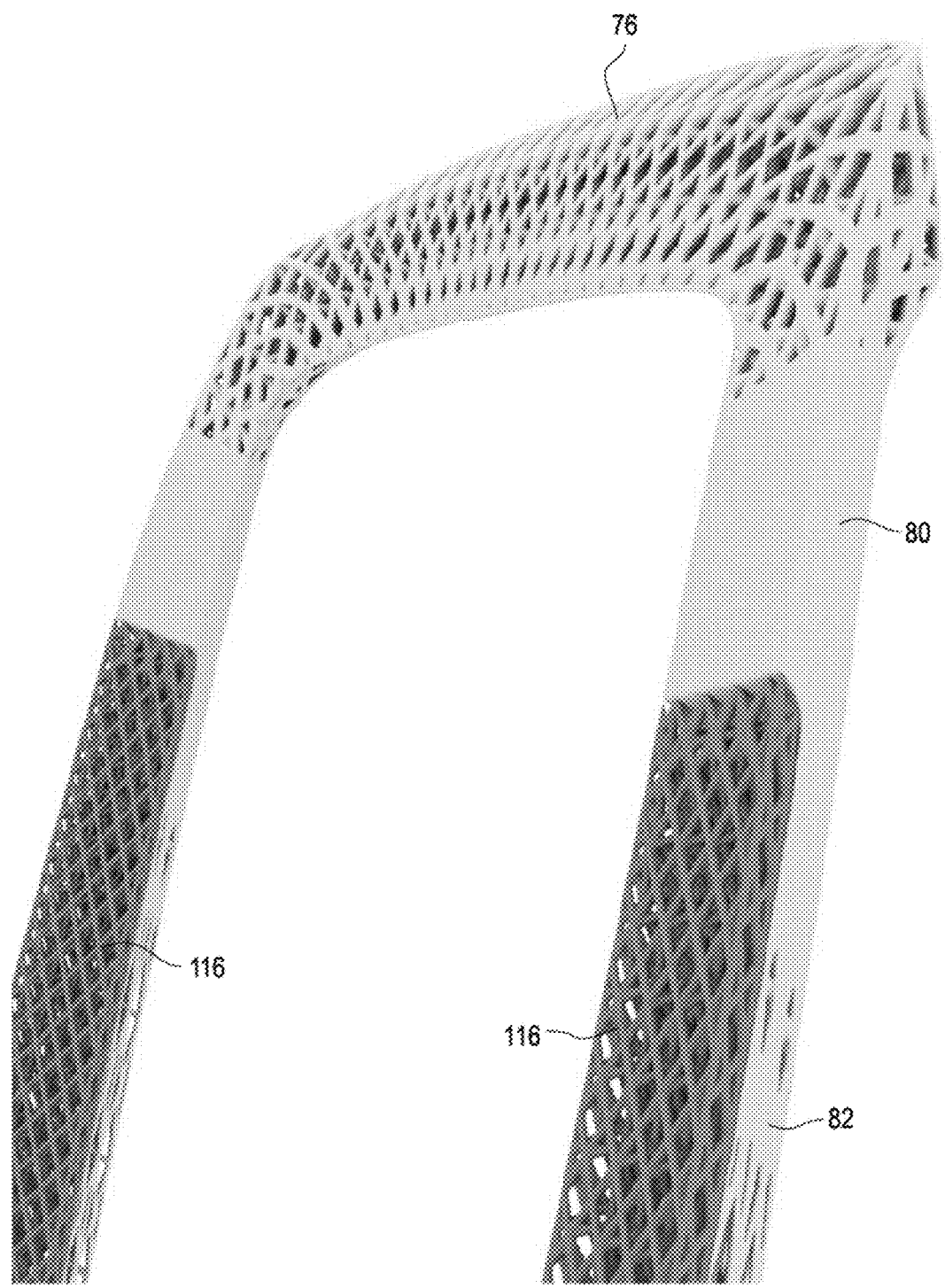
FIG. 10 is a partial, enlarged view of a portion of a back frame including a structural lattice structure and compressive lattice structure.
Figure 11:
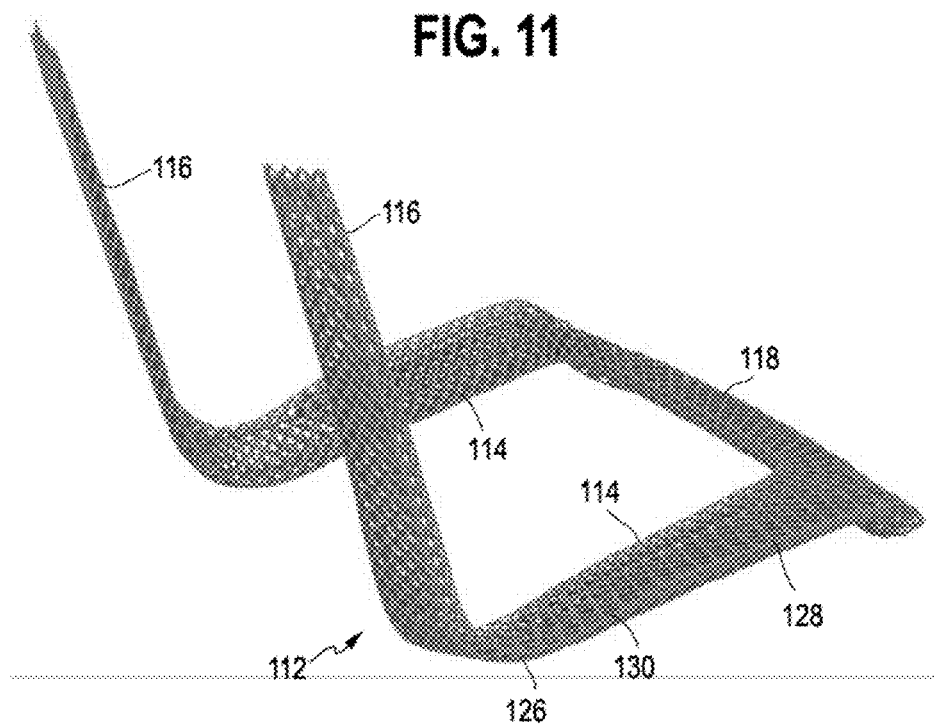
FIG. 11 is a rear perspective view of a first compressive member.
Figure 12:
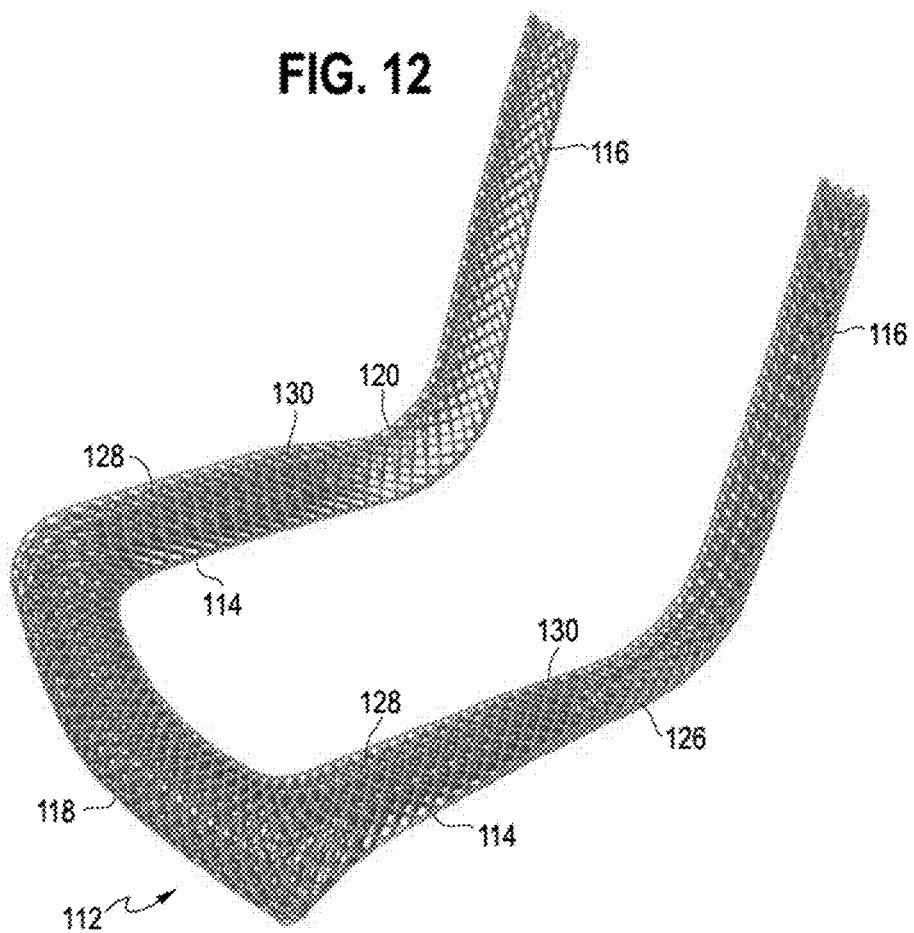
FIG. 12 is a front perspective view of the first compressive member shown in FIG. 11.
Figure 16:
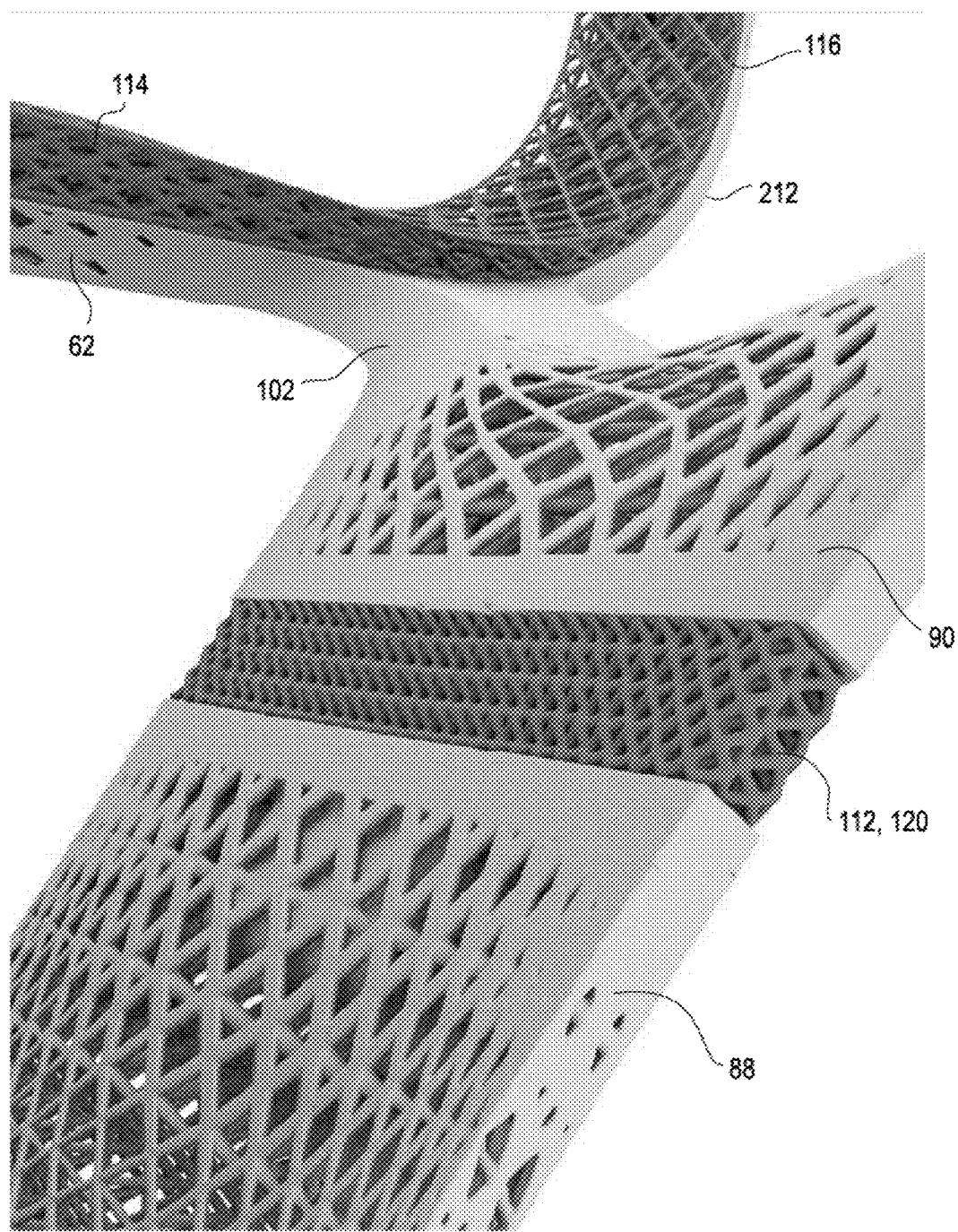
FIG. 16 is an enlarged front partial view of a strut incorporating a compressive lattice structure.
Figure 17:
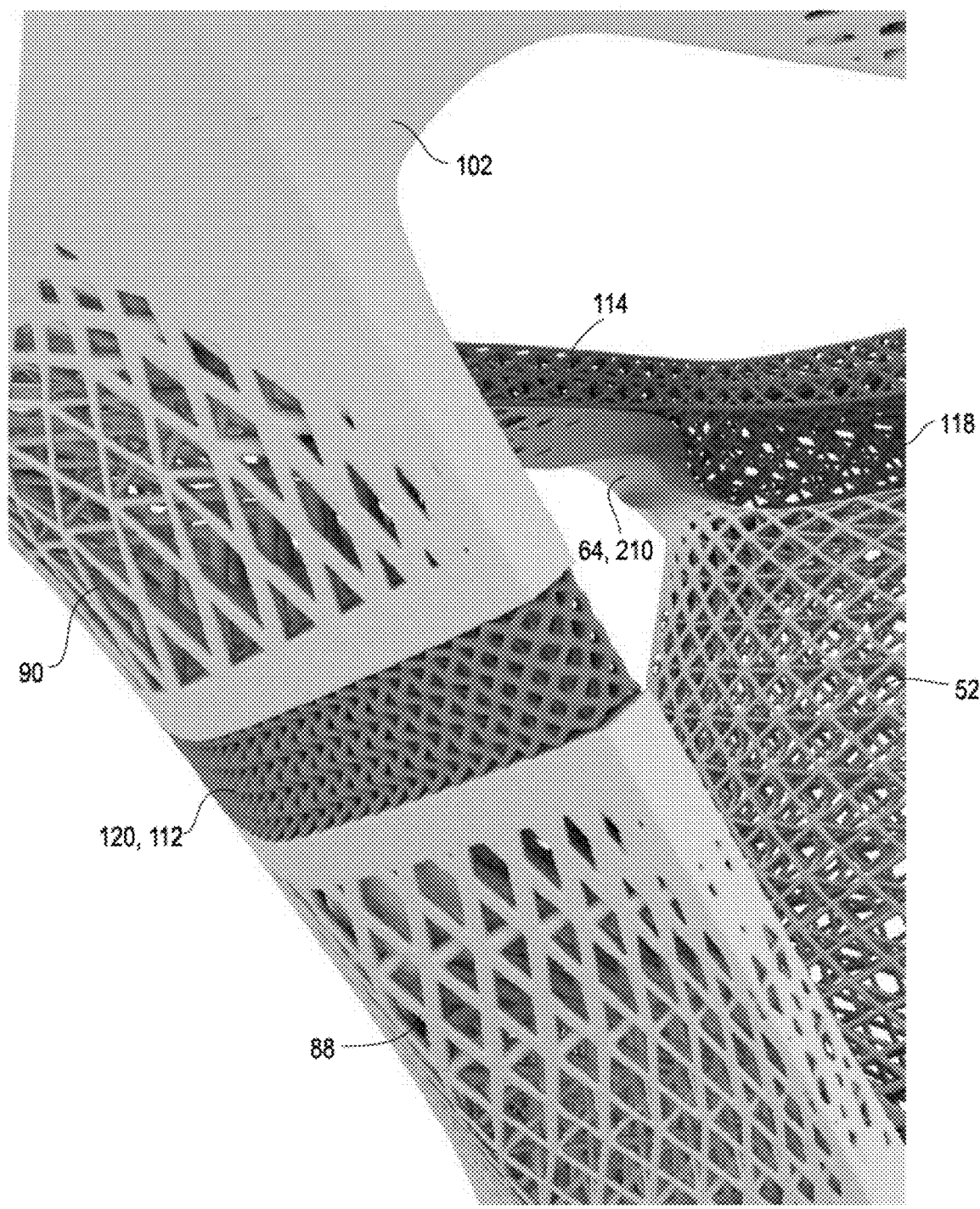
FIG. 17 is an enlarged rear partial view of a strut incorporating a compressive lattice structure
Figure 18:
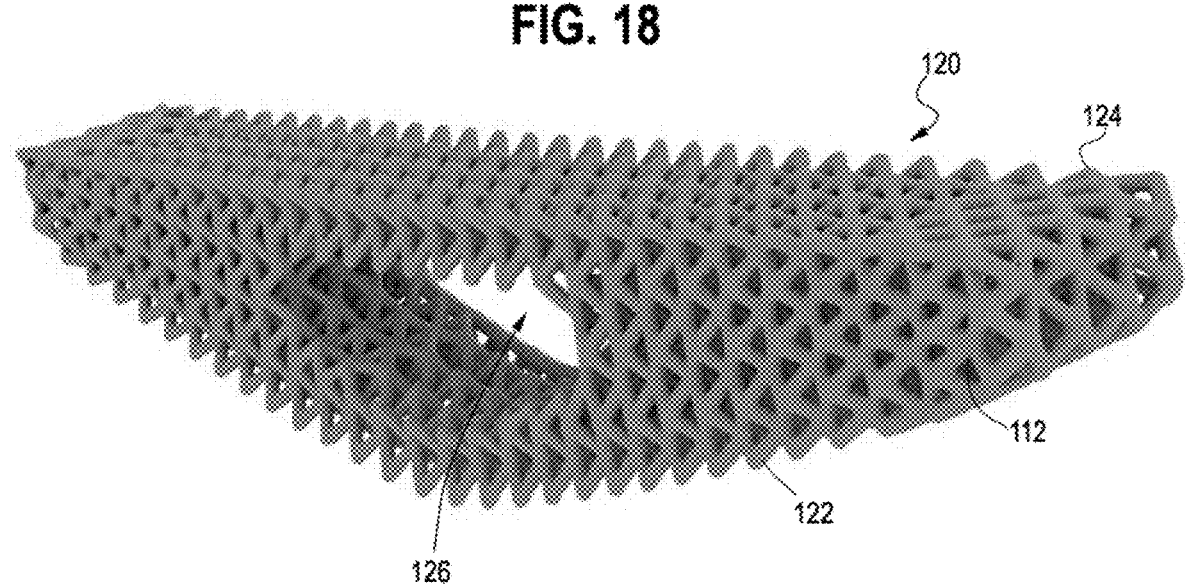
FIG. 18 is a bottom perspective view of the compressive lattice structure incorporated into the strut shown in FIGS. 16 and 17.

The first and second compressive layers are made of a compressive lattice structure 112, which is supported by (or between) the structural lattice structure(s) and/or solid structures as described above. The compressive layer has a second stiffness that is less than the first stiffness, meaning the compressive layer will experience or undergo a greater amount of displacement or deflection in at least one direction in response to the same force applied to a same sized sample of material in the at least one direction. In some embodiments, the first stiffness is many times greater than the second stiffness. In some embodiments, the second stiffness is 50%, or less, of the first stiffness. The stiffness may be varied, for example with the lattice structure being more compressible, by altering the orientation of the lattice structure such that the long side of the diamond cell structure (FIG. 30) is perpendicular to a load $F_N$, which is perpendicular to the surface. In other words, the stiffness is a function of the load direction and lattice orientation, the dimensions of the lattice structure (e.g., diameter of the beams), the voxel density (node density), in combination with the Young's modulus of elasticity associated with the material making up the lattice structure. Some exemplary materials are thermoplastic polyurethane (TPU), and may have a Young's modulus of 200 ksi or less, and in one embodiment 100 ksi or less, with the compressive lattice structure having compressive properties similar to some foams. The compressive lattice structure provides distributed compliance. The compressive lattice structure is compressible in response to the normal force $F_N$ being applied thereto, for example as applied by the upper and lower bearing surfaces 104, 106 of the strut, or by a user sitting on the seat as shown in FIGS. 4, 8 and 16. As shown in FIGS. 1-12, and 16, the compressive lattice structure, for example the beams, includes a cellular matrix having a first portion 126 having one or more layers of unit cells and a second portion 128 having a plurality of layers of unit cells, with the second portion having more layers of unit cells than the first portion, and including a transition region 130 between the first and second portions. For example, a forward portion of the beams, and the cross member, has a greater number of layers, and thereby provide a greater amount of compressive displacement in response to a normal load being applied thereto.

Referring to FIGS. 1-4, 16-19 and 36, the second compressive member 120 functions as a spring, which is compressed as a user sits and reclines in the chair, with the upper and lower strut portions 88, 90, which are configured from a structural lattice structure and/or solid component, compressing the spring between the bearing surfaces as the guide 96 moves within the track 98. The second compressive member provides a biasing force to resist the recline of the seat, and biases the upper and lower portions of the strut away from each other to return the seat to a nominal position when not loaded. In particular, the second compressive member, which is defined by an intermediate compressive lattice structure, is connected to the first and second end portions of the upper and lower portions 88, 90 of the strut, which are relatively stiff, with the first and second end portions being moveable between a nominal position and a compressed position. The intermediate compressive lattice structure is compressible between a nominal configuration and a compressed configuration corresponding to the nominal and compressed positions, wherein the intermediate compressive lattice structure applies a biasing force to the first and second end portions when in the compressed configuration. The strut will also provide a maximum recline/rearward tilt position as the second compressive member reaches maximum compression and bottoms out between the bearing surfaces 104, 106.

In this way, the strut 86, including the second compressive member 129, has an integrated kinematic feature, which is defined as a feature that effects or controls the motion of a body, or systems of bodies, including for example and without limitation, biasing two or more bodies toward or away from each other, limiting movement between two or more bodies, and/or locking two bodies in one or more relative positions. It should be understood that the integrated kinematic feature may include one or both of, or be formed from one or more of, a structural lattice structure, a solid structure, a compressive lattice structure, and/or a skin lattice structure, discussed below.

The lattice structures may include various integrated kinematic features, such as the second compressive member 120, which acts as a biasing member. Alternatively, and referring to FIGS. 33 and 34, the integrated kinematic feature may include a movement limiter, for example a tilt limiter, with a compressive member 134 (lattice structure) that bottoms out when adjacent lattice structures 136, 138 abut (FIG. 34), or when an extensible lattice structure (same as compressive but expanding in response to a tensile force) reaches a maximum extension. Such integrated kinematic features may be of any lattice structure, including the structural and compressive lattice structures defined herein.

Figure 33:
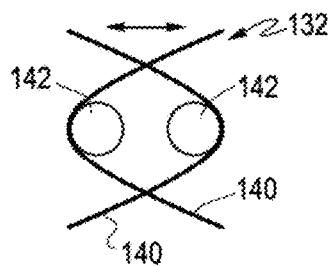
FIG. 33 illustrates an alternative embodiment of an integrated kinematic feature.
Figure 34:
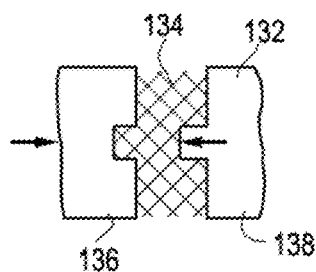
FIG. 34 illustrates an alternative embodiment of an integrated kinematic feature.

In another embodiment, shown in FIG. 33, the lattice structure may include interlaced lattice features 140, such as loops having stops 142, which are moveable relative to each other, with the lattice features moving relative to each by translation, rotation or torsion until the stops 142 are engaged, which prevents further movement, or thereby provides a movement limiter. The integrated kinematic feature may also include lattice structures, such as the stops, which engage or lock the lattice structures in a predetermined position, or fasteners such as tabs, hooks and/or guides, which may secure one lattice structure or component to another.

The compressive lattice structure may include a core unit and a core unit with a face along the outermost surfaces thereof as shown in FIGS. 30 and 31.

Skin Lattice Structure

Figure 37:
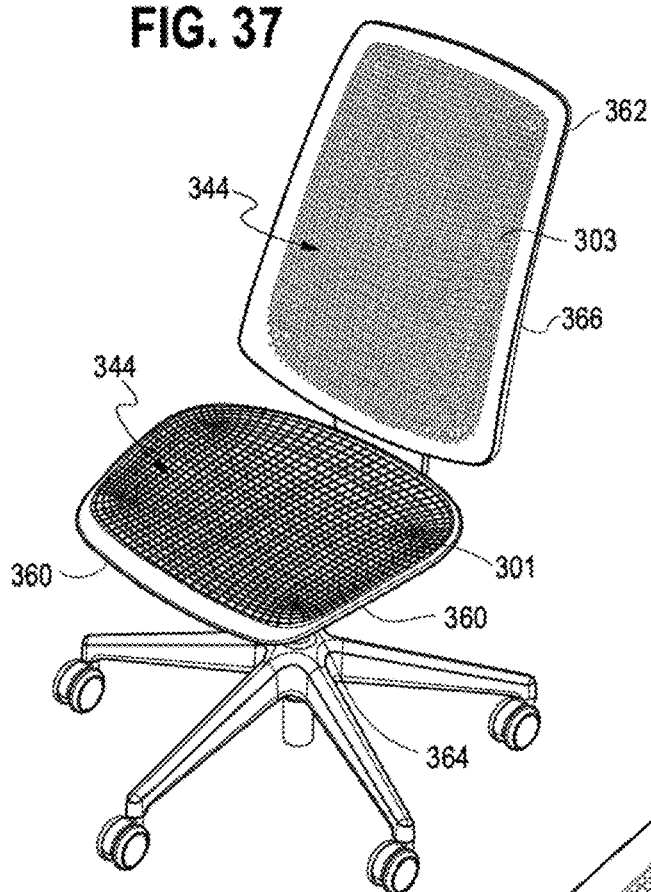
FIG. 37 is a perspective view of another embodiment of a chair incorporating a skin lattice structure on seat and backrest portions thereof.
Figure 38:
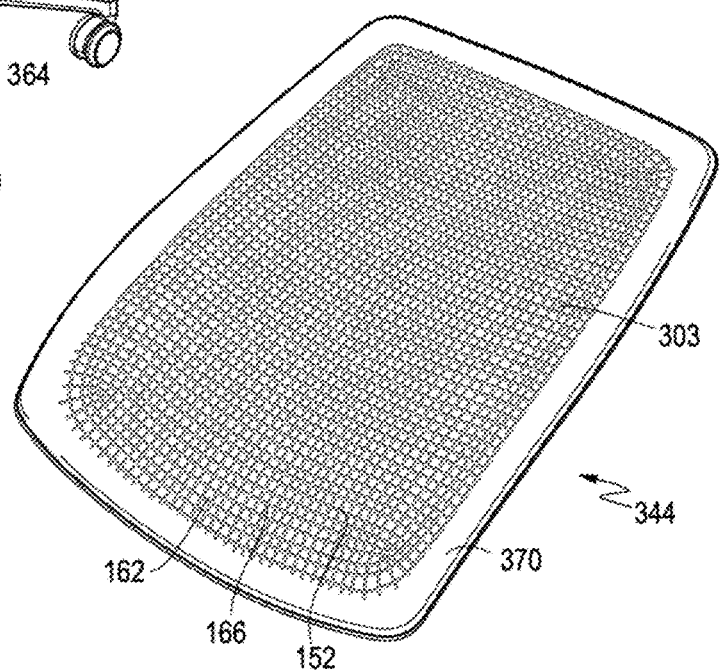
FIG. 38 is a front view of the backrest skin lattice structure shown in FIG. 37.

Referring to FIGS. 1-7, 20-29 and 37-49, a user interface member 144, 344, otherwise referred to as a skin member, is connected to the upper and front surfaces of the compressive member 110 and to the front surface of the upper portion 80 of the back frame. It should be understood that a cover may be positioned over the user interface layer in an alternative embodiment, for example an upholstery fabric, and may include a foam layer disposed between the cover and the user interface member. The skin member 144, 344 spans across the openings 148, 150 between the beams and between the uprights and forms a seat member 201 and back member 203, with a concave transition region 205 therebetween, that define a seating surface. As shown in FIG. 37, the skin member 344 may be coupled to a non-lattice frame, for example a seat frame 360 or a backrest frame 362, either of which may include laterally spaced opposite side members 364 (uprights 366 on the backrest) and longitudinally spaced front and rear members (top and bottom members on the backrest), with the side/upright, front/bottom and rear/top members forming a ring. The skin members 344 may alternatively be secured to only the side (upright) members, only the front (bottom) and rear (top) members, the side/upright, front/bottom and rear/top members or any combination of the members. In the embodiment shown, separate seat and backrest skin members are attached to the seat and backrest frame respectively. The skin member 144, 344 is made of a skin lattice structure 146, which is resistant to shear deformation in response to a normal load $F_N$ being applied thereto. As such, the skin lattice structure may absorb the weight of the user and carry it across the openings 148, 150 to the spaced apart beam members 62, 114, 364 and/or spaced apart uprights 74, 116, 366. At the same time, the skin lattice structure is expandable in the lateral X and longitudinal Y directions transverse to the second normal force, which is applied in the Z direction, such that the skin lattice structure can deflect while carrying the load applied by the user to the beams and uprights. At least a portion of the skin lattice structure overlying the opening 148 between the laterally spaced beams, and the opening 150 between the laterally spaced uprights, is not supported by any other structure.

Referring to FIGS. 20-29 and 37-49, the skin lattice structure includes first and second layers 152, 154 connected with a plurality of connectors 156. In one embodiment, the skin lattice structure includes a plurality of spaced apart support members 158, which face toward the body of the user, and a plurality of spaced apart base members 160, which face away from the user, with the plurality of connectors 156, or legs, connecting the support members and base members. The first layer 152 includes the plurality of support members 158 defining opposite first and second surfaces 162, 164 facing toward and away from the body of the user. Adjacent support members define openings 166 between sides of the adjacent support members.

Figure 39:
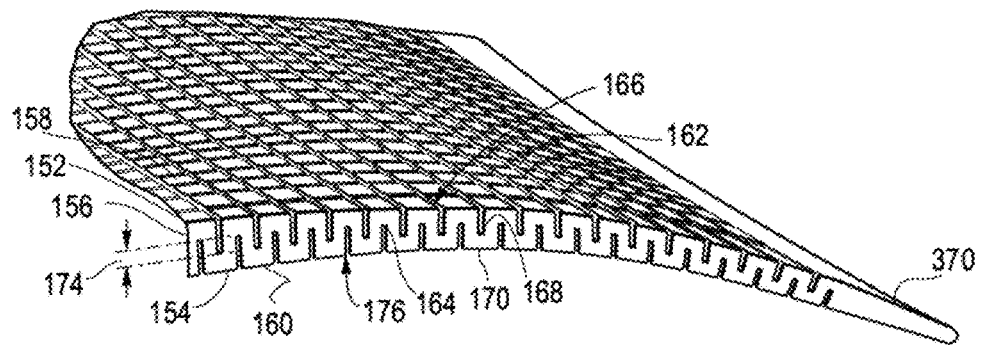
FIG. 39 is a cross-sectional view of a portion of the backrest skin lattice structure shown in FIG. 38.

The second layer 154 includes the plurality of spaced apart base members 160 defining opposite first and second surfaces 168, 170 facing toward and away from the body of the user. The first surfaces 168 of the base members face toward and are spaced apart from the second surfaces 164 of the support members such that the plurality of support members and the plurality of base portions define a space 174 therebetween. Each of the base members 160 underlies at least portions of the openings 166 defined by at least two (and preferably 3 or 4) adjacent support members 158, and also underlies portions of the adjacent support members 158. Adjacent base members define openings 176 between sides of the adjacent base members. Portions of the openings 176 underlie portions of the openings 166, which provides for through openings 181 extending through an entirety of the skin lattice structure between the sides of the base members and the sides of the support members. The plurality of connectors 156 extend across the space and connect each base member 160 with the at least two adjacent support members 158, for example at respective corners of each of the support members and base members. The support members and base members are offset from each other ½ unit in both the X and Y direction. In one embodiment, each connector 156 defines a first acute angle $\Theta_1$ relative to the second surface of the respective support member and a second acute angle $\Theta_2$ relative to the first surface of the base portion, with $\Theta_1$ and $\Theta_2$ being equal in one embodiment. The connectors are angled away from a corner and toward a centerline of the respective support member and base member to which they are attached, forming an angle β (e.g., 45 or 135 degrees) with a side edge of the support member and/or base member. By orienting the connectors at an angle toward a centerline, the space between support members, or width of the openings 166, and the space between the base members, or width of the openings 176, may be minimized, which provides as continuous surface 168 as possible while allowing debris to pass though the openings 166, 176. For example, the width of openings 166 and 176 may be equal to or greater than 0.5 mm. In addition, the connectors 156, when angled, are longer than a connector extending normal to the base and support members at a specified gap. The longer connector 156, in combination with the angle, may provide for increased flexibility of the connector and resulting flexibility/expandability of the skin member 144, 344. The skin member with angled connectors may be formed by additive manufacturing techniques. Conversely, when the connectors 156 extend substantially normal (e.g., perpendicular) to the base and support members, as shown in FIG. 39, the skin member 344 may be more easily manufactured by conventional molding techniques, for example injection molding.

The skin lattice structure 146 provides distributed compliance. The connectors 156 are resilient and elastically deformable to allow relative movement between the connected support members 158 and base members 160. For example, the skin lattice structure may be compressed and expanded within the surface (e.g., plane) in response to translation forces (created by application of the normal force), such that the seating structure exhibits flexibility within the plane of the array, with the understanding that the surface may be curved for example in two directions as a saddle shape, or one direction as a bow shape, such that the translation forces are tangential to the surface at any particular location. In particular, the connectors 156 elastically deform to provide for the relative expansion/compression. The compression or expansion may take place simultaneously in the longitudinal and/or lateral directions, or in other directions depending on the arrangement of the array including the connectors. The deformation of the connectors may be realized through one or both of the geometry and/or material of the connectors.

The skin lattice structure 146 may also be flexible, or experience bending and or torsion/twisting deformation in response to bending forces and twisting forces. The bending and twisting may take place simultaneously about various longitudinal and/or lateral axes (lying within or tangential to the curved surface), or about other tangential axes depending on the arrangement of the array including the connectors. In contrast, the skin lattice structure is relatively stiff, and resists deformation, in response to shear forces $F_N$, applied for example normal or perpendicular to the curved surface. The skin lattice structure 146 may be made of a stiffer material than the compressive lattice structure, for example from a polypropylene or a stiff TPU, with a Young's modulus of 200-300 ksi in one embodiment, or greater than the modulus of the compressive lattice structure and less than the modulus of the structural lattice structure.

The phrase "elastic," or "elastically deformable," and variations or derivatives thereof, refers to the ability of a body, e.g., connector, to resist a distorting influence or stress and to return to its original size and shape when the stress is removed. In this way, the connectors 156 preferably do not experience any plastic (e.g., permanent) deformation. The support members and base members may also experience some elastic deformation, although the primary deformation or deflection, whether translation or pivoting/bending/twisting, is realized by the deformation of the connectors 156.

Outer surfaces 162 of the support members 158 are flush even though the overall surface of the skin lattice structure may define a curved, non-planar outer surface. In this way, and notwithstanding the openings 166 formed between the support members, the outer (body-facing) surfaces 162 present a visually and tactilely smooth surface to the user. As shown in the figures, the skin lattice structure has an outer surface with a convexly shaped front waterfall portion 180, a convex backrest upper edge portion 182, a concave transition portion 184, and concave seat and back member portions.

Referring to FIGS. 26A-29 and 39, the connectors 156 are elongated bodies, shown as a linear legs, which connect inner portion, e.g., second surfaces, of the support members with the inner portion, e.g., first surfaces, of the base members. For example, each base member 160 may underlie four corners of adjacent support members 158, with the corners of each base member connected to the corners of the adjacent support members. In this embodiment, the four adjacent support members define an opening(s) 166 defined between the sides thereof having a cross or X shape overlying the base member 160 connected thereto. In one embodiment, at least some of the support members and/or base members have a quadrilateral shape, and in one embodiment, all of the support members and base members have a quadrilateral shape. In one embodiment, at least some of the support members and/or base members have a rectangular shape, which may be defined as a square in one embodiment.

Figure 13:
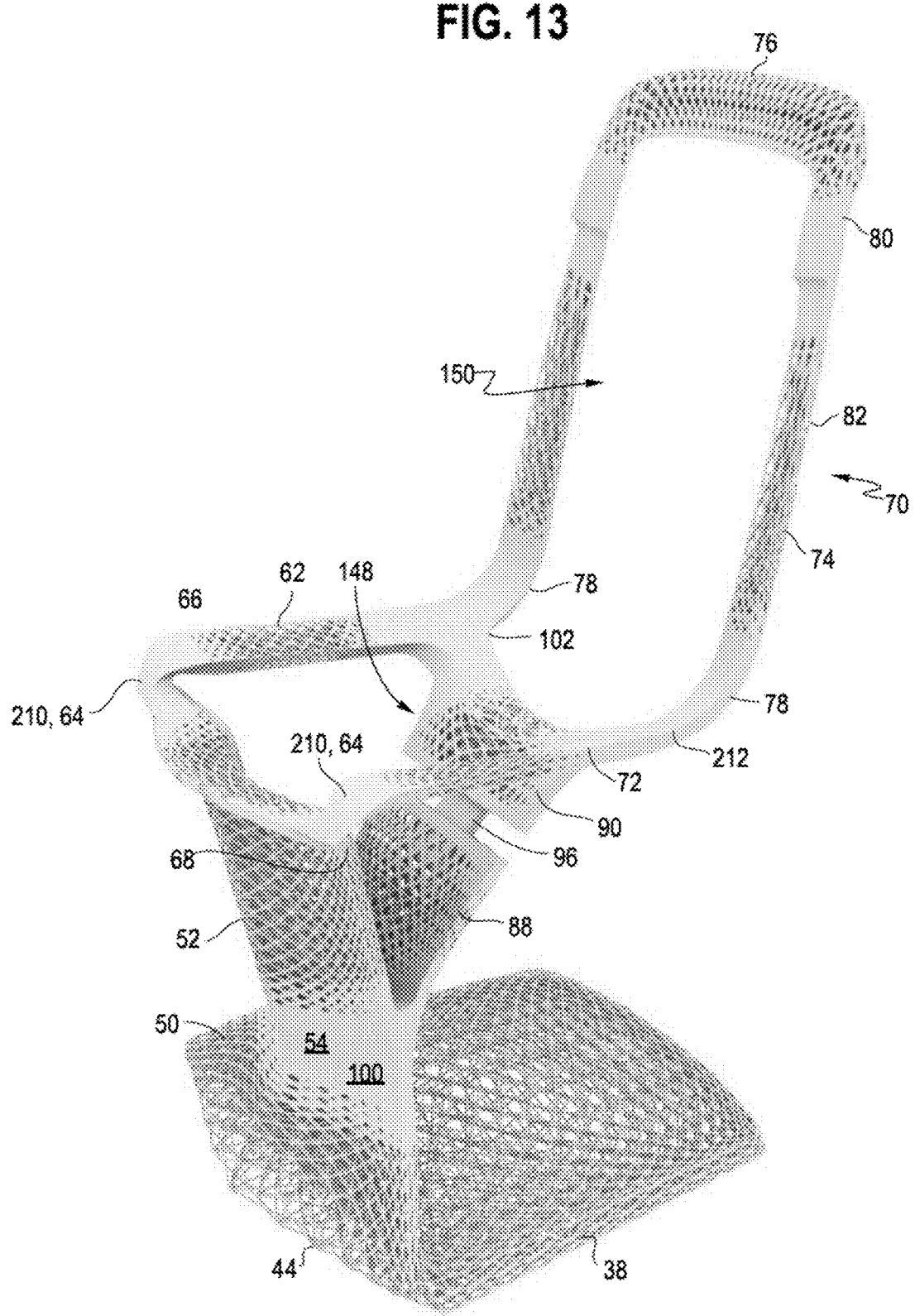
FIG. 13 is a perspective view of a partial body support structure including various structural lattice structures.
Figure 14:
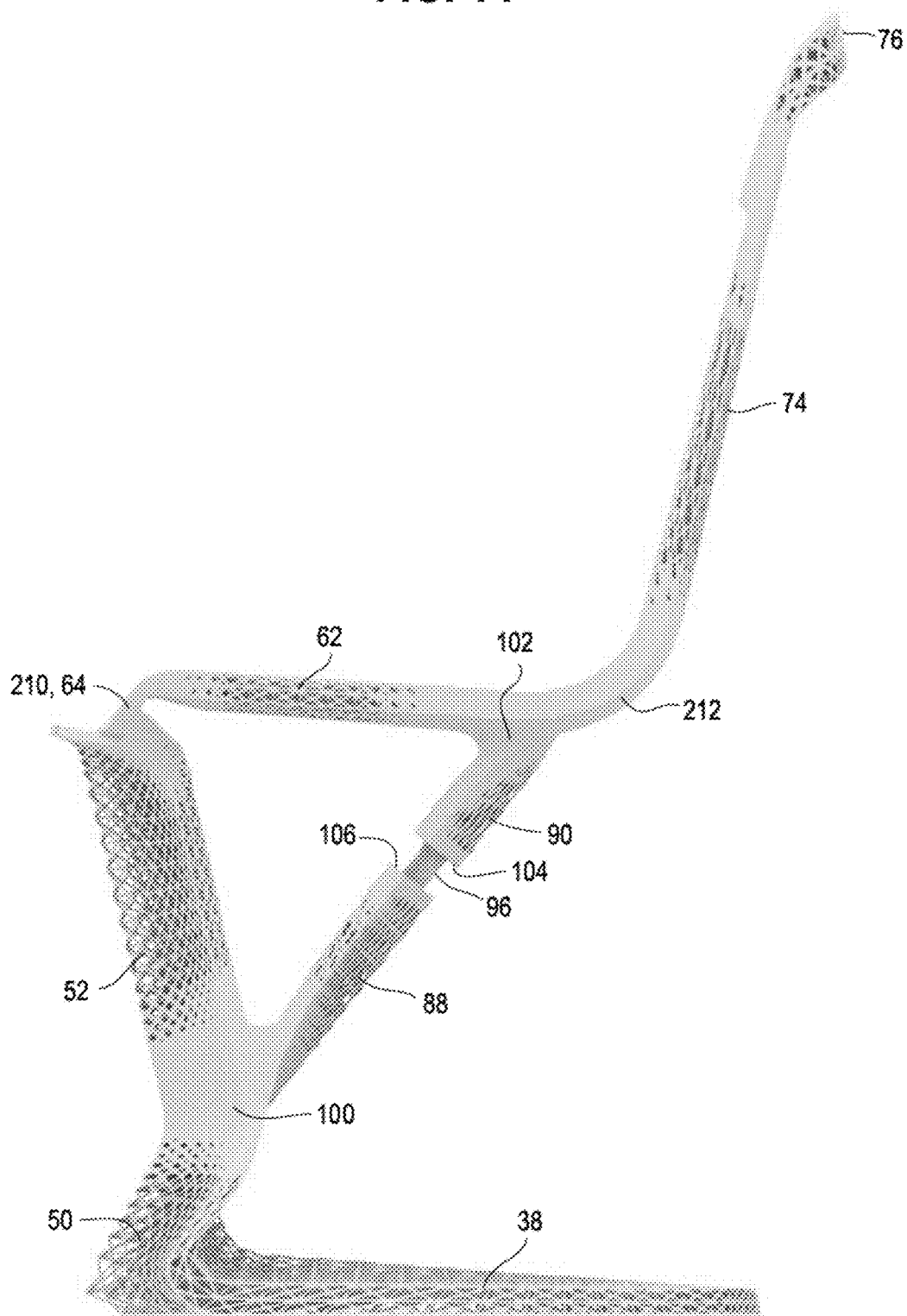
FIG. 14 is a side view of the body support structure shown in FIG. 13.
Figure 15:
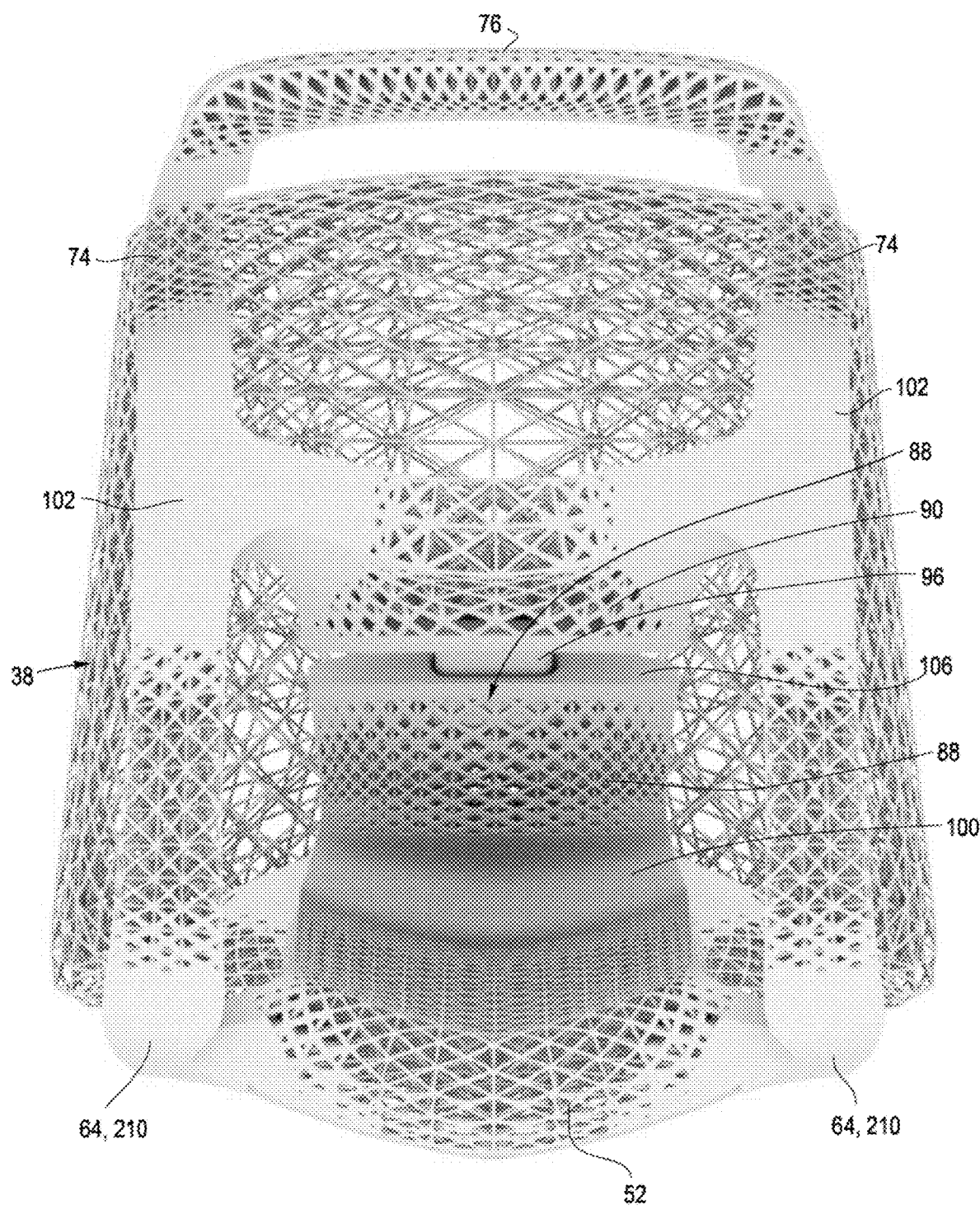
FIG. 15 is a bottom view of the body support structure shown in FIG. 13.

As shown in FIGS. 13-15, at least some, and preferably all, of the base members 160 having a through opening 172 formed in a central portion thereof, with the opening 172 underlying at least portions defined by at least two, and preferably four, adjacent support members 158, and also underlying portions of the openings 166. In this way, the through openings 172, 181 provide additional ventilation, while also providing an outlet for debris (solid or liquid) deposited or spilled on the lattice skin structure that passes through the openings 166 between adjacent support members and through the through openings 172, 181. In one embodiment, at least some of the first and second surfaces of the support members and base members may be planar, while in other embodiments, at least some of the first and second surfaces of the support members and base members may be curved.

Figure 42:
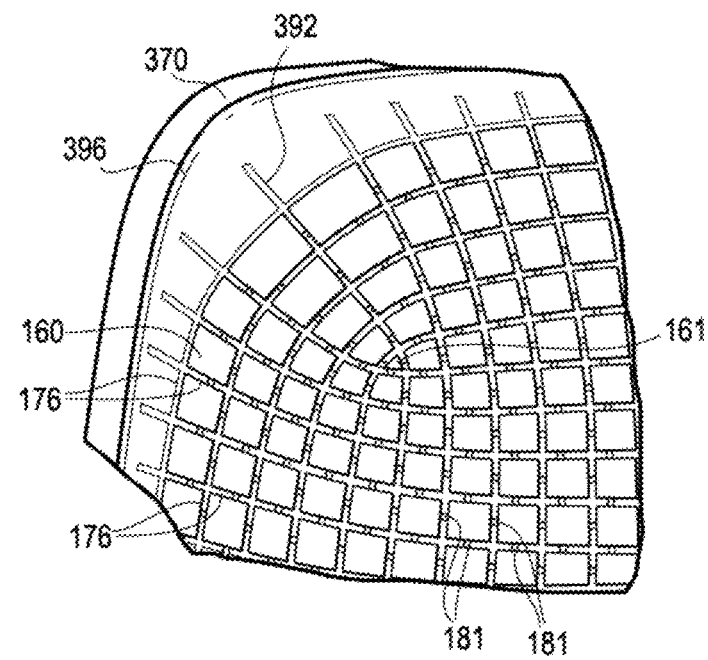
FIG. 42 is a bottom view of a partial corner portion of the seat skin lattice structure shown in FIG. 41.
Figure 43:
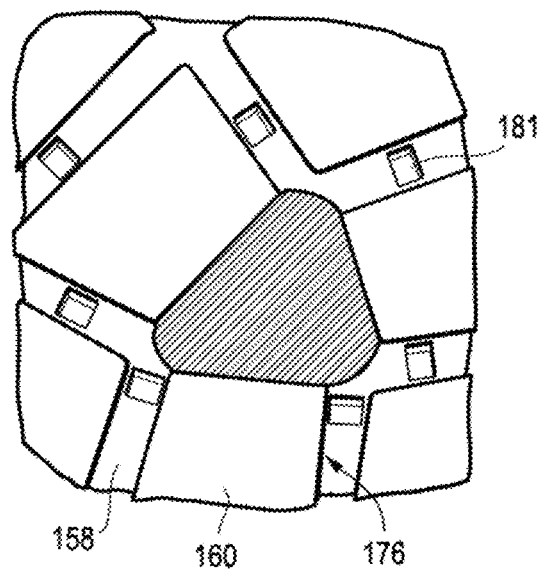
FIG. 43 is an enlarged bottom view of a portion of the seat skin lattice structure shown in FIG. 42.

The connectors 156 in combination with the support members and base members, allow or provide for twisting or torsional deformation of the skin lattice structure, while limiting or preventing movement, e.g. shear, normal to the surface. As shown, the connectors may be configured as four legs 156 connected to the four support members and a base member coupling the legs. Again, the connectors, in combination with the openings 166 between the support members and the openings 176 between the base members, allow for the various degrees of freedom of movement, including translation (compression/expansion), bending and/or torsion/twisting. It should be understood that a connector having three legs 156 may also join three support members, as shown for example in FIG. 42, which has a triangular base member 161 underlying the three adjacent support members 163 shown in FIG. 40. Alternatively, as shown in FIG. 43, the space between the base members adjacent the base member 161 may simply be filled in, thereby joining the adjacent base members and eliminating the connector legs 156, and with through openings 181 between the base member 161 and support members 163 being covered. Indeed, the various connectors may be configured to connect any number (2, 3, 4, . . . n) of adjacent support members. The support members 158 may have different widths, and may be spaced apart greater or lesser distances to define differently dimensioned openings 166.

Figure 21:
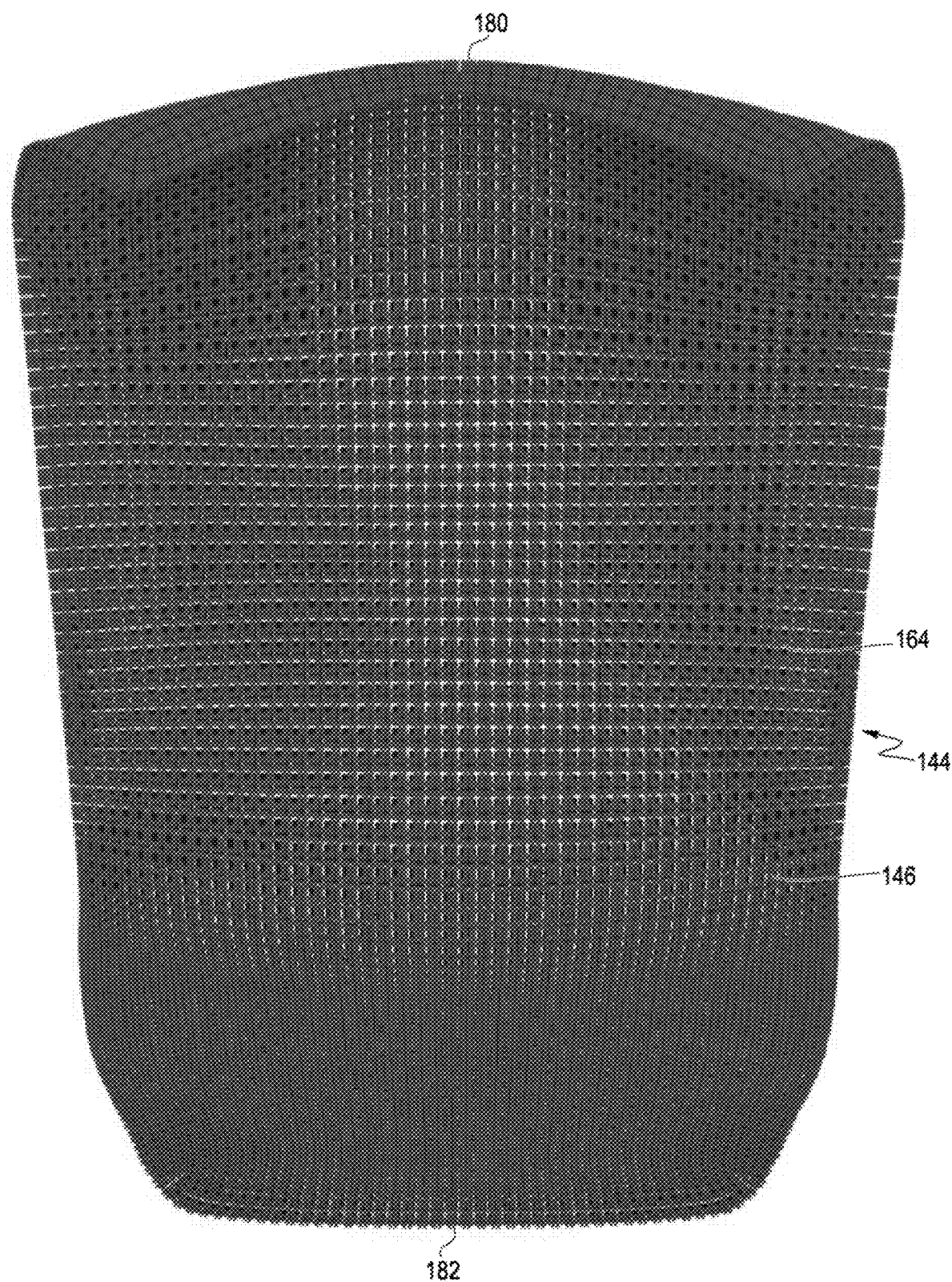
FIG. 21 is a bottom view of one embodiment of the skin lattice structure shown in FIG. 20.
Figure 22:
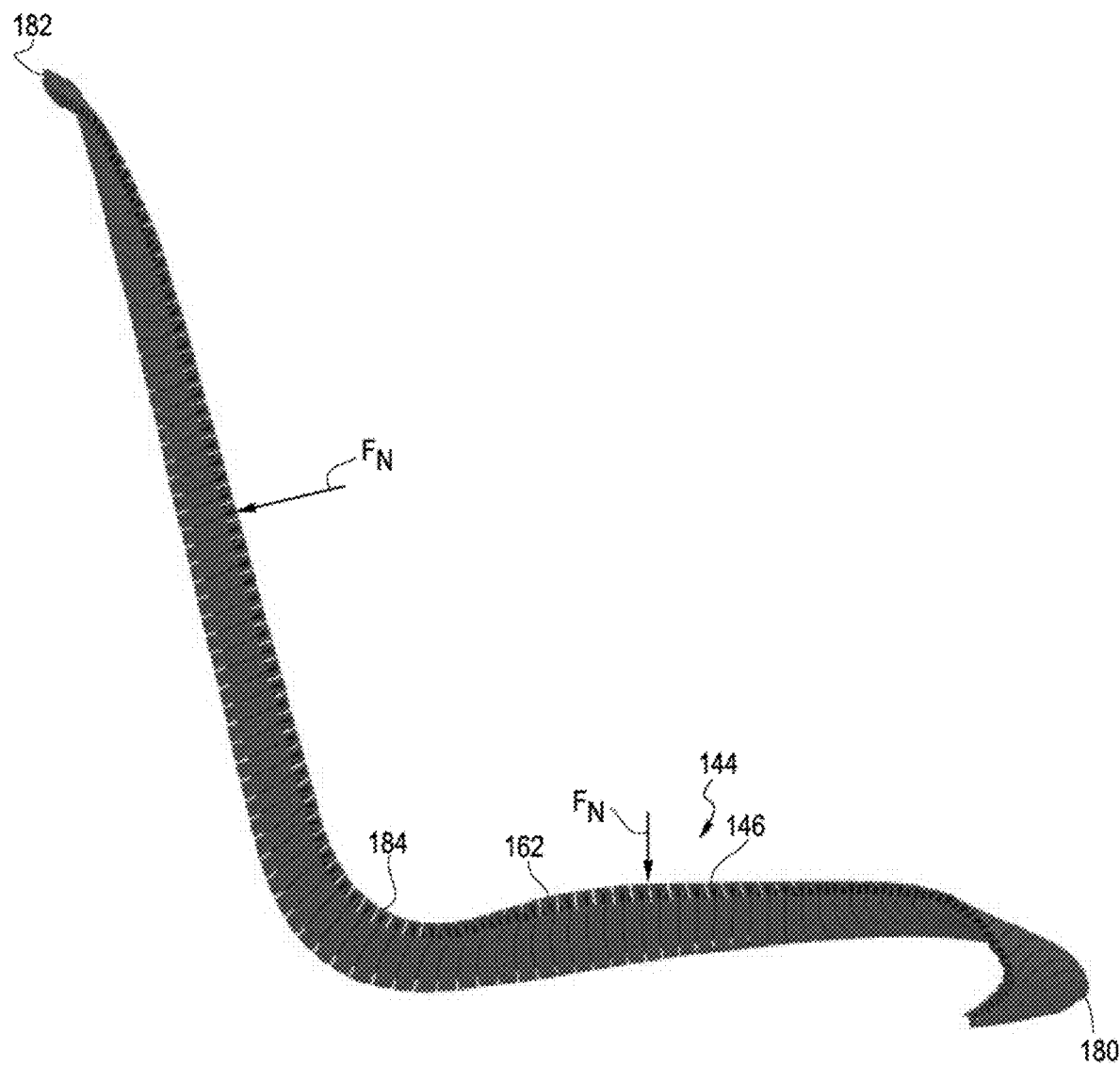
FIG. 22 is a right side view of one embodiment of the skin lattice structure shown in FIG. 20, with a left side view being a mirror image thereof.
Figure 23:
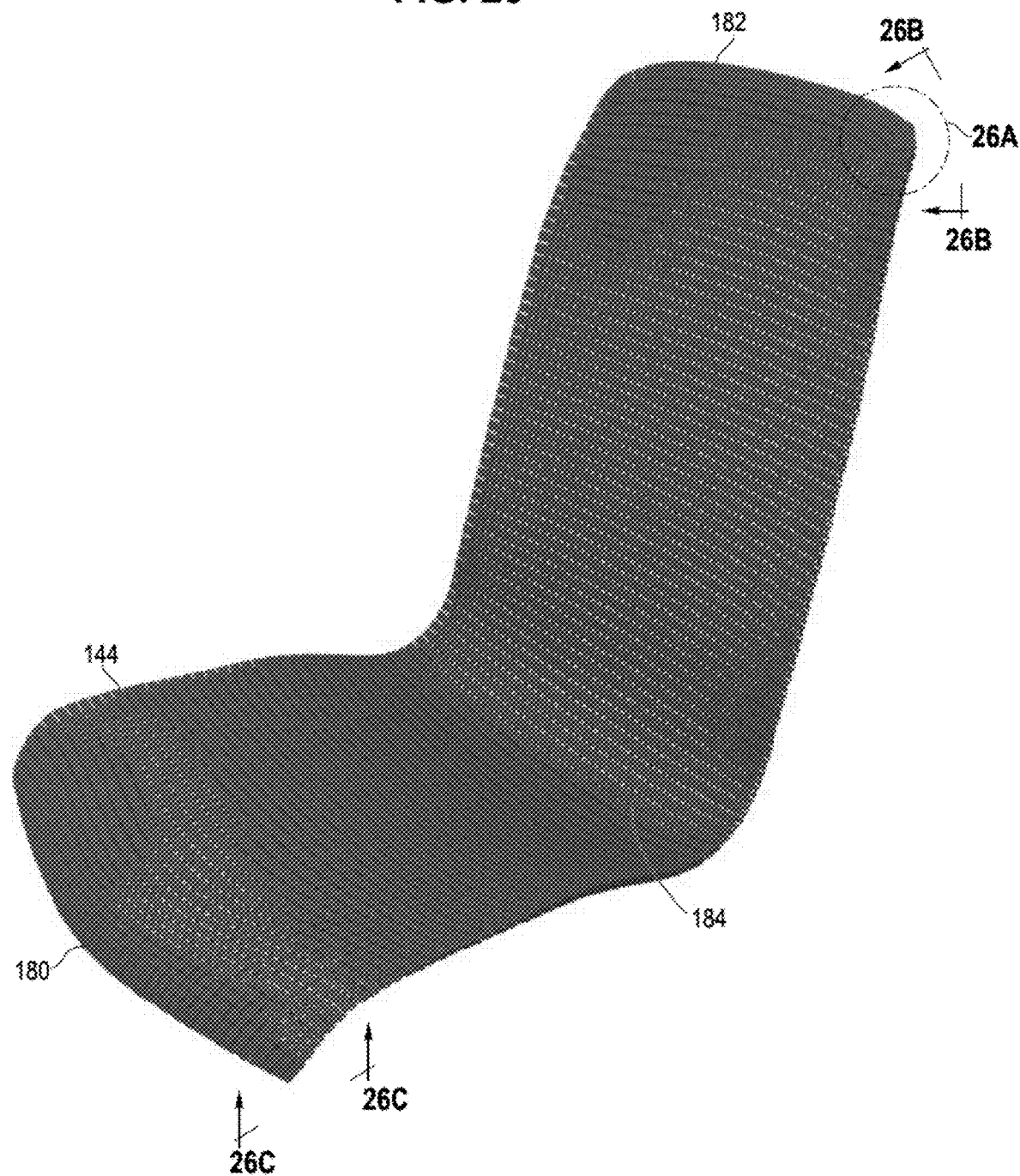
FIG. 23 is a front perspective view of one embodiment of the skin lattice structure shown in FIG. 20.
Figure 24:
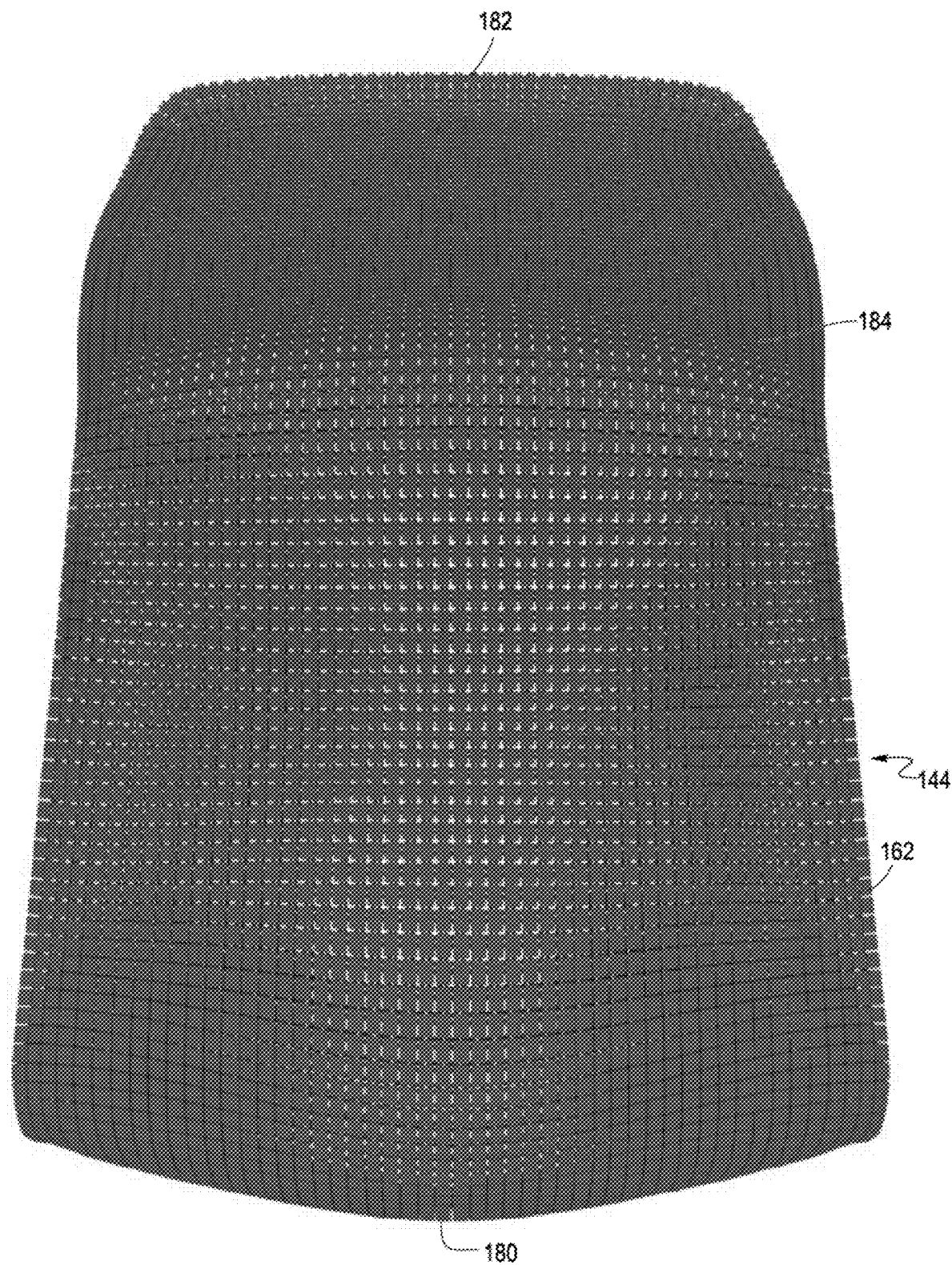
FIG. 24 is a top view of one embodiment of the skin lattice structure shown in FIG. 20.
Figure 25:
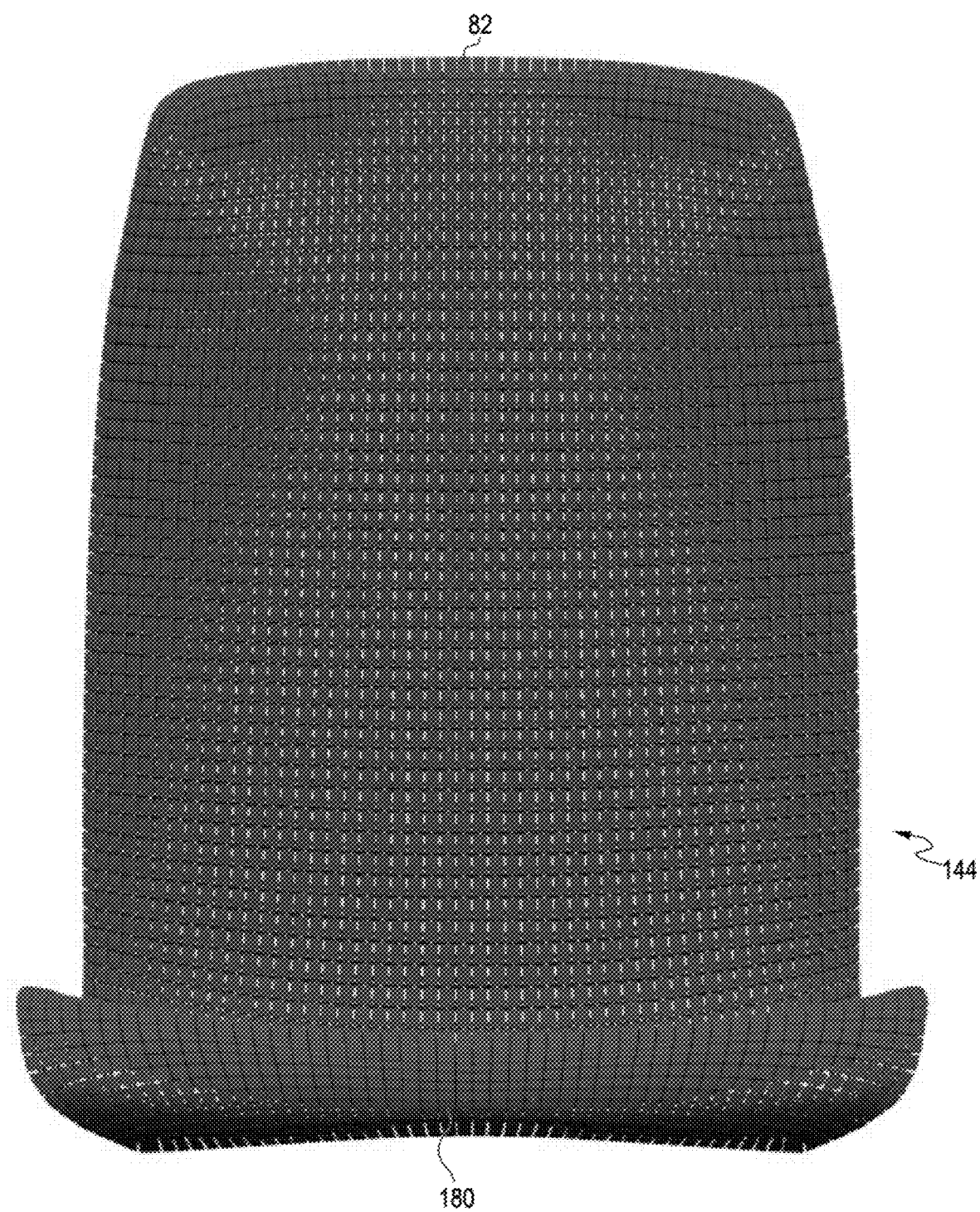
FIG. 25 is a front view of one embodiment of the skin lattice structure shown in FIG. 20.

Referring to FIGS. 20-29, 32, 38 and 40, the skin lattice structure, and in particular the first layer 152, includes a central field array 186 with a periphery bordered by a perimeter array 188. The perimeter array 188 defines a closed ring surrounding the entire periphery of the central field array 186. In one embodiment, the field array 186 includes a plurality of spaced apart support members 158 arranged in a plurality of rows 190, 190', 190", 190''' (shown as 4 rows for example in FIG. 21), . . . 190' and a plurality of columns 192, 192', 192", 192''' (shown as four columns for example in FIG. 21), . . . 190", wherein each of the rows has the same number (n1) of support members, and wherein each of the columns has the same number (n2) of support members. It should be understood that the number of rows may be any number and may be different from the number of columns, which may be any number. In addition, at least one of the rows has a first width ($W_3$) and at least another one of the rows has a second width ($W_4$), wherein the first and second widths are different. Likewise, at least one of the columns has a first length ($L_1$) and at least another one of the columns has a second length ($L_2$), wherein the first and second lengths are different. It should be understood that the illustration of FIG. 21 shows the rows having the same widths and the columns having the same lengths, but that these may be varied as shown for example in FIGS. 1-7, 20-29, 38 and 40. In this way, the skin lattice structure may be configured with curved side edges, a curved front edge and a curved back/upper edge when viewed from a Z direction. In addition, the field array may be non-planar in the X and Y directions, and at least some of the rows and at least some of the columns may be non-linear, or linear.

Referring to FIGS. 20-29, 32 and 40, the perimeter array 188 includes at least a first closed ring 194 having first and second rows 196, 196' of spaced apart support members connected to opposite outermost end rows 190, 190''' of the field array 186, and first and second columns 198, 198' connected to opposite outermost end columns 192, 192''' of the field array 186. The first and second rows 196, 196' and the first and second columns 198, 198' of the perimeter array are connected to define the closed ring 194. In this way, the first and second rows of the perimeter array include n1 support members, or the same number of rows as the field array, and the first and second columns of the perimeter array comprise n2 support members, or the same number of columns as the field array. The support members 158 in the field array and perimeter array are connected by way of connectors 156 and underlying base members 160.

Figure 26A:
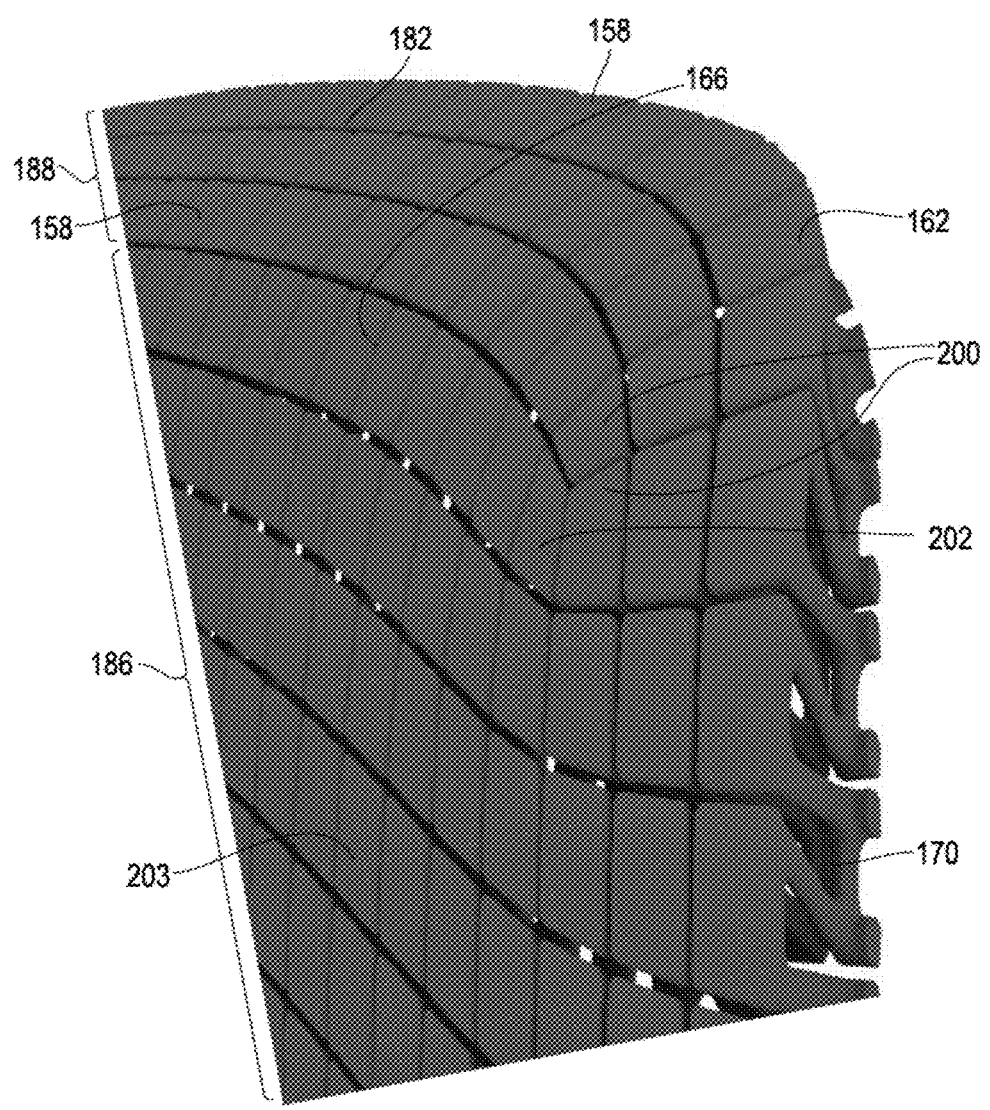
FIG. 26A is a partial, top perspective view of one corner of the skin lattice structure shown in FIG. 23.
Figure 26B:
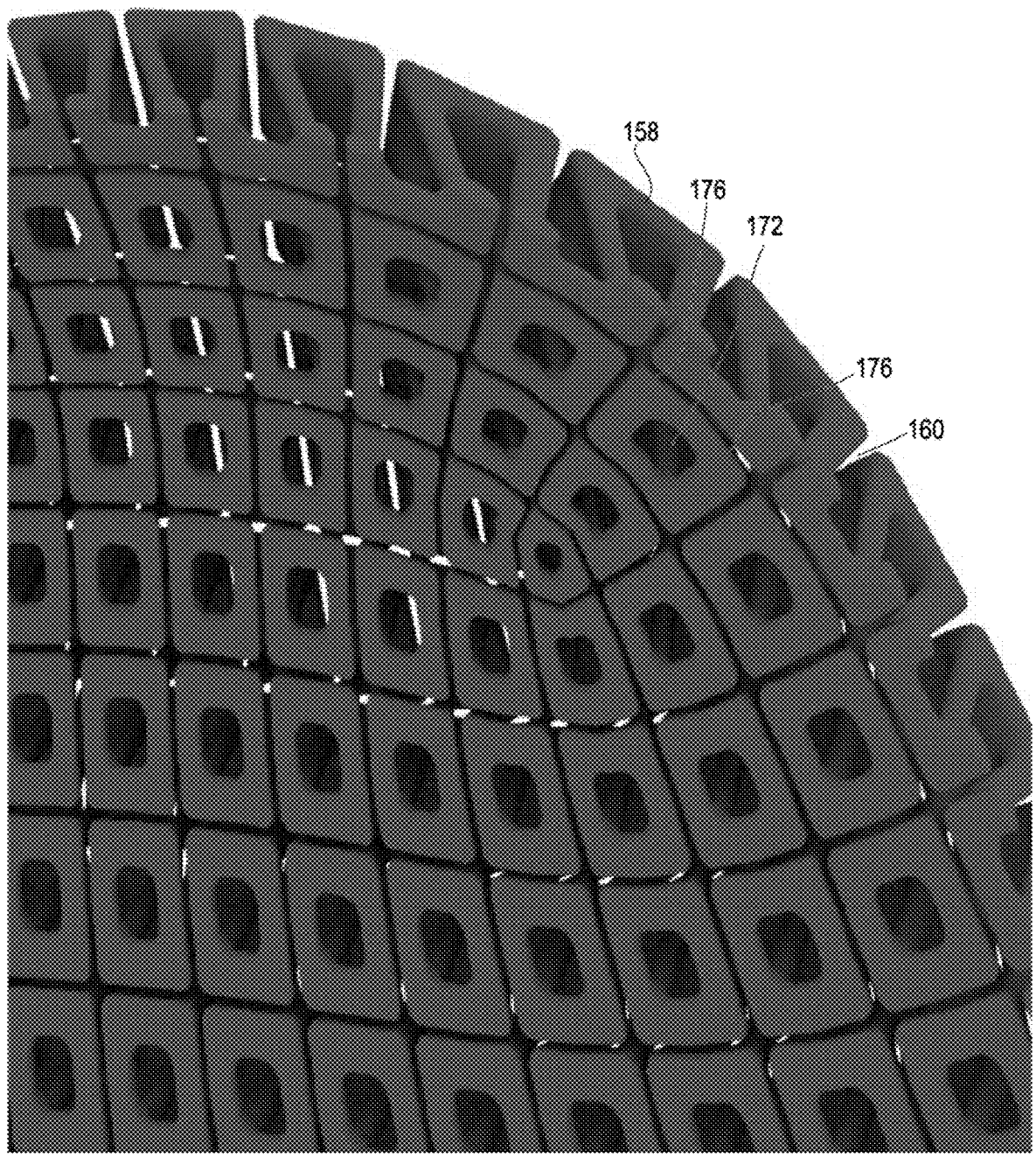
FIG. 26B is a partial, bottom perspective view of one corner of the skin lattice structure shown in FIG. 23.
Figure 26C:
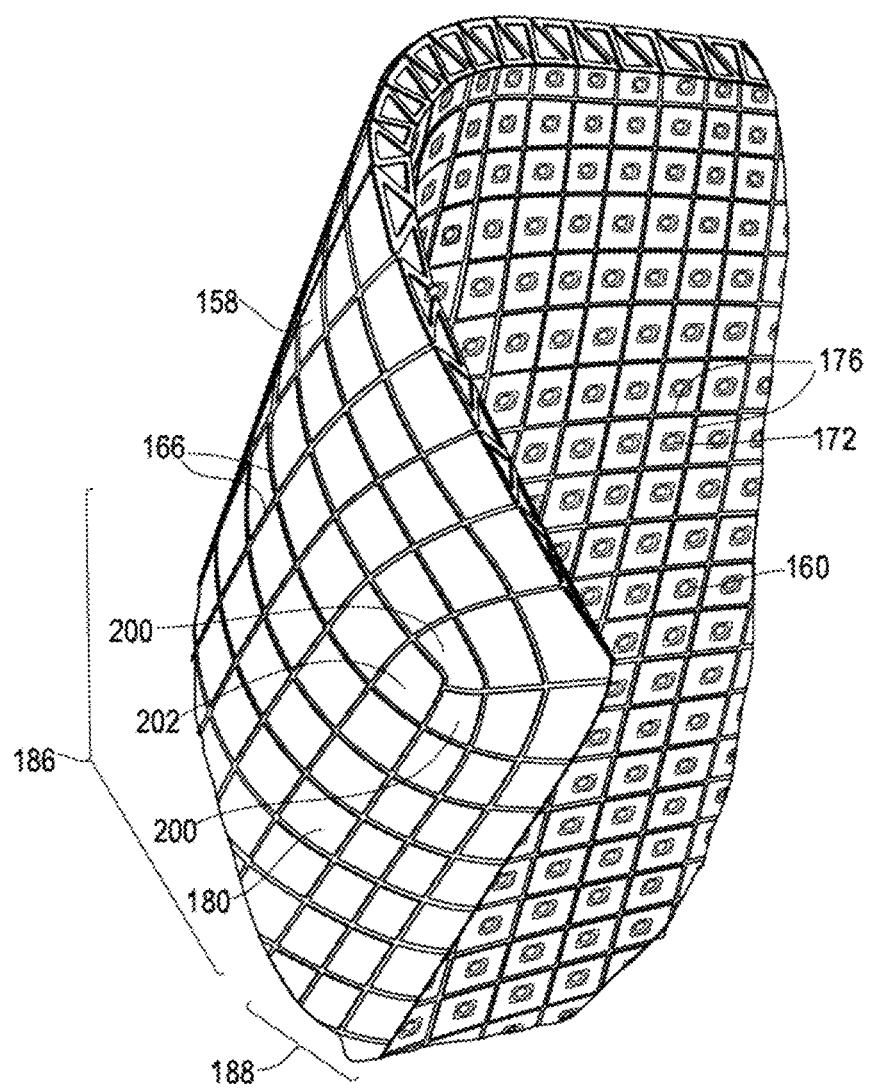
FIG. 26C is a partial, top perspective view of another corner of the skin lattice structure shown in FIG. 20.
Figure 27:
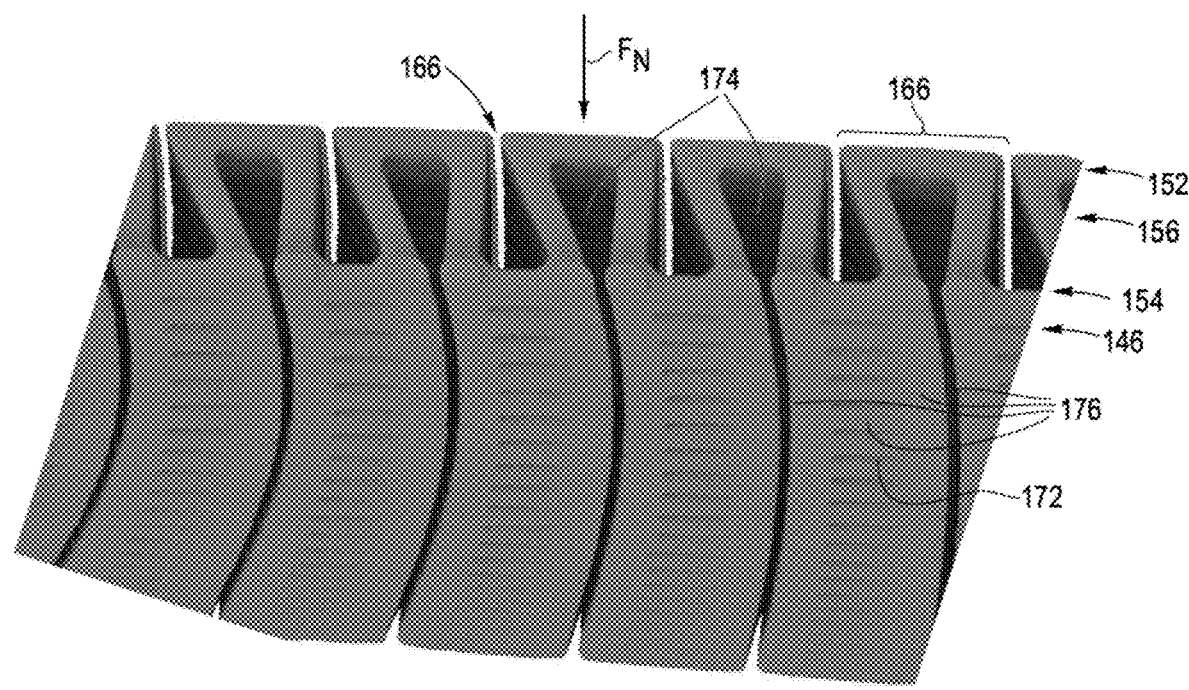
FIG. 27 is a partial, side view of a skin lattice structure.
Figure 28:
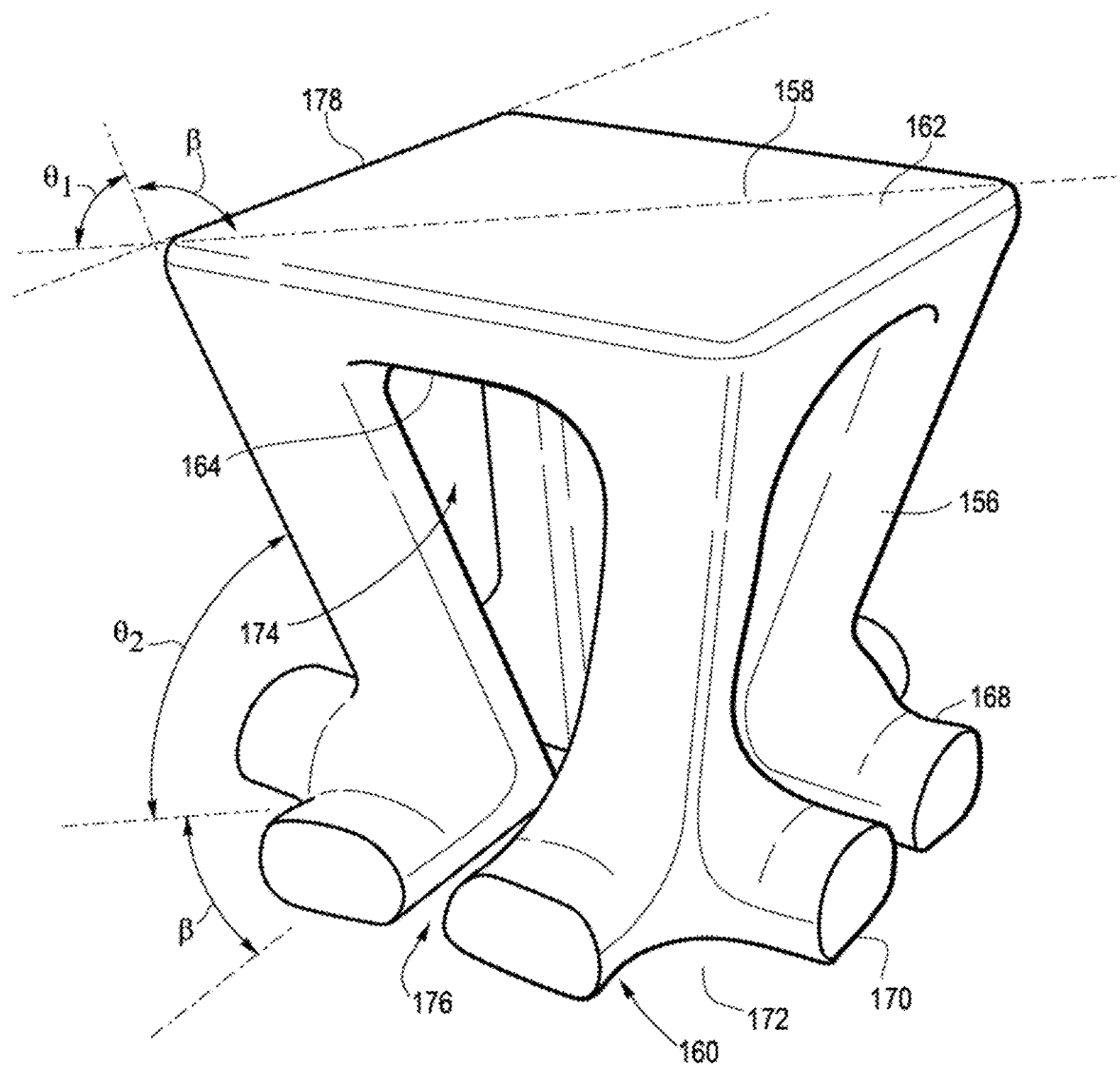
FIG. 28 is a partial view of a skin lattice structure.
Figure 29:
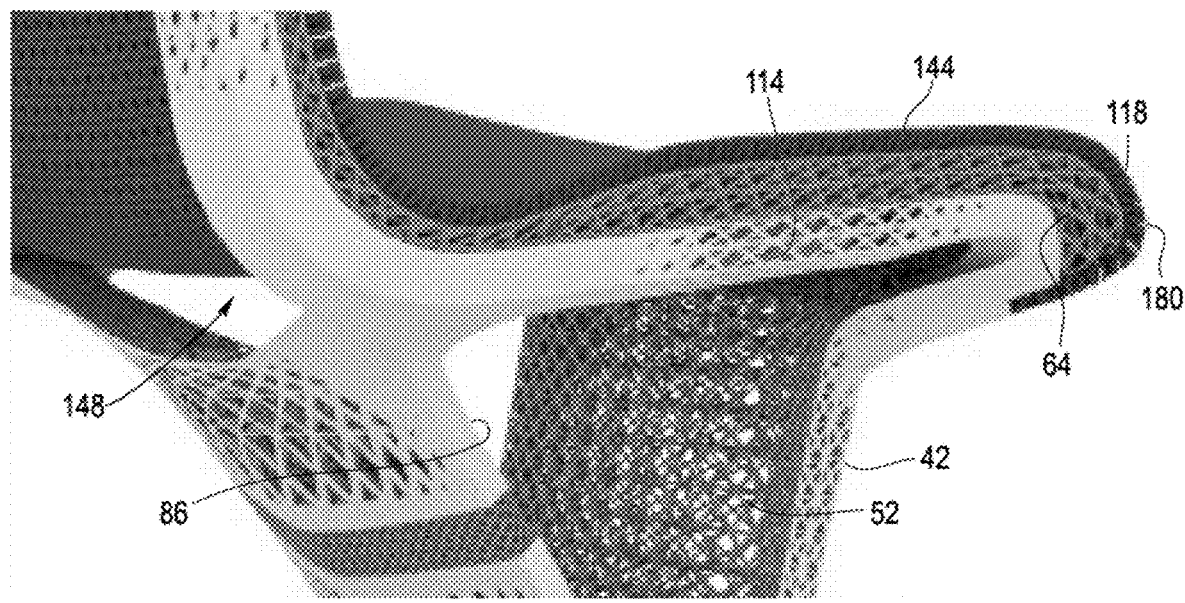
FIG. 29 is a partial view showing a structural lattice structure, compressive lattice structure and skin lattice structure defining a front of a body support structure.
Figure 40:
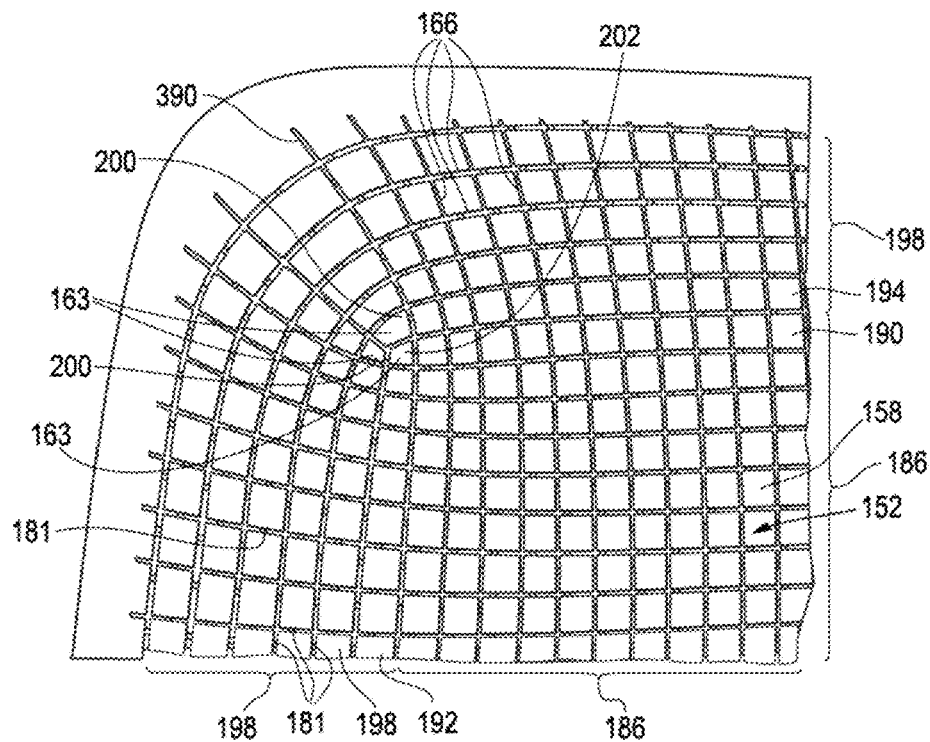
FIG. 40 is a top view of a partial corner portion of the seat skin lattice structure shown in FIG. 37.
Figure 41:
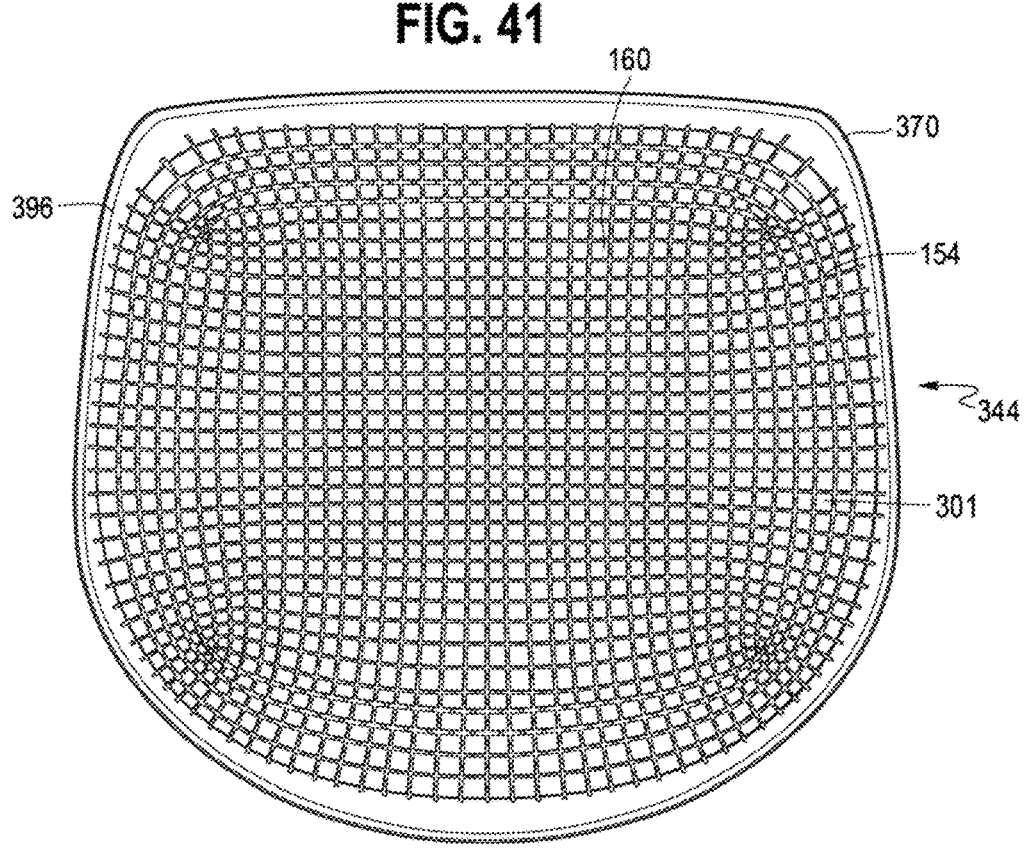
FIG. 41 is a bottom view of the seat skin lattice structure shown in FIG. 37.

In one embodiment, the perimeter array 188 has a plurality of rings, shown as three in FIGS. 26A-27, with each ring having n1 support members in the first and second rows and n2 support members in the first and second columns, with the perimeter ring having at least a pair of first and second rows, shown as three, and at least a pair of first and second columns, shown as three, or five rows and columns as shown in FIG. 40. As can be appreciated, the corners of the perimeter array include a pair of corner support members 200 connected to a corner support member 202 of the field array, meaning three connectors are required to join the field array corner support member with the perimeter array corner support members as shown in FIGS. 26B and 42. As additional perimeter array rings are added, the perimeter corner support members are enlarged to form a curved corner of the skin lattice structure, but the number of support members (combined from each row and column) in each ring is the same. It should be understood that the perimeter array may have one, two or three or more rings 194. In this way, the skin lattice structure may be configured with gently curved corners, having a relative large radius or curvature, which would not otherwise be achievable.

Put another way, the outermost periphery of the field array 186 includes n3 support members, wherein n3=2*n1+(2*(n2−2)). The closed ring 194 of the perimeter array has n4 support members, wherein n4=(2*n2)+(2*n1). Again, the perimeter array may include more than one ring, with each additional ring having the same number of support members. For example, a second perimeter ring may surround and be connected to the first ring, with the second ring having n5 support members, with n5=n4.

Referring to FIGS. 27-42, and 44-47, the outermost ring of the perimeter array is transitioned to a solid, or single layer, edge portion 370. The edge portion 370 may be made of a flexible material, or may be rigid, and is secured to the underlying frame 360, 362, whether solid or made of a structural or compressive lattice structure. For example, the edge portion may be secured to one of the underlying frames 360, 362. If unsupported by the frame, the edge portion may provide a flexible perimeter member that interfaces with the user, for example along the front of a seat, where it supports the thighs of the user, or top of a backrest. The edge portion may be tapered from a thicker inner region to a thinner outer region. Some residual slits 390, 392 are formed between the support member and base members as the perimeter array is transitioned to the edge portion. The edge portion may also include a circumferential or peripheral rim 396 or shoulder, for example extending downwardly from a bottom surface thereof, that extends around the entirety of the edge portion, or only portions thereof. The rim or shoulder provides an interface to connect a fabric overlying the top surface of the skin member, and any cushion disposed on a top thereof, for example by stapling, adhesives or other types of connection.

Figure 44:
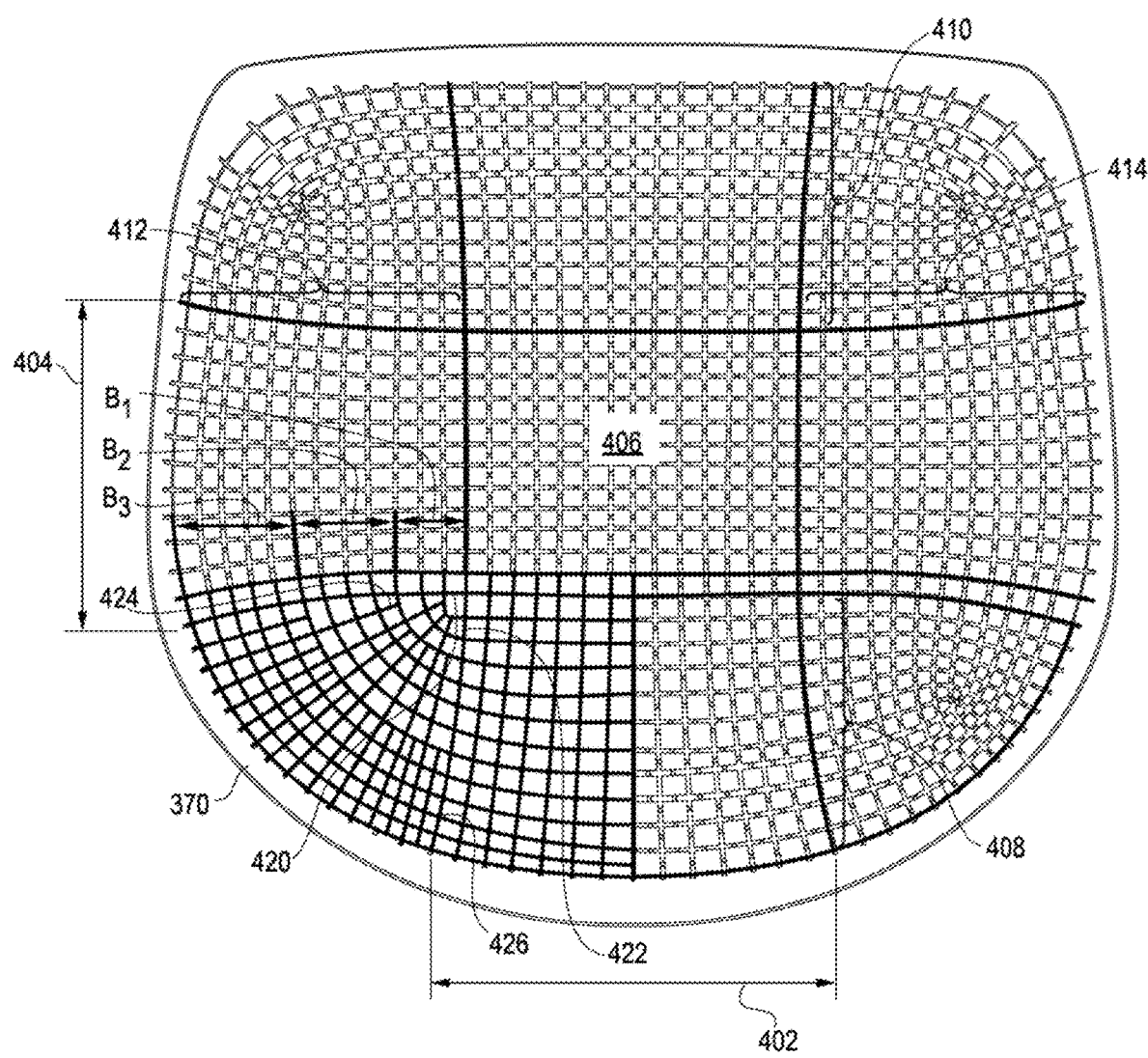
FIG. 44 is a bottom view of an alternative embodiment of a seat skin lattice structure.
Figure 45:
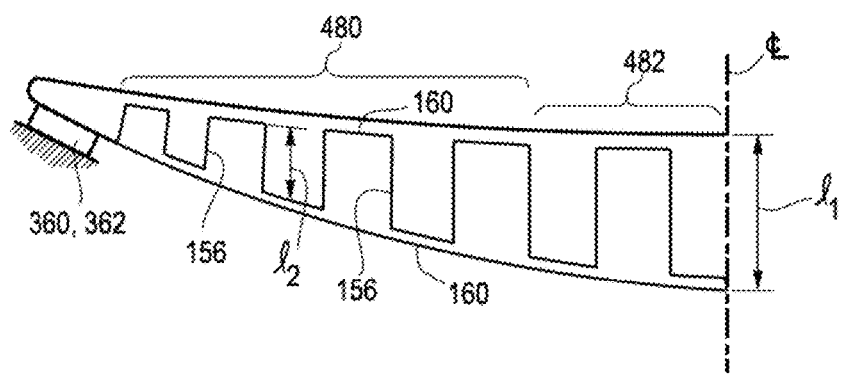
FIG. 45 is a schematic, cross-sectional view of an alternative embodiment of a skin lattice structure.
Figure 46:
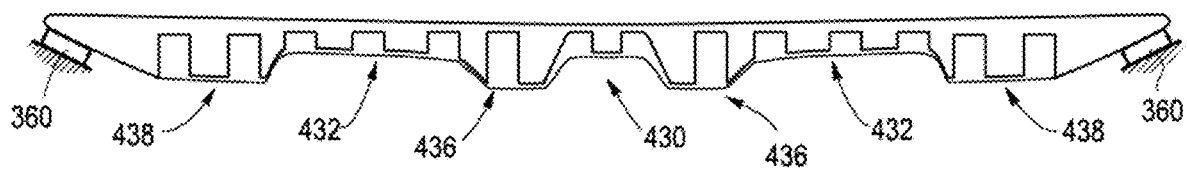
FIG. 46 is a schematic, cross-sectional view of an alternative embodiment of a skin lattice structure.
Figure 47:
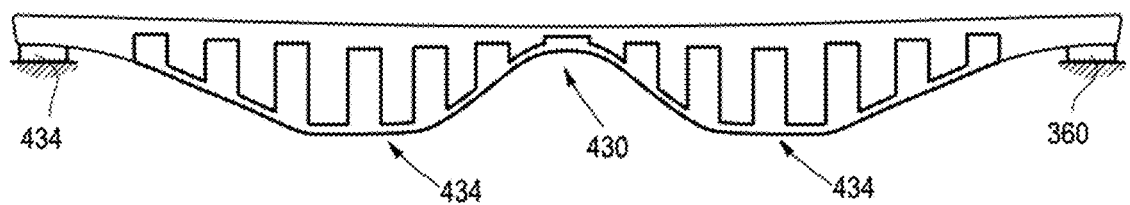
FIG. 47 is a schematic, cross-sectional view of an alternative embodiment of a skin lattice structure.
Figure 48:
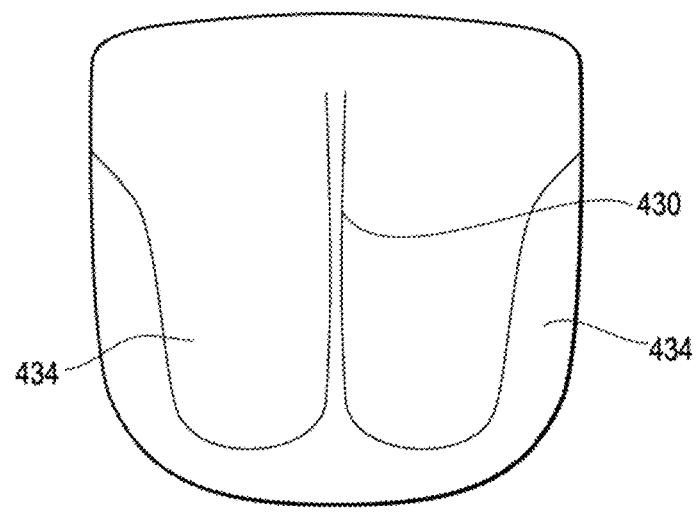
FIG. 48 is a bottom view of one embodiment of a seat skin lattice structure.

In an alternative embodiment, shown in FIG. 44, the corners of the of the skin lattice structure are configured with bifurcated corner arrays. A central array may have a cross-shape, with a plurality of columns 402 extending longitudinally intersecting a plurality of rows 404 extending laterally. The array includes a central region 406, a pair of spaced longitudinal regions 408, 410 and a pair of spaced lateral regions 412, 414, with the each of the rows (404, 408, 410) in each region having the same number of base members and/or support members within that region, and each of the columns 402, 412, 414 in each region having the same number of base members and/or support members within that region. Each corner array includes a plurality of bifurcation zones (e.g., B1, B2, B3 . . . ). In the first bifurcation zone, a corner base member or support member 420 has outer sides connected to a plurality of a first perimeter array 422, for example including two base members or support members bifurcated from, or connected to, each side, for a total of four base or support members. The first zone B1 may include one or a plurality of first perimeter arrays, shown as two in FIG. 44. In the second bifurcation zone B2, each of the base or support members in the first perimeter array has an outer side connected to a plurality of a second perimeter array 424, for example including two base or support members bifurcated from, or connected to, each side, for a total of eight base or support members. The second zone B2 may include one or a plurality of second perimeter arrays, shown as four in FIG. 44. In the third bifurcation zone B3, each of the base or support elements in the second perimeter array has an outer side connected to a plurality of a third perimeter array 426, for example including two base or support members bifurcated from, or connected to, each side, for a total of sixteen base or support members. The third zone B3 may include one or a plurality of third perimeter arrays, shown as five in FIG. 44. It should be understood that while the zones shown in FIG. 44 include a 2:1 bifurcation between zones B1, B2, B3, other ratios, for example 3:1 or greater, may also be suitable. An edge portion surrounds and is in-molded with the arrays.

Figure 49:
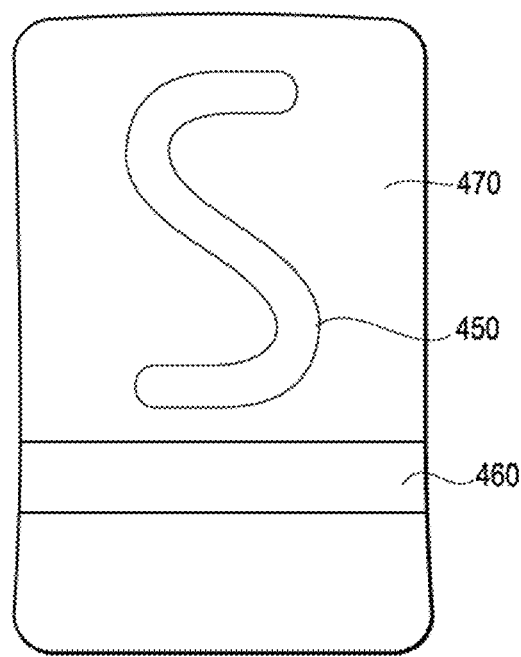
FIG. 49 is a rear view of one embodiment of a backrest skin lattice structure.

Referring to FIG. 45-49, the cross-sectional configuration, or depth, of the skin lattice structure is varied across the lateral and/or longitudinal directions, with the legs 156 having variable lengths (e.g., l1 v. l2), which leads to the skin lattice structure having variable stiffnesses. The central region 482 may have uniform length (l1) legs 156, while the edge portions 480 are tapered, with the legs 156 being made progressively shorter as they approach the edge portion. Different regions may be configured with different length legs 156 to make the regions more or less stiff, for example with longer legs positioned in the areas, or zones (434, 436, 438), having a desired less stiffness, and shorter legs positioned in areas or zones (430, 432) having a desired greater stiffness. As shown for example in FIG. 48, zones 434 may be made less stiff then other zones 430, for example as supporting the buttock of the user in a seat structure. As shown in FIG. 49, a band of the backrest 460, for example extending laterally at the lumbar region of a backrest, may be more made more stiff than adjacent regions 470 by altering the length and/or material of the legs 156. Likewise, any portion 450 of the body support member may be made more (or less) stiff, than other surrounding/adjacent regions 470. Finally, the legs 156 may be shortened to provide a visible design (e.g., 450) on the top/bottom or front/back of the skin lattice structure. The design may take any shape or form, for example the visible design 450 may resemble or illustrate a symbol (e.g. alphanumeric character(s)), picture, brand or corporate emblem, which is integral to and embedded in the structure.

Manufacture

The structural lattice structure 108 (and non-lattice structures 100, 102), the compressive lattice structure 134 and the skin lattice structure 146 may each be made, individually and collectively, by additive manufacturing. If made individually, the different lattice structures may be connected by various methods and materials, for example by welding, bonding (e.g., with adhesives) or with fasteners such as screws, and/or with an integrated fastening system, wherein the connection features are integrated into the lattice and/or solid structure, for example by 3-D printing. In one embodiment, the entire body support structure 32, including the base 34, seat 6 and backrest 8, may be integrally formed as a single, homogenous unit, albeit of different materials used for the different lattice structures if desired, by additive manufacturing, including for example 3-D printing.

Figure 35:
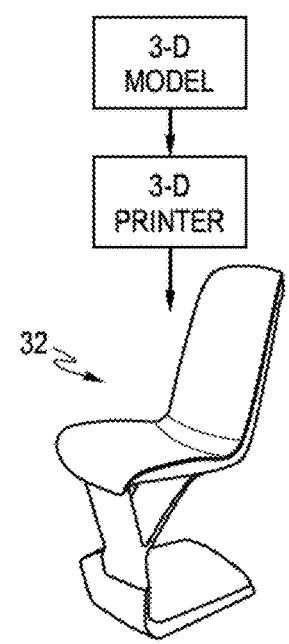
FIG. 35 is a flow diagram showing the manufacturing steps for making the body support structure.
Figure 36:
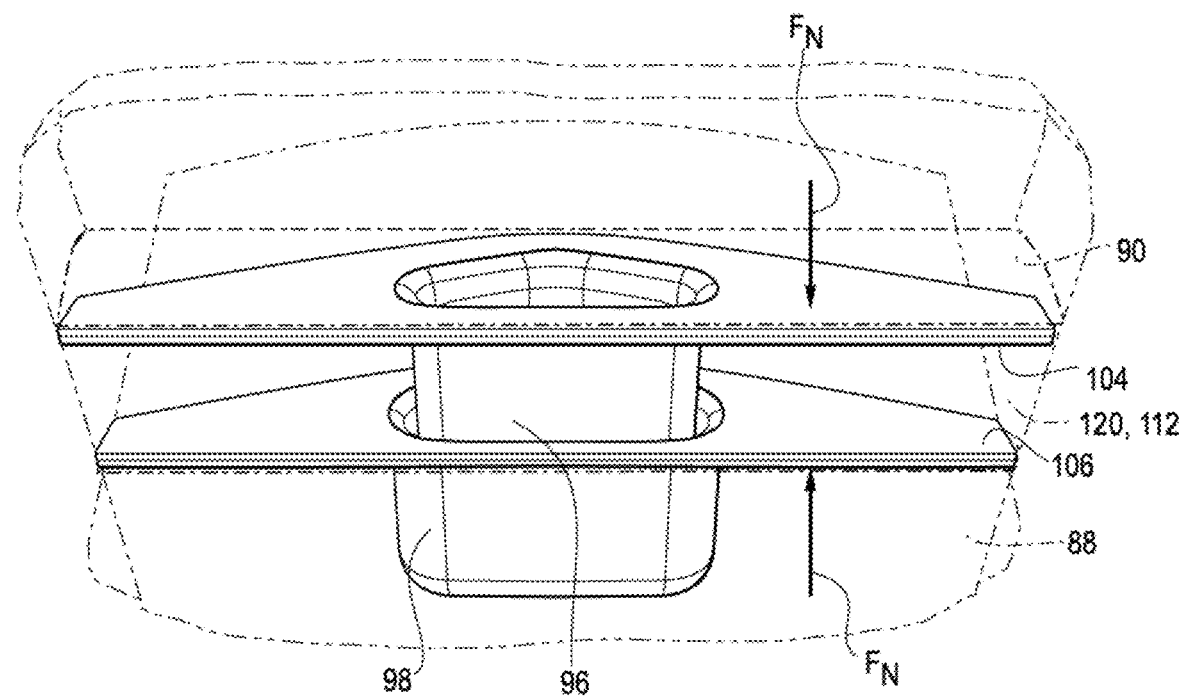
FIG. 36 is an enlarged partial view of a strut incorporating a compressive lattice structure.

Referring to FIG. 35, in one embodiment, the one or more of the structural lattice structure, the compressive lattice structure and the skin lattice structure are designed by creating a two dimensional surface map, or BREP (boundary representation), converting it to a volumetric model by voxelizing the map to configure a three-dimensional (3-D) model. A conforming voxel model is in essence a 3-D matrix, with each element of the matrix representing a voxel. In 3D printing, a voxel represents a value on a regular grid in a three-dimensional space, like a pixel with volume. Each voxel contains volumetric information that defines the structure with the desired properties. As noted, above, the lattice structure conforms to the external geometry, which may be arbitrary, for example with the structural lattice structure providing bending resistance and/or tensile and compressive stiffness in different directions along the seat and backrest, and with the compressive lattice structure providing compressive properties in different directions along the seat and backrest, with the lattice structures conforming or following the geometry of the seating structure so as to ensure that the lattice structure and resultant properties are correctly oriented in the overall body support structure. For example, one voxel model includes voxels assuming a logic value, with one indicating a solid space and zero indicating a void space. In one embodiment, the repeating elements may be tessellated across a domain, with the lattices trimmed at the boundary. A skin may be applied to the trimmed lattice structure, for example by integrally forming or 3-D printing, to improve the integrity and appearance of the lattice structure along the outermost boundary of the structure.

The 3-D model is operative to program a 3-D printer to perform the 3-D printing, or other additive manufacturing. As such, a designer may quickly and easily modify the 3-D model, for example by varying the size, shape and curvature of the overall seating surfaces and geometric boundaries, and by modifying the lattice structures and materials to alter the stiffness and weight characteristics of each of the structures. The entire body support structure, or components thereof, may be made entirely at one location without complex tooling, assembly processes or mechanical fasteners. Moreover, changes in the configuration of one or more components, or the entire chair, may be made quickly and easily through programming changes, rather than by complex and expensive retooling.

It should be understood that the entire body support structure may be made without any mechanical interconnection, defined as two parts moveable relative to each other and interfacing in a locking configuration, including for example and without limitation, mechanical fasteners such as screws and bolts, snap-fit tabs or detents, which eliminates various assembly steps. For example, the base, seat and backrest may be assembled without any mechanical interconnection or fasteners, although it should be understood that other auxiliary items, such as armrests, tablet worksurfaces, headrests, etc. may be coupled to the body support structure, whether with mechanical interconnection, welding, adhesives, or by integrating such features through the additive manufacturing process.

The non-lattice structure 100, 102 may also provide a location and opportunity to manufacture separate pieces or components that are then joined at those locations, for example by having an insert portion extending from one component received in an cavity of another component, with the two components being further connected with an adhesive or other fastening systems including mechanical fasteners. Such constructions allow for smaller pieces to be made by additive manufacturing, while still realizing all of the benefits thereof, for example avoiding tooling and mechanical fasteners such as screws and bolts, although such fasteners may be used in some embodiments. The different lattice structures may also be printed separately in a green state, with the lattice structures then being assembled (disposed adjacent to each other or supporting one on another) whereinafter the overall structure/assembly is baked, which adheres or connects the adjacent structures while also setting the lattice structures. In addition, or alternatively, the lattice or solid structures may include integrated features, such as hooks, tabs or other features, which may be engaged to secure one component or part to another.

The entire body support structure, or components thereof, may be made entirely at a single manufacturing location without complex tooling, assembly processes or mechanical fasteners. The manufacturing locations maybe dispersed at different locations, for example proximate end point-of-sale or delivery, with the 3-D model and instructions received from a remote location, for example by wireless communications.

Operation of the Body Support Structure:

In operation, the user applies a force to the body support structure 32, for example to the skin lattice structure 146, which provides flexibility and support for the user, with the skin lattice structure expanding by resisting shear and carrying the load to the spaced apart compressive lattice structure beams 114. The compressive lattice structure defining the cross member 118 positioned along the front of the seat provides a soft, compressible support for the user's thighs. Likewise, the compressive lattice structure uprights 116 provide a soft, compressible support for the user's back, for example along the lumbar region. The user $L_N$ load is transferred from the skin lattice structure 146 to the compressive lattice structure 134 and then to the structural lattice structure, or directly to an underlying frame 360, 362.

As a user reclines in the body support structure, the flex regions 210, 212 may allow for recline of the seat and backrest, while the strut 86 provides a biasing force, and maximum tilt/recline, to the seat.

The various seating structure embodiments disclosed herein provide a soft outer peripheral edge that allows the user to bear against and flex the peripheral edge without encountering a hard contact point. The peripheral edges are independently flexible and responsive to loads. The various lattice structures may be tuned to optimize and vary support in various desired locations, for example and without limitation the lumbar, thoracic and pelvic regions of a backrest, or the thigh and buttock regions of a seat. It should be understood that while many of the embodiments have been described herein with respect to a chair construction, the same embodiments are equally applicable to other body support structures such as a bed, sofa or vehicular seating structure.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A body support structure comprising:
a structural lattice structure having a first stiffness;
a compressive lattice structure supported by the structural lattice structure, wherein the compressive lattice structure has a second stiffness less than the first stiffness, wherein the compressive lattice structure is compressible in response to a first normal force applied thereto; and
a skin lattice structure having at least a portion overlying and supported by the compressive lattice structure, wherein the skin lattice structure is resistant to shear deformation in response to a second normal force applied thereto, and wherein the skin lattice structure is expandable in a direction transverse to the second normal force applied thereto in response to the second normal force being applied thereto.

2. A body support structure comprising:
a structural lattice structure having a first stiffness;
a compressive lattice structure supported by the structural lattice structure, wherein the compressive lattice structure has a second stiffness less than the first stiffness, wherein the compressive lattice structure is compressible in response to a first normal force applied thereto; and
a skin lattice structure supported by the compressive lattice structure, wherein the skin lattice structure is resistant to shear deformation in response to a second normal force applied thereto, and wherein the skin lattice structure is expandable in a direction transverse to the second normal force applied thereto in response to the second normal force being applied thereto, wherein the compressive lattice structure comprises a pair of spaced apart beams defining an opening therebetween, and wherein the skin lattice structure is coupled to the compressive lattice structure and spans across the opening.

3. The body support structure of claim 2 wherein at least a portion of the skin lattice structure overlying the opening is not supported by any other structure.

4. The body support structure of claim 2 wherein the compressive lattice structure comprises a cross member connecting the beams and positioned proximate a front of a seat portion.

5. A body support structure comprising:
a structural lattice structure having a first stiffness;
a compressive lattice structure supported by the structural lattice structure, wherein the compressive lattice structure has a second stiffness less than the first stiffness, wherein the compressive lattice structure is compressible in response to a first normal force applied thereto, wherein the compressive lattice structure comprises a cellular matrix comprising a first portion having at least one layer of unit cells and a second portion having a plurality of layers of unit cells, wherein the second portion has more layers of unit cells than the first layer, and comprising a transition between the first and second portions; and
a skin lattice structure supported by the compressive lattice structure, wherein the skin lattice structure is resistant to shear deformation in response to a second normal force applied thereto, and wherein the skin lattice structure is expandable in a direction transverse to the second normal force applied thereto in response to the second normal force being applied thereto.

6. The body support structure of claim 1 wherein the compressive lattice structure comprises an interior core lattice and a face lattice connected to the core lattice and defining an outermost surface of the compressive lattice structure.

7. A body support structure comprising:
a structural lattice structure having a first stiffness;
a compressive lattice structure supported by the structural lattice structure, wherein the compressive lattice structure has a second stiffness less than the first stiffness, wherein the compressive lattice structure is compressible in response to a first normal force applied thereto;
a skin lattice structure supported by the compressive lattice structure, wherein the skin lattice structure is resistant to shear deformation in response to a second normal force applied thereto, and wherein the skin lattice structure is expandable in a direction transverse to the second normal force applied thereto in response to the second normal force being applied thereto; and
a non-lattice structure positioned between portions of the structural lattice structure such that the structural lattice structure is discontinuous.

8. The body support structure of claim 7 wherein the non-lattice structure comprises a solid or tubular structure.

9. A body support structure comprising:
a structural lattice structure having a first stiffness, wherein the structural lattice structure defines at least a portion of a base, a seat support connected to the base and a back frame connected to one of the base or seat support;
a compressive lattice structure supported by the structural lattice structure, wherein the compressive lattice structure has a second stiffness less than the first stiffness, wherein the compressive lattice structure is compressible in response to a first normal force applied thereto; and
a skin lattice structure supported by the compressive lattice structure, wherein the skin lattice structure is resistant to shear deformation in response to a second normal force applied thereto, and wherein the skin lattice structure is expandable in a direction transverse to the second normal force applied thereto in response to the second normal force being applied thereto.

10. The body support structure of claim 9 wherein the base comprises a pedestal having a floor-engaging portion.

11. The body support structure of claim 10 further comprising a strut disposed between the base and one of the seat support or back frame.

12. A body support structure comprising:
a structural lattice structure having a first stiffness, wherein the structural lattice structure defines at least a portion of a base, a seat support connected to the base and a back frame connected to one of the base or seat support, wherein the base comprises a pedestal having a floor-engaging portion;
a compressive lattice structure supported by the structural lattice structure, wherein the compressive lattice structure has a second stiffness less than the first stiffness, wherein the compressive lattice structure is compressible in response to a first normal force applied thereto;
a skin lattice structure supported by the compressive lattice structure, wherein the skin lattice structure is resistant to shear deformation in response to a second normal force applied thereto, and wherein the skin lattice structure is expandable in a direction transverse to the second normal force applied thereto in response to the second normal force being applied thereto; and
a strut disposed between the base and one of the seat support or back frame, wherein the strut comprises:
spaced apart first and second end portions coupled to the base and the one of the seat support or back frame respectively; and
an intermediate compressive lattice structure connected to the first and second end portions;
wherein the first and second end portions are moveable between a nominal position and a compressed position, wherein the intermediate compressive lattice structure is compressible between a nominal configuration and a compressed configuration corresponding to the nominal and compressed positions, wherein the intermediate compressive lattice structure applies a biasing force to the first and second end portions when in the compressed configuration.

13. The body support structure of claim 9 wherein a front portion of the seat support is pivotally coupled to the base at a flex region, wherein the seat support is cantilevered rearwardly from the flex region, and wherein the back frame extends upwardly from the seat support.

14. The body support structure of claim 1 wherein the skin lattice structure comprises:
a plurality of spaced apart support members defining opposite first and second surfaces, wherein adjacent support members define openings between sides of the adjacent support members;
a plurality of spaced apart base members defining opposite first and second surfaces, wherein the first surfaces of the base members face toward and are spaced apart from the second surfaces of the support members such that the plurality of support members and the plurality of base members define a space therebetween, wherein each of the base members underlies at least portions of the openings defined by at least two adjacent support members, and wherein adjacent base members define openings between sides of the adjacent base members, wherein at least some of the base members are connected to the compressive lattice structure; and a plurality of connectors extending across the space and connecting each base portion with the at least two adjacent support members.

15. The body support structure of claim 14 wherein at least some of the base members have through openings underlying at least portions of the openings defined by at least two adjacent support members.

16. The body support structure of claim 1 wherein at least portions of one of the structural lattice structure and/or compressive lattice structure are discontinuous.

17. A body support structure comprising:
a structural lattice structure having a first stiffness;
a compressive lattice structure supported by the structural lattice structure, wherein the compressive lattice structure has a second stiffness less than the first stiffness, wherein the compressive lattice structure is compressible in response to a first normal force applied thereto; and
a skin lattice structure supported by the compressive lattice structure, wherein the skin lattice structure is resistant to shear deformation in response to a second normal force applied thereto, and wherein the skin lattice structure is expandable in a direction transverse to the second normal force applied thereto in response to the second normal force being applied thereto, wherein the structural lattice structure, compressive lattice structure and skin lattice structure are free of any mechanical interconnections therebetween.

18. The body support structure of claim 1 wherein at least one of the structural lattice structure, compressive lattice structure and skin lattice structure comprises an integrated kinematic feature.

19. The body support structure of claim 18 wherein the integrated kinematic feature comprises a movement limiter.

20. A body support structure comprising:
a structural lattice structure having a first stiffness;
a compressive lattice structure supported by the structural lattice structure, wherein the compressive lattice structure has a second stiffness less than the first stiffness, wherein the compressive lattice structure is compressible in response to a first normal force applied thereto; and
a skin lattice structure supported by the compressive lattice structure, wherein the skin lattice structure is resistant to shear deformation in response to a second normal force applied thereto, and wherein the skin lattice structure is expandable in a direction transverse to the second normal force applied thereto in response to the second normal force being applied thereto;
wherein at least one of the structural lattice structure, compressive lattice structure and skin lattice structure comprises an integrated kinematic feature, wherein the integrated kinematic feature comprises a movement limiter and a biasing member.

21. A body support structure comprising:
a structural lattice structure having a first stiffness;
a compressive lattice structure supported by the structural lattice structure, wherein the compressive lattice structure has a second stiffness less than the first stiffness, wherein the compressive lattice structure is compressible in response to a first normal force applied thereto, wherein the compressive lattice structure comprises a thermoplastic polyurethane; and
a skin lattice structure supported by the compressive lattice structure, wherein the skin lattice structure is resistant to shear deformation in response to a second normal force applied thereto, and wherein the skin lattice structure is expandable in a direction transverse to the second normal force applied thereto in response to the second normal force being applied thereto.

22. The body support structure of claim 1 wherein the structural lattice structure comprises a polypropylene.

23. A method of manufacturing the body support structure of claim 1 comprising forming the structural lattice structure, the compressive lattice structure and the skin lattice structure by additive manufacturing.

24. The method of claim 23 wherein the additive manufacturing comprises 3-D printing.

25. A method of manufacturing the body support structure of claim 1 comprising forming the structural lattice structure, the compressive lattice structure and the skin lattice structure by additive manufacturing wherein the additive manufacturing comprises 3-D printing, and wherein the 3-D printing comprises integrally forming the structural lattice structure, compressive lattice structure and skin lattice structure during a single 3-D printing operation.

26. The method of claim 24 comprising defining one or more of the structural lattice structure, compressive lattice structure and skin lattice structure by creating a two dimensional surface map and voxelizing the map to configure a three-dimensional model operative for programming a 3-D printer to perform the 3-D printing.

* * * * *